United States Patent
Sugano

(10) Patent No.: US 11,468,653 B2
(45) Date of Patent: Oct. 11, 2022

(54) IMAGE PROCESSING DEVICE, IMAGE PROCESSING METHOD, PROGRAM, AND DISPLAY DEVICE

(71) Applicant: SONY CORPORATION, Tokyo (JP)

(72) Inventor: Hisako Sugano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/289,129

(22) PCT Filed: Nov. 6, 2019

(86) PCT No.: PCT/JP2019/043359
§ 371 (c)(1),
(2) Date: Apr. 27, 2021

(87) PCT Pub. No.: WO2020/105422
PCT Pub. Date: May 28, 2020

(65) Prior Publication Data
US 2021/0383617 A1    Dec. 9, 2021

(30) Foreign Application Priority Data
Nov. 20, 2018    (JP) .............................. JP2018-217179

(51) Int. Cl.
*G06T 19/20*    (2011.01)
*G06T 7/246*    (2017.01)
*G06T 13/20*    (2011.01)

(52) U.S. Cl.
CPC .............. *G06T 19/20* (2013.01); *G06T 7/248* (2017.01); *G06T 13/20* (2013.01);
(Continued)

(58) Field of Classification Search
CPC ......... G06T 19/20; G06T 7/248; G06T 13/20; G06T 2210/62; G06T 2219/2004; G06T 2219/2016; G06T 13/40; H04N 21/21805; H04N 21/8153; H04N 21/816; H04N 5/2625

See application file for complete search history.

(56) References Cited

U.S. PATENT DOCUMENTS

| 6,665,342 B1 * | 12/2003 | Brown .............. G08B 13/19691 |
| | | 348/E5.065 |
| 7,463,269 B2 * | 12/2008 | Hong ...................... G06T 15/04 |
| | | 345/582 |

(Continued)

FOREIGN PATENT DOCUMENTS

| GB | 2558283 A | 7/2018 |
| JP | 2007-259477 A | 10/2007 |
| JP | 2007259477 A * | 10/2007 |

OTHER PUBLICATIONS

JP2007259477A(MachineTranslationonApr. 26, 2021) (Year: 2007).*

(Continued)

*Primary Examiner* — Michael Le
(74) *Attorney, Agent, or Firm* — Paratus Law Group, PLLC

(57) ABSTRACT

An image processing device includes circuitry configured to perform an effect process on at least one 3D model of a plurality of 3D models generated from a plurality of viewpoint images captured from a plurality of viewpoints at different times.

13 Claims, 37 Drawing Sheets

(52) U.S. Cl.
CPC .. *G06T 2210/62* (2013.01); *G06T 2219/2004* (2013.01); *G06T 2219/2016* (2013.01)

(56) References Cited

U.S. PATENT DOCUMENTS

| | | | |
|---|---|---|---|
| 2002/0158873 A1* | 10/2002 | Williamson | G06T 7/85 |
| | | | 345/427 |
| 2003/0085992 A1* | 5/2003 | Arpa | G06T 19/006 |
| | | | 348/E7.086 |
| 2004/0017504 A1* | 1/2004 | Prandoni | H04N 7/188 |
| | | | 348/370 |
| 2005/0018045 A1 | 1/2005 | Thomas et al. | |
| 2009/0128548 A1 | 5/2009 | Gloudemans et al. | |
| 2012/0002112 A1* | 1/2012 | Huang | H04N 5/144 |
| | | | 348/E9.055 |
| 2012/0242779 A1* | 9/2012 | Liu | H04N 5/145 |
| | | | 348/565 |
| 2013/0124148 A1 | 5/2013 | Jin et al. | |
| 2013/0303248 A1* | 11/2013 | Williams | A63F 9/143 |
| | | | 463/6 |
| 2018/0220048 A1 | 8/2018 | Tamir et al. | |
| 2018/0302647 A1 | 10/2018 | Tanaka | |
| 2019/0065027 A1* | 2/2019 | Hauenstein | G06F 3/0484 |
| 2019/0253695 A1* | 8/2019 | Festa | H04N 5/232 |

OTHER PUBLICATIONS

Smolic, 3D video and free viewpoint video—From capture to display, Pattern Recognition, Elsevier, Sep. 2011, pp. 1958-1968.

* cited by examiner

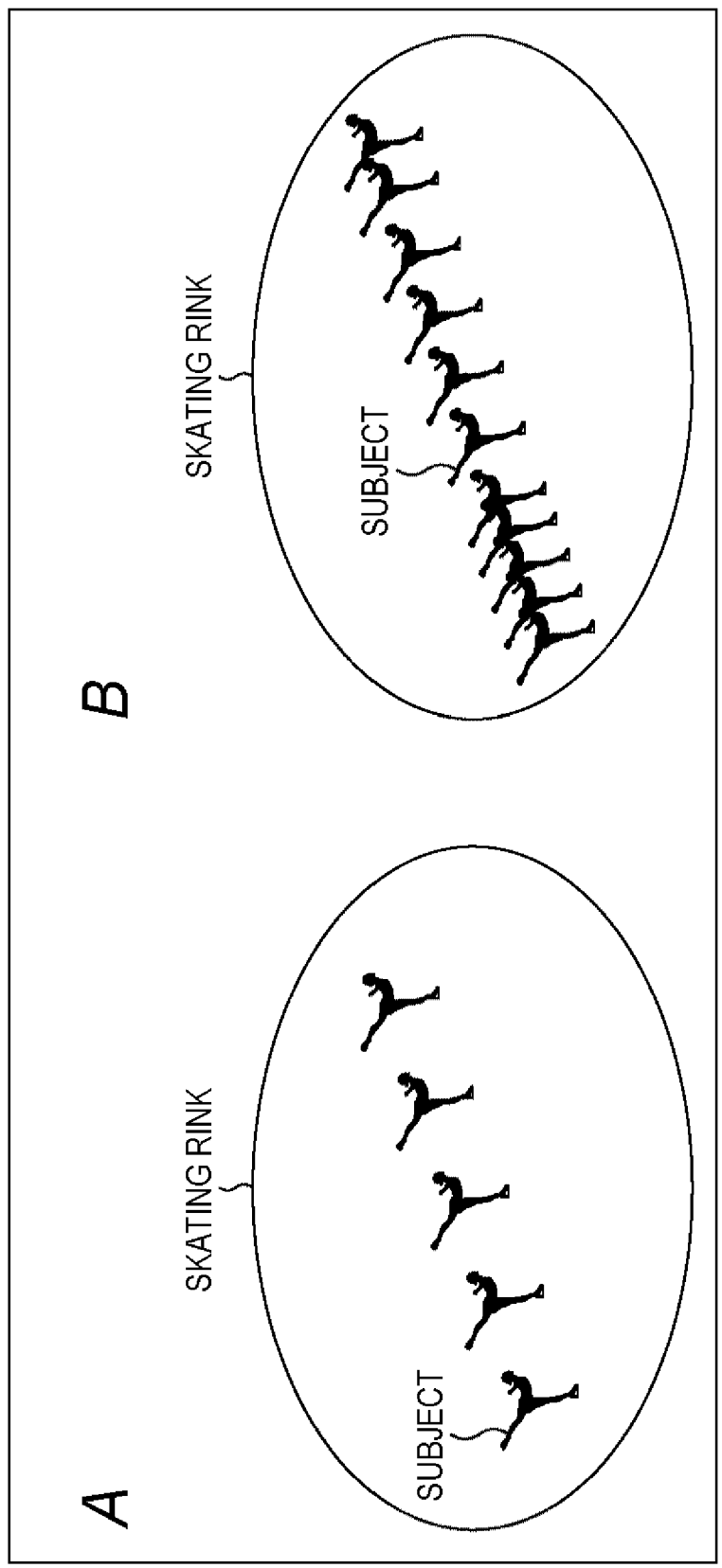

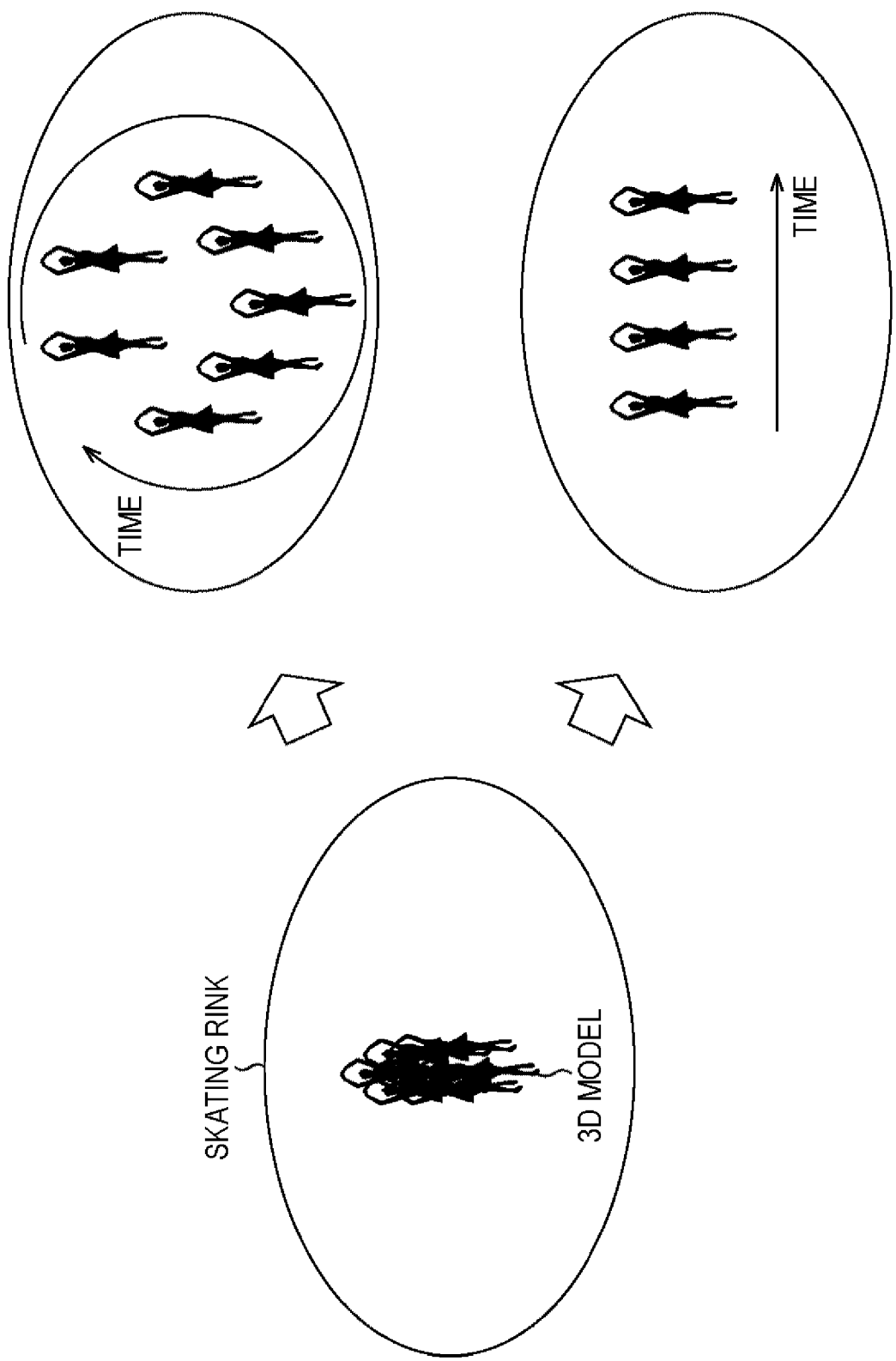

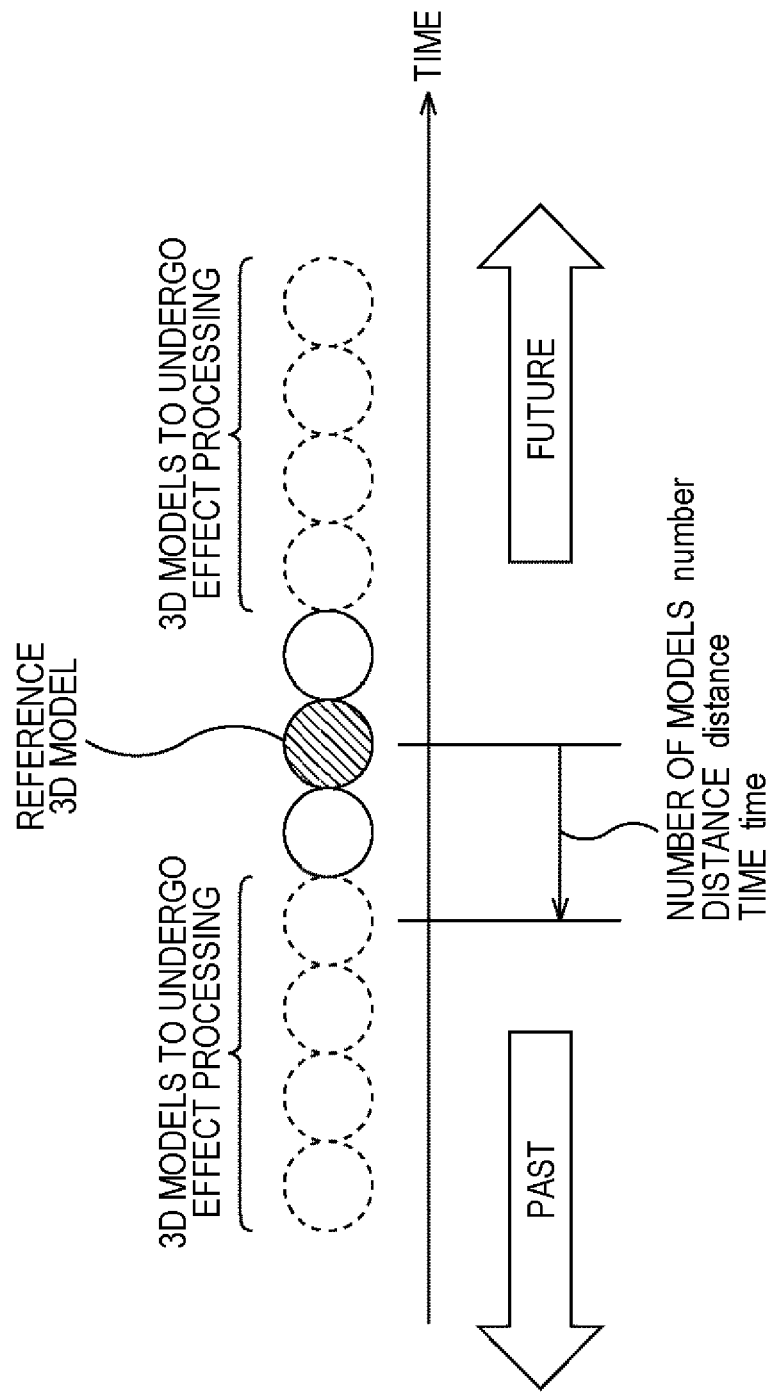

FIG. 14

| EFFECT MODE | DESCRIPTIONS OF EFFECT PROCESSING | EFFECT DIRECTION | EFFECT DISTANCE |
|---|---|---|---|
| 0 | NO EFFECT PROCESSING | | |
| 1 | (GRADUALLY) TRANSPARENTIZE 3D MODEL | past/future (default:past) | number/distance/time (default:number=1) |
| 2 | GRADUALLY EXTINGUISH 3D MODEL | past/future (default:past) | number/distance/time |
| 3 | (GRADUALLY) DECREASE NUMBER OF TEXTURES OF 3D MODEL (VIEW DEPENDENT) | past/future (default:past) | number/distance/time |
| 4 | ERASE 3D MODEL | past/future (default:past) | number/distance/time (default:distance=5) |
| 5 | (GRADUALLY) AT LEAST ONE OF LUMINANCE AND SATURATION OF 3D MODEL | past/future (default:past) | number/distance/time (default:time=10) |
| 6 | LIMIT NUMBER OF 3D MODELS SHOWN IN STROBE IMAGE | past/future (default:past) | number/distance/time |
| 7 | (GRADUALLY) DECREASE NUMBER OF MESHES (NUMBER OF POLYGONS) OF 3D MODEL | past/future (default:past) | number/distance/time (default:number=3) |
| 8 | SET EXPRESSION FORM OF 3D MODEL TO WIRE FRAME | past/future (default:past) | number/distance/time |
| 9 | CHANGE EXPRESSION FORM OF 3D MODEL FROM VIEW DEPENDENT TO VIEW INDEPENDENT (POINT CLOUD) | past/future (default:past) | number/distance/time |
| 10 | ERASE 3D MODEL WITH TRACE OF 3D MODEL LEFT | past/future (default:past) | number/distance/time |

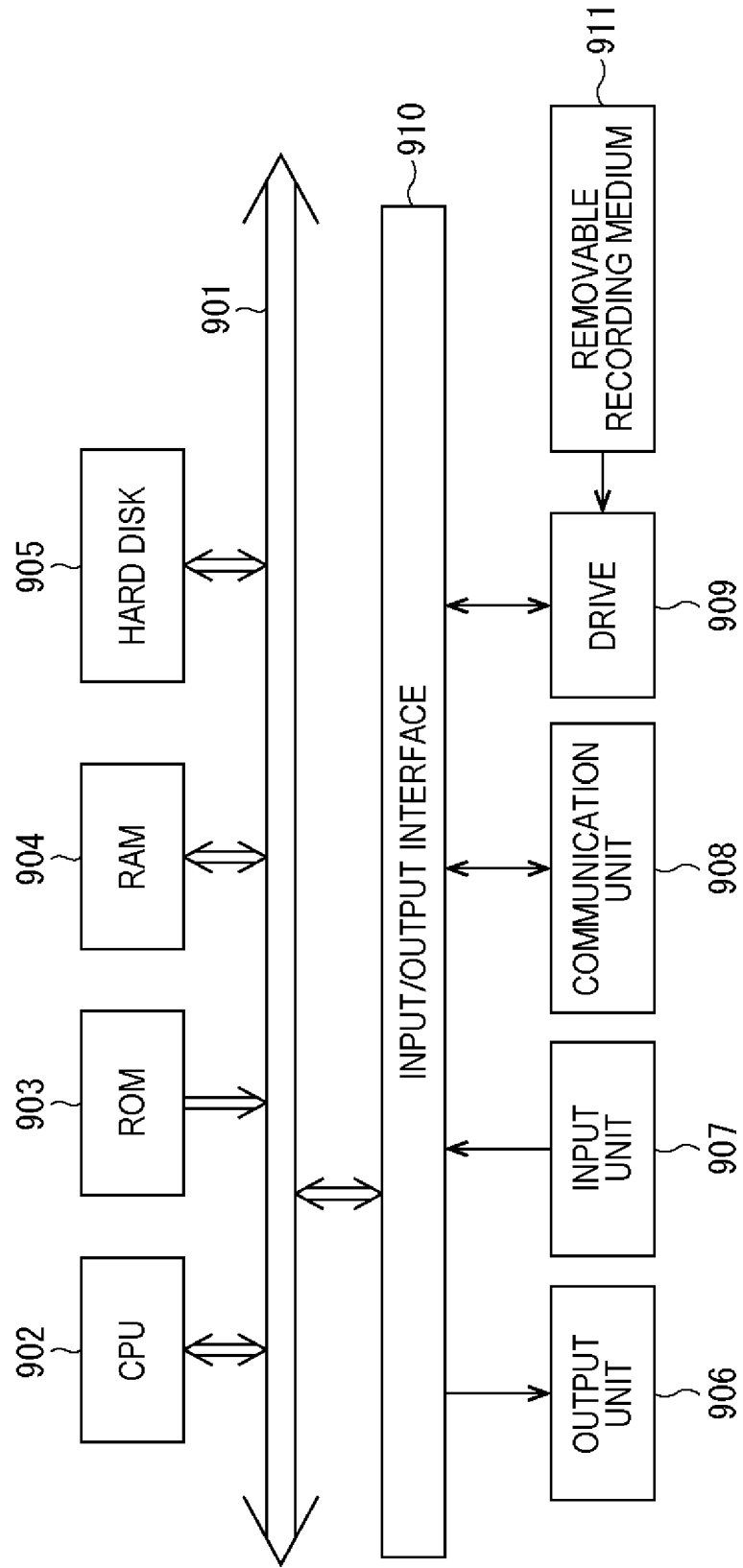

IMAGE PROCESSING DEVICE, IMAGE PROCESSING METHOD, PROGRAM, AND DISPLAY DEVICE

This application is a National Stage Patent Application of PCT International Patent Application No. PCT/JP2019/043359 filed on Nov. 6, 2019 under 35 U.S.C. § 371, which claims the benefit of Japanese Priority Patent Application JP 2018-217179 filed on Nov. 20, 2018, the entire contents of which are incorporated herein by reference.

TECHNICAL FELD

The present technology relates to an image processing device, an image processing method, a program, and a display device, and more particularly to, for example, an image processing device, an image processing method, a program, and a display device capable of providing an easily viewable image.

BACKGROUND ART

There has been proposed a method of generating a strobe image showing a subject (image) captured at a plurality of times (for example, see Patent Document 1). The strobe image shows the subject at a plurality of times, which makes it possible to easily grasp the movement and trajectory of the subject.

CITATION LIST

Patent Literature

[PTL 91]
JP 2007-259477A

SUMMARY

TECHNICAL PROBLEM

For example, in particular, in a case of Generating a strobe image for a subject that appears in a long-time frame (sequence), the strobe image may be difficult to see.

The present technology has been made in light of such a situation, and is intended to provide an easily viewable image, for example, an easily viewable strobe image or the like.

SOLUTION TO PROBLEM

An image processing device or a program according to an aspect of the present technology is an image processing device that includes circuitry configured to perform an effect process on at least one 3D model of a plurality of 3D models generated from a plurality of viewpoint images captured from a plurality of viewpoints; and generate a 2D image in which the plurality of 3D models having undergone the effect process is viewed from a predetermined viewpoint.

An image processing method according to an aspect of the present technology includes performing an effect process on at least one 3D model of a plurality, of 3D models generated from a plurality of viewpoint images captured from a plurality of viewpoints and generating a 2D image in which the plurality of 3D models having undergone the effect process is viewed from a predetermined viewpoint.

According to the image processing device, the image processing method, and the program of an aspect of the present technology, the effect process is performed on at least one 3D model of the plurality of 3D models generated from the plurality of viewpoint images captured from the plurality of viewpoints and generating a 2D image in which the plurality of 3D models having undergone the effect process is viewed from a predetermined viewpoint.

A display device according to an aspect of the present technology includes circuitry configured to receive a 2D image obtained by performing an effect process on at least one 3D model of a plurality of 3D models generated from a plurality of viewpoint images captured from a plurality of viewpoints and generating a 2D image in which the plurality of 3D models having undergone the effect process is viewed from a predetermined viewpoint.

According to the display device of an aspect of the present technology, the 2D image is obtained by performing effect process on at least one of a plurality of 3D models generated from a plurality of viewpoint images captured from a plurality of viewpoints and generating a 2D image in which the plurality of 3D models having undergone the effect process is viewed from a predetermined viewpoint.

Note that the image processing device and the display device may be independent devices or internal blocks constituting one device.

Furthermore, the program can be provided by being transmitted via a transmission medium, or by being recorded on a non-transitory computer-readable medium.

BRIEF DESCRIPTION OF DRAWINGS

FIG. 7 is a diagram describing a first determination method for determining the motion of a subject by a strobe image generation unit 13.

FIG. 11 is a diagram describing an example of selection of a generation frame by the strobe image generation unit 13.

FIG. 12 is a diagram illustrating an example of a strobe image generated by shifting 3D models of a subject shown in a plurality of generation frames from original positions.

FIG. 13 is a diagram describing 3D models in a strobe image to be subjected to an effect process by the effect processing unit 14.

FIG. 14 is a diagram describing specific examples of effect processes.

FIG. 37 is a block diagram illustrating a configuration example of an embodiment of a computer to which the present technology is applied.

DESCRIPTION OF EMBODIMENTS

<Image Processing System to which the Present Technology is Applied>

Figure 1:
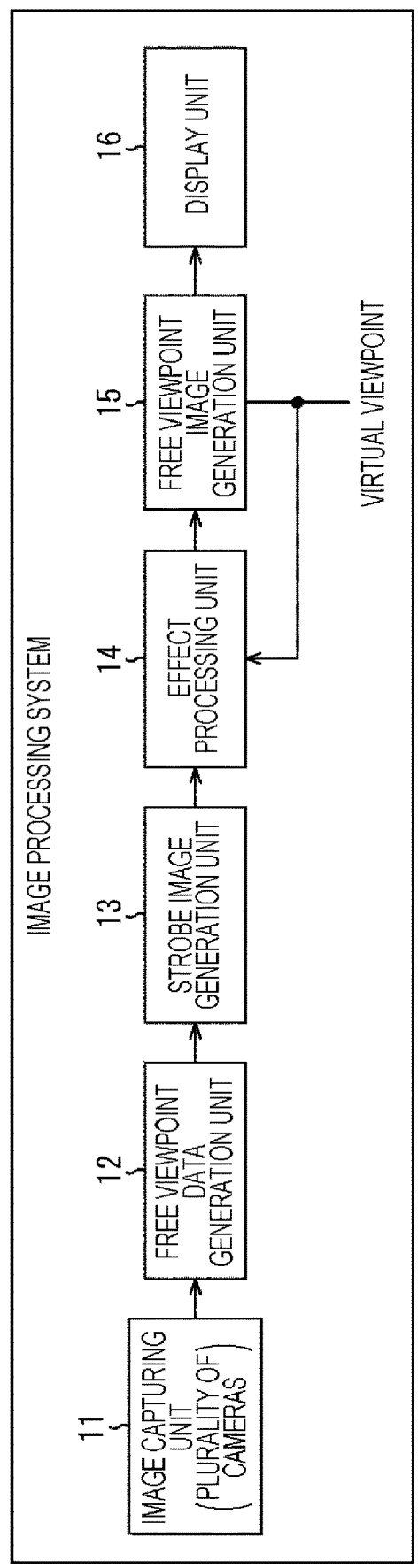
FIG. 1 is a block diagram illustrating a configuration example of as embodiment of as image processing system to which the present technology is applied.

FIG. 1 is a block diagram illustrating a configuration example of an embodiment of an image processing system to which the present technology is applied.

In the image processing system illustrated in FIG. 1, free viewpoint data is generated from a captured image in a manner capable of generating a free viewpoint image in which the appearance of a subject in a three-dimensional space from a virtual viewpoint is reproduced. Then, the free viewpoint image of the subject viewed from the virtual viewpoint is generated and displayed from the free viewpoint data.

The image processing system illustrated in FIG. 1 includes an image capturing unit 11, a free viewpoint data generation unit 12, a strobe image generation unit 13, an effect processing unit 14, a free viewpoint image generation unit 15, and a display unit 16.

The image capturing unit 11 includes at least a plurality of cameras, and photographs a subject from a plurality of viewpoints. For example, the plurality of cameras constituting the image capturing unit 11 is disposed so as to surround the subject, and each of the cameras captures the subject from a viewpoint at a position at which the camera is disposed. The two-dimensional (2D) images captured from the positions of the cameras, in other words, the viewpoint images (moving images) from the plurality of viewpoints as 2D images captured from the plurality of viewpoints are supplied frame by frame from the image capturing unit 11 to the free viewpoint data generation unit 12.

Here, the image capturing unit 11 can be provided with a plurality of distance measurement devices in addition to a plurality of cameras. The distance measurement devices can be disposed at the same positions (viewpoints) as the cameras, or can be disposed at different positions from the cameras. Each of the distance measuring devices measures the distance to the subject from the position (view point) where the distance measurement device is disposed, and generates a depth image which is a 2D image having a depth as information regarding the distance as a pixel value. The depth image is supplied from the image capturing unit 11 to the free viewpoint data generation unit 12.

Note that, when no distance measurement device is provided in the image capturing unit 11, the distance to the subject is measured according to the principle of triangulation using viewpoint images from two viewpoints among viewpoint images of a plurality of viewpoints, thereby to generate a depth image.

The free viewpoint data generation unit 12 generates free viewpoint data of a 3D image frame by frame from the viewpoint images and the depth images from the plurality of viewpoints from the image capturing unit 11.

Here, the free viewpoint data is data of a 3D image from which a free viewpoint image can be generated. As free viewpoint data, for example, a set of the viewpoint images and the depth images from the plurality of viewpoints from the image capturing unit 11 can be adopted as it is. Furthermore, as free viewpoint data, for example, a 3D model (or 3D data including a background image or the like) or a set of 2D images and depth images from a plurality of viewpoints can be adopted.

In a case of adopting the set of the viewpoint images and the depth images from the plurality of viewpoints from the image capturing unit 11 as free viewpoint data, the free viewpoint data generation unit 12 supplies the set of the viewpoint images and the depth images from the plurality of viewpoints from the image capturing unit 11 as free viewpoint data to the strobe image generation unit 13.

In a case of adopting a 3D model as free viewpoint data, the free viewpoint data generation unit 12 per modeling by Visual Hull or the like using the viewpoint images from the plurality of viewpoints and the depth images from the plurality of viewpoints from the image capturing unit 11. Then, the free viewpoint data generation unit 12 generates the 3D model of the subject shown in the viewpoint images, and supplies the 3D model (3D data including the 3D model) to the strobe image generation unit 13 as free viewpoint data. Note that, when the viewpoints of the depth images from the image capturing unit 11 are different from the viewpoints of the viewpoint images from the image capturing unit 11, the free viewpoint data generation unit 12 uses the depth images from the plurality of viewpoints from the image capturing unit 11 to generate depth images from the viewpoints of the viewpoint images from the image capturing unit 11.

In a case of adopting a set of 2D images and depth images as free viewpoint data from a plurality of viewpoints, the free viewpoint data generation unit 12 generates a 3D model of the subject shown in the viewpoint images as described above, and generates a set of 2D images and depth images of the 3D model viewed from a plurality of viewpoints (the same viewpoints as those of the cameras constituting the image capturing unit 11 or different viewpoints). Then, the free viewpoint data generation unit 12 supplies the set of 2D images and depth images from the plurality of viewpoints generated from the 3D model as free viewpoint data to the strobe image generation unit 13.

Hereinafter, for simplification of the description, a 3D model (3D data including the 3D model) will be adopted as the free viewpoint data unless otherwise specified.

Note that the amount of free viewpoint data can be reduced by adopting not 3D model but a set of 2D images and depth images from a plurality of viewpoints generated from the 3D model as the free viewpoint data. WO 2017/082076 presented by the present applicant describes a technique for generating and transmitting a set of 2D images and depth images from a plurality of viewpoints from a 3D model. In a case of generating a set of 2D images and depth images from a plurality of viewpoints from a 3D model, the set of 211 images and depth images from the plurality of viewpoints can be encoded by, for example, a coding method targeted for 2D images such as multiview and depth video coding (MVCD), advanced video coding (AVC), or high efficiency video coding (HEVC), for example.

Here, the 3D model (the expression form thereof) can be roughly divided into a model called view independent (hereinafter also called VI model) and a model called view dependent (hereinafter also called VD model).

The VD model is a 3D model in which a 3D shape model as information of a three-dimensional shape and information of an image to be a texture are separated. In the VD model, a 3D shape model is colored by mapping (texture mapping) an image to be a texture. According to the VD model, it is possible to express the degree of reflection on the surface of the subject as a VD model different depending on the (virtual) viewpoint.

The VI model is a 3D model in which polygons and points as constituent elements of the 3D shape model have color information. Examples of a VI model include a colored point cloud and a set of a 3D shape model and a DV map as color information of the 3D shape model, for example. According to the VI model, the colors possessed by polygons and points can be observed from any (virtual) viewpoint.

The strobe image generation unit 13 uses a 3D model as free viewpoint data of the 3D image from the free viewpoint data generation unit 12 to generate free viewpoint data of the strobe image of the 3D image in which the 3D models of the same subject at a plurality of times (frames) are shown (arranged), and supplies the free viewpoint data to the effect processing unit 14.

Here, the strobe image is an image showing one or more same subjects (images) captured at a plurality of times. The strobe image that shows the subject shown in the 2D image is also called 2D strobe image, and the strobe image of the 3D model of the subject is also called 3D strobe image. The strobe image generation unit 13 generates a 3D strobe image. Here, the 3D image means an image spreading three-dimensionally, in other words, an image spreading in a depth direction as well as in the horizontal and vertical directions.

Note that, in a case where free viewpoint data includes viewpoint images and depth images from a plurality of viewpoints, or 2D images and depth images from a plurality of viewpoints, for generation of a strobe image, modeling is performed for each of a plurality of frames used for the generation to individually generate 3D models of the subject shown in the plurality of frames. Then, the 3D models in the plurality of frames are combined with a background image (a three-dimensional space as the background image) to generate a strobe image. Otherwise, silhouette images of the subject shown in the plurality of frames are combined, and modeling is performed using a composite silhouette image obtained by the combination, thereby to generate a composite 3D model by combining 3D models of the subject shown in the plurality of frames. Then, the composite 3D model is combined with the background image to generate a strobe image.

The effect processing unit 14 performs an effect process on the 3D model seen in the strobe image in the free viewpoint data supplied from the strobe image generation unit 13, and supplies the free viewpoint data of the strobe image having undergone the effect process to the free viewpoint image generation unit 15.

Here, in the image processing system, a virtual viewpoint is set according to the user's operation, and is supplied to the effect processing unit 14, the free viewpoint image generation unit 15, and other necessary blocks. The effect processing unit 14 can perform an effect process on 3D models at predetermined times among the 3D models at a plurality of times (frames) shown in the strobe image, for example, one or both 3D models in the past and future with reference to a reference 3D model at a time when the latest virtual viewpoint is set. As the reference 3D model, instead of the 3D model of the time at which the latest virtual viewpoint is set, a 3D model specified by the user can be adopted.

Note that the effect processing unit 14 can supply the free viewpoint data from the strobe image generation unit 121 to the free viewpoint image generation unit 15 without performing an effect process, for example, according to the user's operation or the like. Furthermore, the strobe image generation unit 13 can supply the free viewpoint data from the free viewpoint data generation unit 12 to the effect processing unit 14 without generating a strobe image, for example, according to the user's operation or the like. When the strobe image generation unit 13 does not generate a strobe image, the effect processing unit 14 supplies the free viewpoint data from the strobe image generation unit 121 to the free viewpoint image generation unit 15 without performing an effect process.

The free viewpoint image generation unit 15 uses the free viewpoint data from the effect processing unit 14, for example, to generate 2D images (data) in which a three-dimensional space captured by the image capturing unit 11 is viewed from virtual viewpoints such as 2D images in which a three-dimensional space shown in the strobe image in which the 3D model has undergone the effect process is viewed from virtual viewpoints (here, including a set of a left-eye 2D image and a right-eye 2D image) as free viewpoint images (data), and supplies the free viewpoint images to the display unit 16.

The display unit 16 includes, for example, a 2D head-mounted display, a 2D monitor, a 3D head-mounted display, a 3D monitor, and the like, and displays the free viewpoint image from the free viewpoint image generation unit 15. A 3D head-mounted display or monitor is, for example, a display device that presents stereoscopic vision by displaying a left-eye 2D image and a right-eye 2D image.

Note that the image processing system can be formed, for example, from a server client system including a client, a cloud server, and the like. In this case, some or all of the free viewpoint data generation unit 12 to the free viewpoint image generation unit 15 can be provided in the cloud server. The client can be provided with the remainder of the free viewpoint data generation unit 12 to the free viewpoint image generation unit 15, and the display unit 16. The image capturing unit 11 can be disposed at an arbitrary place, and the viewpoint image and the like output by the image capturing unit 11 can be transmitted to the free viewpoint data generation unit 12.

According to the image processing system configured as described above, for example, scenes of various sports such as soccer, rugby, baseball, wrestling, boxing, judo, golf, tennis, and gymnastics are captured as viewpoint images, and a strobe image showing a 3D model of a specific subject such as a specific player can be generated. In this case, the strobe image showing a 3D model of a specific player can be used for sports analysis such as analysis of the motion of that specific player.

Figure 2:
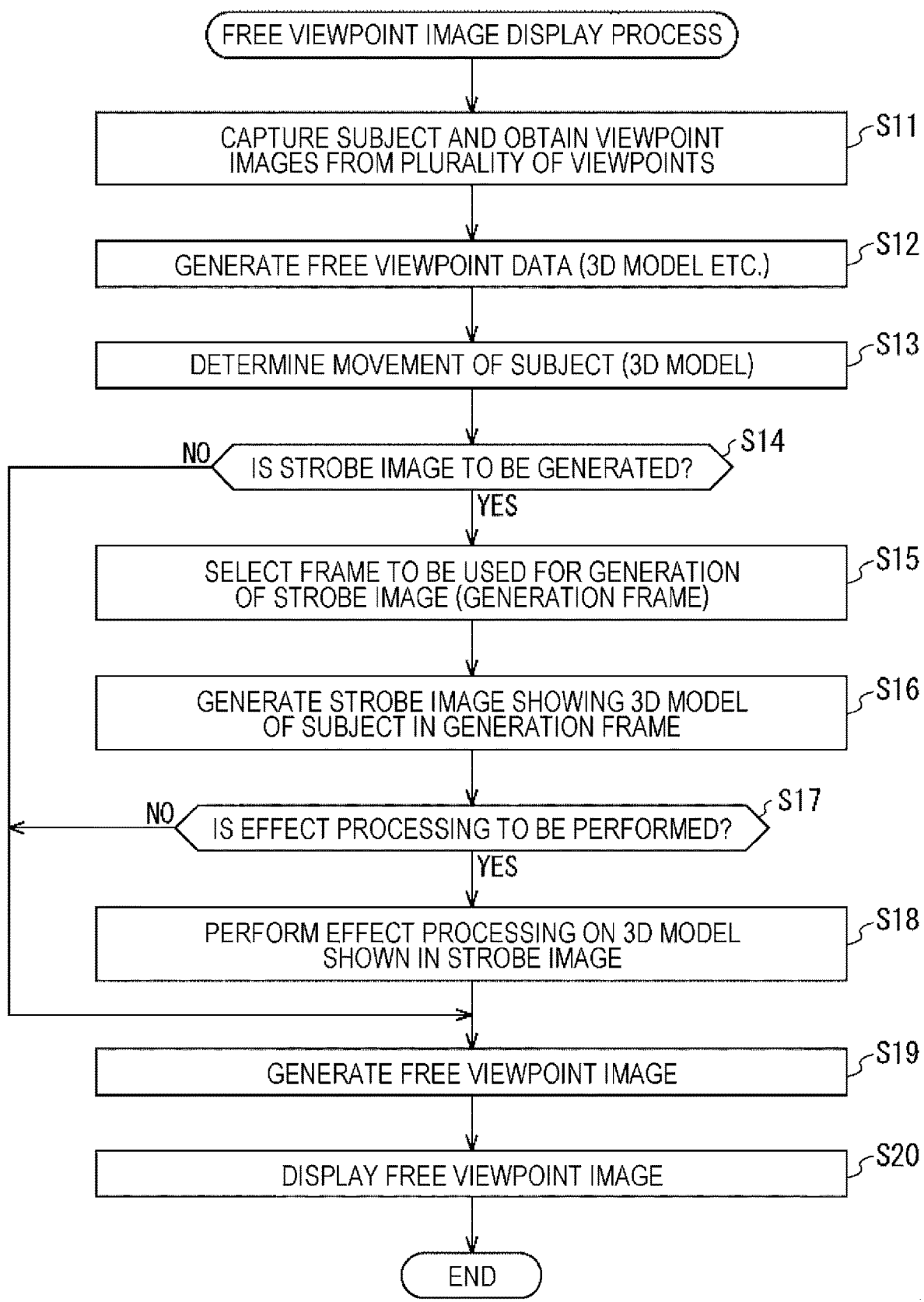
FIG. 2 is a flowchart of an example of a free viewpoint image display process of displaying a free viewpoint image performed by the image processing system.

FIG. 2 is a flowchart of an example of a free viewpoint image display process of displaying a free viewpoint image performed by the image processing system illustrated in FIG. 1.

In free viewpoint image display process, in step S11, the image capturing unit 11 photographs a subject from a plurality of viewpoints, and obtains viewpoint images and depth images from the plurality of viewpoints on a frame-by-frame basis. The image capturing unit 11 supplies the viewpoint images and depth images from the plurality of viewpoints to the free viewpoint data generation unit 12, and the process proceeds from step S11 to step S12.

In step S12, the free viewpoint data generation unit 12 uses the viewpoint images and depth images from the plurality of viewpoints from the image capturing unit 11 to perform modeling of the subject shown in the viewpoint images, thereby to generate a 3D model of the subject or the like as free viewpoint data, for example, on a frame-by-frame basis. The free viewpoint data generation unit 12 supplies the 3D model of the subject (and 3D data including the background image) as free viewpoint data to the strobe image generation unit 13, and the process proceeds to step S13.

In step S13, the strobe image generation unit 13 determines the motion of the subject that is a 3D model as the free viewpoint data from the free viewpoint data generation unit 12, and the process proceeds to step S14.

In step S14, the strobe image generation unit 13 determines whether to generate a strobe image.

Here, the determination as to whether to generate a strobe image in step S14 is made, for example, according to the motion of the subject determined in step S13. When the subject makes no motion, a strobe image showing 3D models of the subject at a plurality of times with no motion may be difficult to view because the 3D models of the subject at a plurality of times are shown at substantially the same position. Therefore, in step S14, in a case where the subject makes no motion, it is determined that the strobe image is not to be generated, and in a case where the subject makes any motion, it is determined that the strobe image is to be generated.

Note that the determination as to whether to generate a strobe image in step S14 can be made according to, for example, the user's operation.

When it is determined in step S14 that a strobe image is not to be generated, the strobe image generation unit 13 and the effect processing unit 14 supply free viewpoint data to the free viewpoint image generation unit 15 without performing processing. Then, the process proceeds from step S14 to step S19 skipping steps S15 to S18.

In this case, step S19, the free viewpoint image generation unit 15 uses the free viewpoint data from the effect processing unit 14 to generate, as free viewpoint images, 2D images of the 3D models as free viewpoint data viewed from the virtual viewpoints. Then, the free viewpoint image generation unit 15 supplies the free viewpoint images to the display unit 16, and the process proceeds from step S19 to step S20.

In step S20, the display unit 16 displays the free viewpoint images from the free viewpoint image generation unit 15. In this case, the display unit 16 displays images showing the 3D model of the subject viewed from the virtual viewpoint.

On the other hand, when it is determined in step S14 that a strobe image is to be generated, the process proceeds to step S15.

In step S15, the strobe image generation unit 13 selects a frame (hereinafter also referred to as a generation frame) to be used for generation of a strobe image from among the frames of the 3D model supplied from the free viewpoint data generation unit 12, and the process proceeds to step S16.

Here, in the generation of a strobe image, in a frame sequence of a viewpoint image showing a subject to be a 3D model, the first frame (time) and the last frame of the subject that can be shown in the strobe image are set in response to a user's operation and the like. Assuming that the section from the first frame to the last frame of the subject that can be seen in the strobe image is a strobe section, if all frames of the strobe section are used as generation frames for generating a strobe image, the strobe image may become difficult to view because the same number of 3D models of the same subject as the number of frames of the strobe section overlap.

Therefore, the strobe image generation unit 13 selects several frames as generation frames from the frames of the strobe section, and uses the generation frames (the 3D models of the subject shown in the generation frames) to generate the strobe image (free viewpoint data).

For example, the strobe image generation unit 13 can select, as generation frames, frames in which the degree of interference between the 3D models is equal to or less than a threshold from the frames of the strobe section, for example. In other words, the strobe image generation unit 13 calculates the degree of interference indicating the degree of overlap between the 3D models of the subject in the three-dimensional space in which the subject is shown in the frames of the strobe section. The degree of interference is calculated, for example, as 100% in a case where 3D models in two arbitrary frames completely overlap in the three-dimensional space, and as 0% in a case where the 3D models do not overlap at all. Then, the strobe image generation unit 13 selects frames of which the degree of interference is equal to or less than a predetermined threshold, such as 0 to 10%, as generation frames. As described above, selecting frames of which the degree of interference between the 3D models is equal to or less than a threshold as generation frames from the frames of the strobe section and generating a strobe image showing the 3D models in the generation frames makes it possible to suppress the strobe image from becoming difficult to view with the 3D models overlapping.

Note that, in the selection of generation frames, for example, frames of the strobe section can be simply selected for each predetermined number of frames.

In step S16, the strobe image generation unit 13 generates a strobe image in which 3D models in a plurality of generation frames selected from the frames of the strobe section are shown in a background image of a three-dimensional space showing the subject of the 3D models. Then, the strobe image generation unit 13 supplies the strobe image to the effect processing unit 14, and the process proceeds from step S16 to step S17. Here, when only one subject is shown in a plurality of generation frames, the strobe image generation unit 13 generates a strobe image showing the 3D model of the one subject. Furthermore, when a plurality of subjects is shown in a plurality of generation frames, the strobe image generation unit 13 can generate a strobe image showing a 3D model of each of the plurality of subjects. However, when a plurality of subjects is shown in a plurality of generation frames, the strobe image generation unit 13 can generate a strobe image showing 3D models of one or two or more subjects specified by the user, for example, among the plurality of subjects shown in the plurality of generation frames.

In step S17, the effect processing unit 14 determines whether to perform an effect process on the 3D models of the strobe image from the strobe image generation unit 13 (3D models shown in the strobe image). The determination as to whether to generate a strobe image in step S17 can be made, for example, according to the user's operation.

When it is determined in step S17 that an effect process is not to be performed, the effect processing unit 14 supplies the strobe image from the strobe image generation unit 13 to the free viewpoint image generation unit 15 without performing an effect process. Then, the process proceeds from step S17 to step S19 skipping step S18.

In his case, step S19, the free viewpoint image generation unit 15 generates, as free viewpoint images, 2D images in which the strobe image from the effect processing unit 14 is viewed from virtual viewpoints. Then, the free viewpoint image generation unit 15 supplies the free viewpoint images to the display unit 16, and the process proceeds from step S19 to step S20.

In step S20, the display unit 16 displays the free viewpoint images from the free viewpoint image generation unit 15. In this case, the display unit 16 displays 2D images showing 3D models of the subject in the plurality of generation frames viewed from virtual viewpoints (2D images in which the 3D strobe image is viewed from virtual viewpoints).

On the other hand, when it is determined in step S17 that an effect process is to be performed, the process proceeds to step S18.

In step S18, the effect processing unit 14 performs an effect process on, among the 3D models at a plurality of times (generation frames) shown in the strobe image from the strobe image generation unit 13, 3D models in either or both of the past and future with reference to a reference 3D model at a time when the latest virtual viewpoint is set. Then, the effect processing unit 14 supplies the strobe image having undergone the effect process (showing the 3D models) to the free viewpoint image generation unit 15, and the process proceeds from step S18 to step S19.

In this case, in step S19, the free viewpoint image generation unit 15 generates, as a free viewpoint image, 2D images in which the strobe image after the effect process from the effect processing unit 14 is viewed from virtual viewpoints. Then, the free viewpoint image generation unit 15 supplies the free viewpoint images to the display unit 16, and the process proceeds from step S19 to step S20.

In step S20, the display unit 16 displays the free viewpoint images from the free viewpoint image generation unit 15. In this case, the display unit 16 displays the 2D images in which the 3D models of the subject in the plurality of generation frames viewed from the virtual viewpoints are shown and some of the 3D models have undergone the effect process (the 2D images in which the 3D strobe image having undergone the effect process is viewed from the virtual viewpoints).

As described above, performing an effect process on the 3D model makes it possible to provide an easily viewable image. In particular, for example, performing an effect process on some or all of the 3D models of the same subject at a plurality of times shown in the strobe image makes it possible to provide an easily viewable strobe image. Note that, here, for the ease of understanding the description, a (3D) strobe image is generated, and then an effect process is performed on 3D models shown in the strobe image. However, the generation of a strobe image and the execution of the effect process on 3D models shown in the strobe image can be performed in parallel or in order changed as appropriate. For example, in the image processing system, after the effect process on 3D models, a strobe image showing the 3D models having undergone the effect process can be generated.

<Generation of a Strobe Image>

Figure 3:
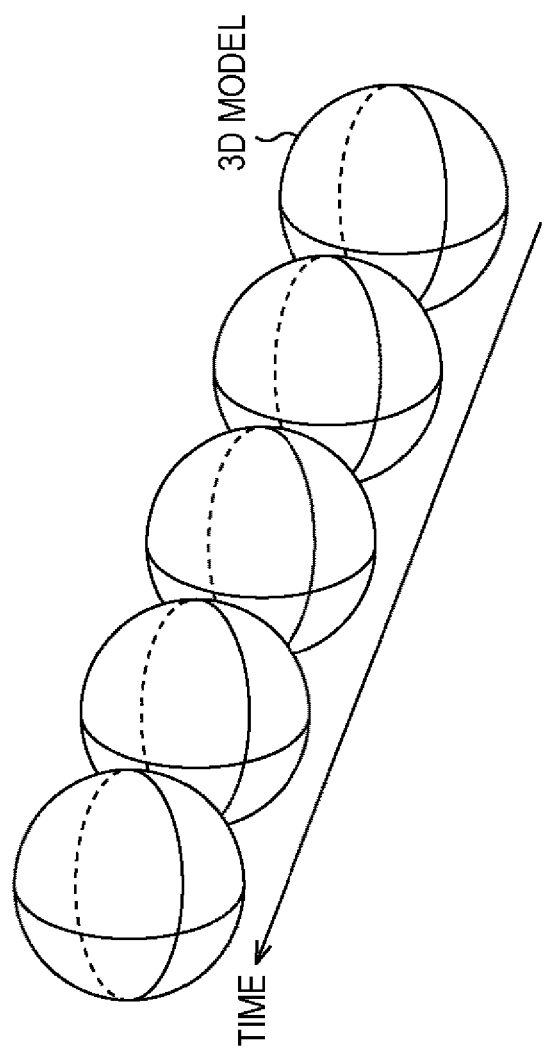
FIG. 3 is a diagram illustrating an example of an unnatural free viewpoint image.

FIG. 3 is a diagram illustrating an example of an unnatural free viewpoint image.

FIG. 3 illustrates an example of a free viewpoint image that is generated from a (3D) strobe image generated using five frames as generation frames among the frames of a viewpoint image showing a ball as a subject rolling from the near to far sides.

In FIG. 3, the 3D models of the ball shown in the five generation frames are arranged (rendered) so as to give priority to the later 3D models. Therefore, the later (ball) 3D models are arranged to hide the earlier 3D models in spite of being located on the near side. As a result, the free viewpoint image illustrated in FIG. 3 is an unnatural image.

Figure 4:
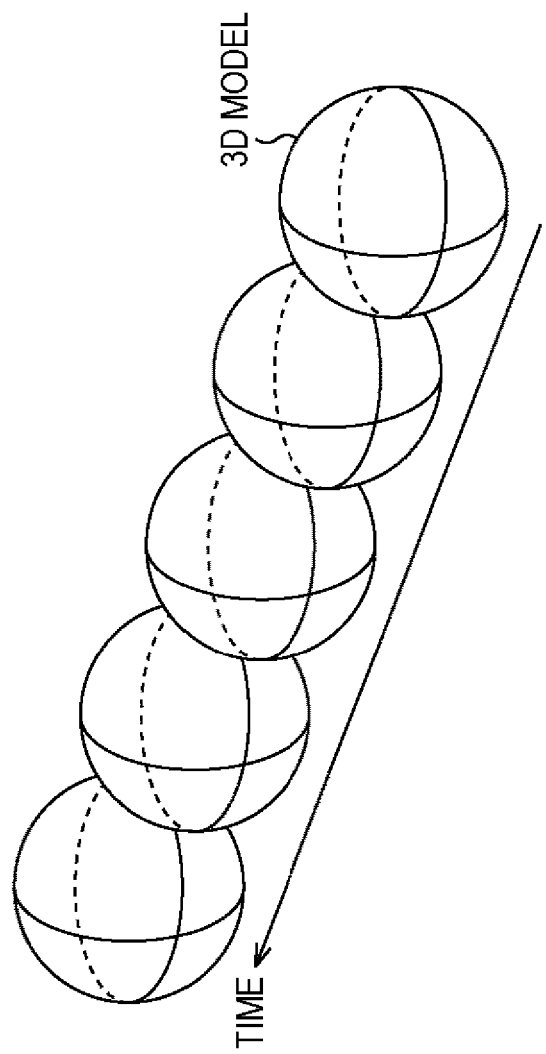
FIG. 4 is a diagram illustrating an example of a natural free viewpoint image.

FIG. 4 is a diagram illustrating an example of a natural free viewpoint image.

FIG. 4 illustrates an example of a free viewpoint image that is generated from a (3D) strobe image generated using five frames as Generation frames among the frames of a viewpoint image showing a ball as a subject rolling from the near to far sides.

In FIG. 4, the 3D models of the ball shown in the five generation frames are arranged to give priority to the 3D models on the near side. Therefore, the 3D models on the near side are arranged to hide the 3D models on the far side, in other words, the 3D models on the near side are displayed on a priority basis. As a result, the free viewpoint image is a natural image.

The strobe image generation unit 13 generates a strobe image using depths in which the 3D models on the near side are shown in the free viewpoint image on a priority basis as described above.

Figure 5:
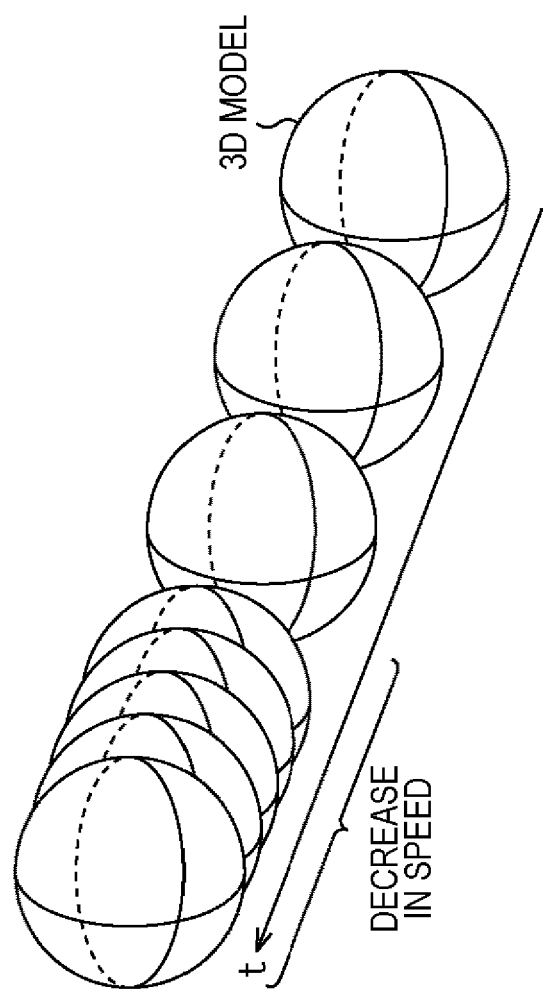
FIG. 5 is a diagram illustrating an example of a strobe image generated by selecting a generation frame for each predetermined number of frames in a strobe section.

FIG. 5 is a diagram illustrating an example of a strobe image generated by selecting a generation frame for each predetermined number of frames in a strobe section.

FIG. 5 illustrates an example of a strobe image generated using eight frames as Generation frames among the frames of a viewpoint image showing a ball as a subject rolling from the near to far sides.

In the case of selecting a generation frame for each predetermined number of frames in the strobe section and generating a strobe image using the generation frames, when the moving speed of the subject changes, the distance between the 3D models of the subject shown in the strobe image changes. For example, as illustrated in FIG. 5, when the moving speed of the subject decreases from a certain speed, the distance between the 3D models becomes narrow, and the degree of overlapping between the 3D models becomes large, which may make the strobe image difficult to view.

As described above with reference to FIG. 2, selecting frames of which the degree of interference between 3D models is equal to or less than a threshold from the frames of the strobe section makes the distance between the 3D models of the subject narrow with a change in the moving speed of the subject, thereby suppressing the strobe image from becoming difficult to view.

Note that, whether to select the frames of which the degree of interference between 3D models among the frames in the strobe section as generation frames or selecting a frame for each predetermined number of frames as a generation frame can be set according to the user's operation, for example.

<Viewpoint Image>

Figure 6:
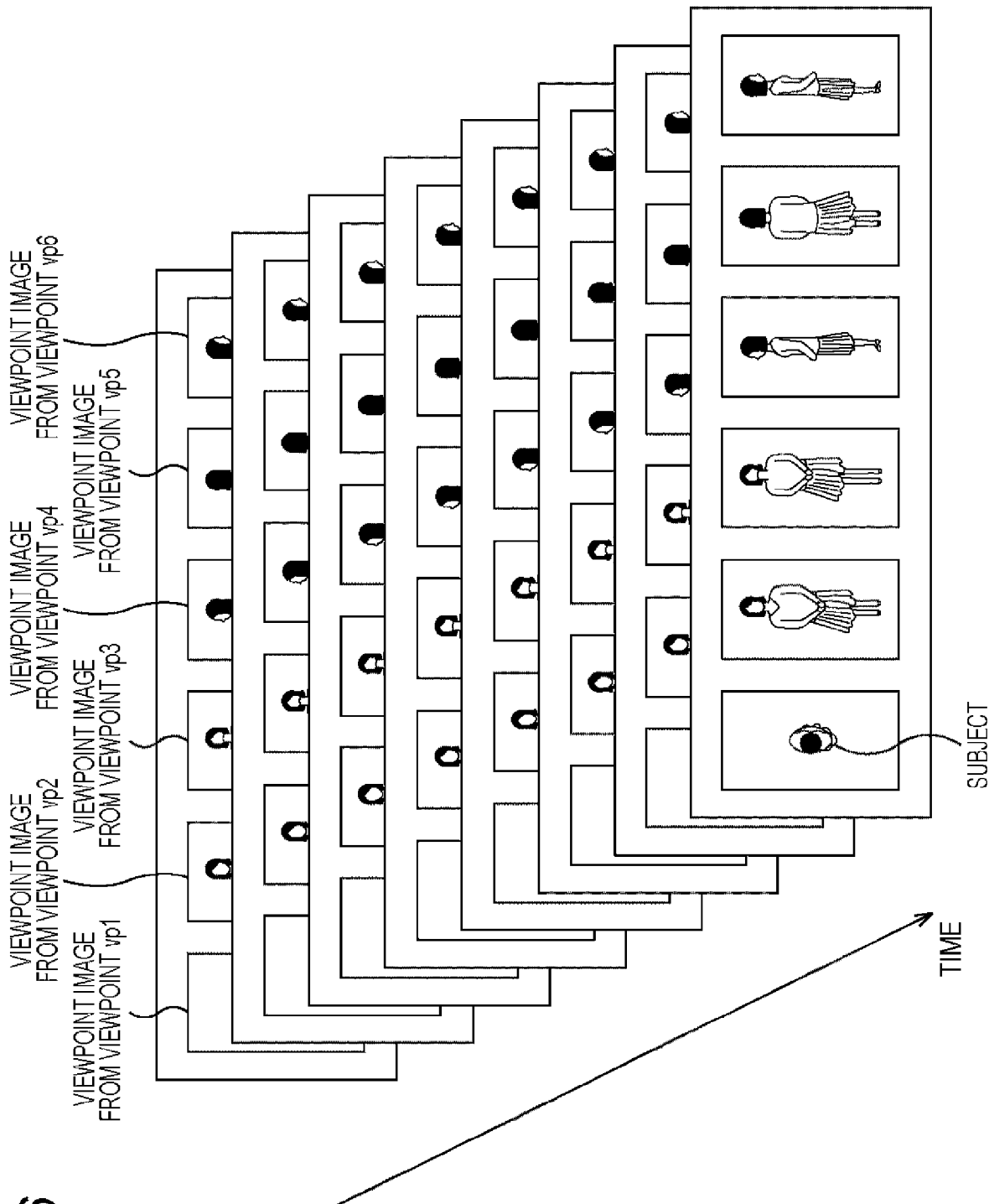
FIG. 6 is a view schematically illustrating an example of viewpoint images from a plurality of viewpoints obtained by an image capturing unit 11.

FIG. 6 is a view schematically illustrating an example of viewpoint images from a plurality of viewpoints obtained by the image capturing unit 11.

Referring to FIG. 6, the image capturing unit 11 includes six cameras that are arranged to surround a person as a subject. The cameras can be arranged around the subject or on the ceiling. The six cameras synchronously photograph the subject, and each of the cameras outputs a 2D image obtained as a result of the photographing as a viewpoint image from the position of the camera as viewpoint vp#i. The viewpoint vp#i is the position of the i-th camera among the six cameras constituting the image capturing unit 11.

FIG. 6 illustrates eight frames (times) of viewpoint images from six viewpoints vp1 to vp6 output from the six cameras.

Besides the viewpoint images (frames) from the six viewpoints vp1 to vp6 as described above, for example, the free viewpoint data generation unit 12 generates 3D models of the subject shown in the viewpoint images using depth images from the six viewpoints vp1 to vp6 and camera parameters of the six cameras constituting the image capturing unit 11. [0086]

In other words, the free viewpoint data generation unit 12 obtains a silhouette image of the subject shown in the viewpoint image from the viewpoint vp#i, using a difference in foreground and background of the viewpoint image from the viewpoint vp#i, for example. Then, using the silhouette image from the viewpoint vp#i, the viewpoint image and the depth image from the viewpoint vp#i, and the camera parameters, the free viewpoint data generation unit 12 performs modeling of the subject shown in the viewpoint image by Visual Hull or the like to generate a 3D model of the subject.

Here, the camera parameters of the six cameras constituting the image capturing unit 11 include information such as the focal lengths of the cameras, the positional relationship between the cameras, the postures of the cameras, and the distortions of the lenses included in the cameras.

Furthermore, the difference in foreground and background for obtaining the silhouette image can be determined by taking the difference between the background of the viewpoint image from the viewpoint vp#i and the viewpoint image from the viewpoint vp#i. The background of the viewpoint image from the viewpoint vp#i can be generated by photographing a three-dimensional space in the absence of the subject, or by using a plurality of frames of viewpoint images from the viewpoint vp#i different in the position of the subject.

<Determination on the Motion of a Subject>

Figure 7:
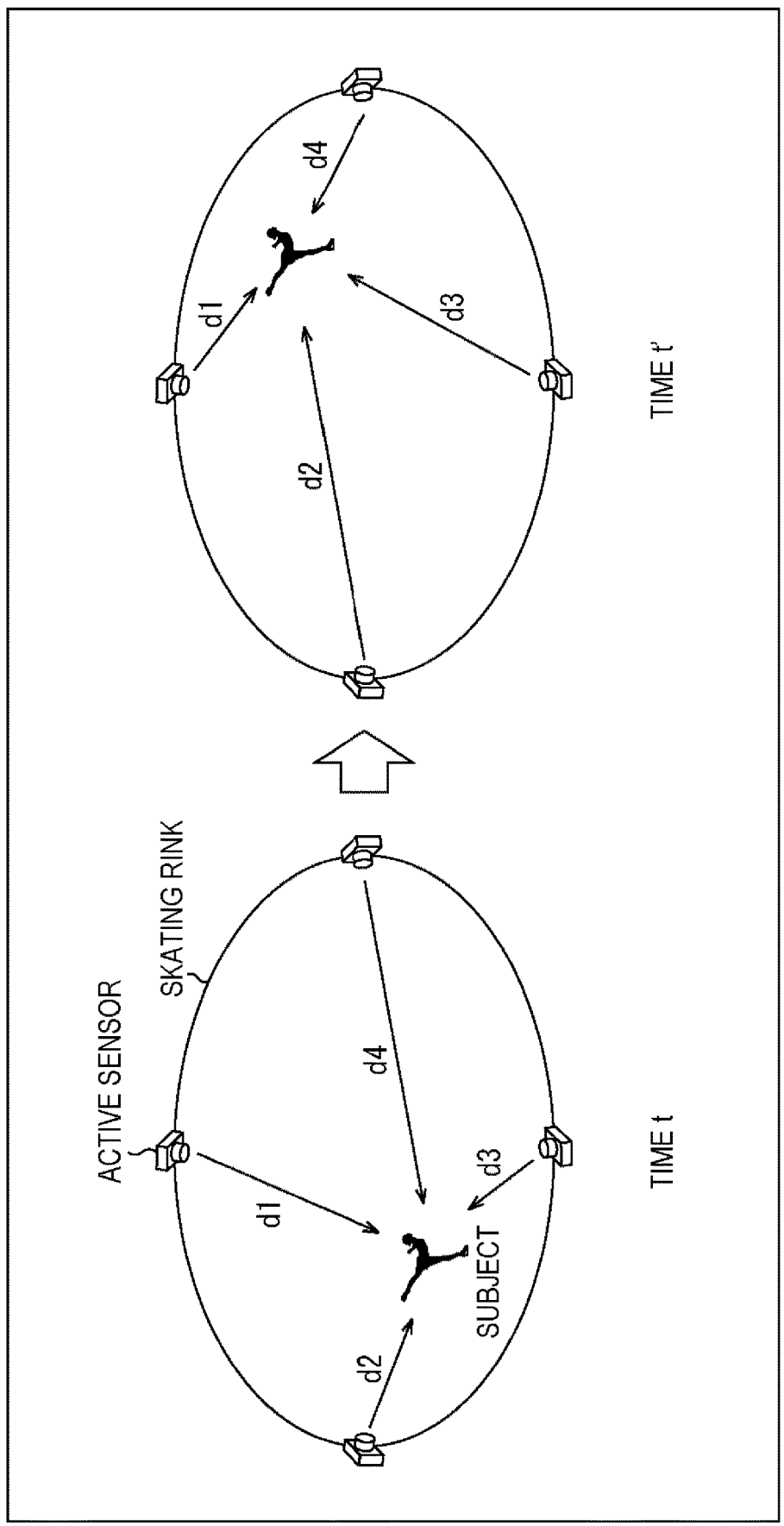
FIG. 7 is a diagram describing a first determination method for deter mining the motion of a subject by a strobe image generation unit 13.
Figure 8:
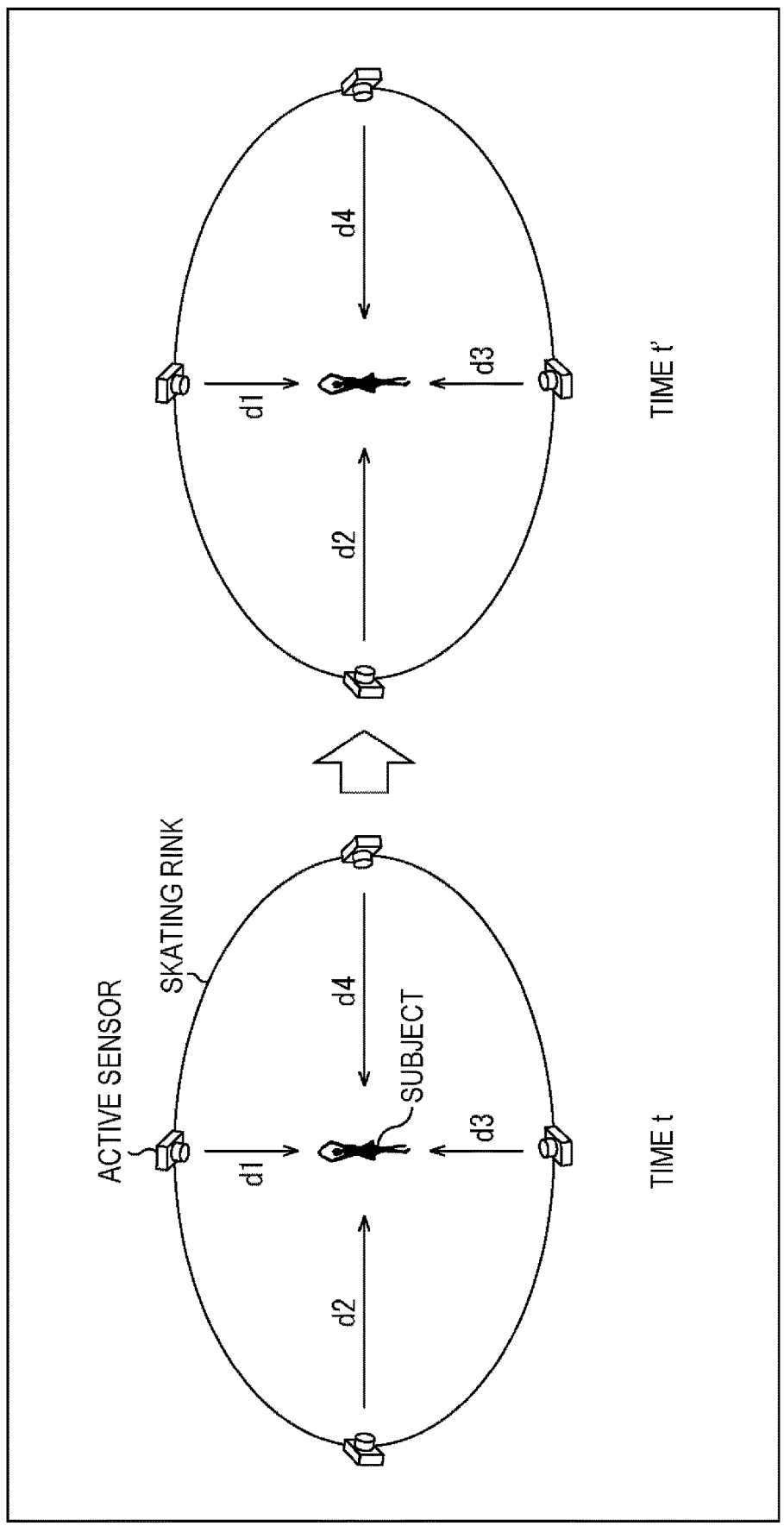

FIGS. 7 and 8 are diagrams describing a first determination method for determining the motion of a subject by the strobe image generation unit 13.

FIG. 7 illustrates a case where it is determined that the subject is moving by the first determination method. FIG. 8 illustrates a case where it is determined that the subject is not moving by the first determination method.

Referring to FIGS. 7 and 8, a skater as the subject is sliding in a skating rink. When having an active sensor such as a time of fright (TOF) sensors or a light detection and ranging (LiDAR) sensor as a distance measuring device in addition to a plurality of cameras, the image capturing unit 11 can determine the movement of the subject according to a distance d#j to the subject measured by the active sensor. The distance d#j represents the distance to the subject measured by the j-th active sensor among a plurality of active sensors.

Referring to FIGS. 7 and 8, four active sensors are provided around the skating rink. In the determination of the movement of the subject, the strobe image generation unit 13 compares distances d1, d2, d3, and d4 measured at time (frame) t by the four active sensors to distances d1, d2, d3 and d4 measured at a time different from time t, for example, time t' after time t.

Then, as illustrated in FIG. 7, when one or more of the distances d1 to d4 differ (change) by a predetermined threshold or more between time t and time t', the strobe image generation unit 13 determines that there is movement of the subject.

On the other hand, as illustrated in FIG. 8, when none of the distances d1 to d4 differs by a predetermined threshold or more between time t and time t', the strobe image generation unit 13 determines that there is no movement of the subject.

Here, although the four active sensors are provided referring to FIGS. 7 and 8, four or more active sensors may be provided, or one active sensor may be provided.

Figure 9:
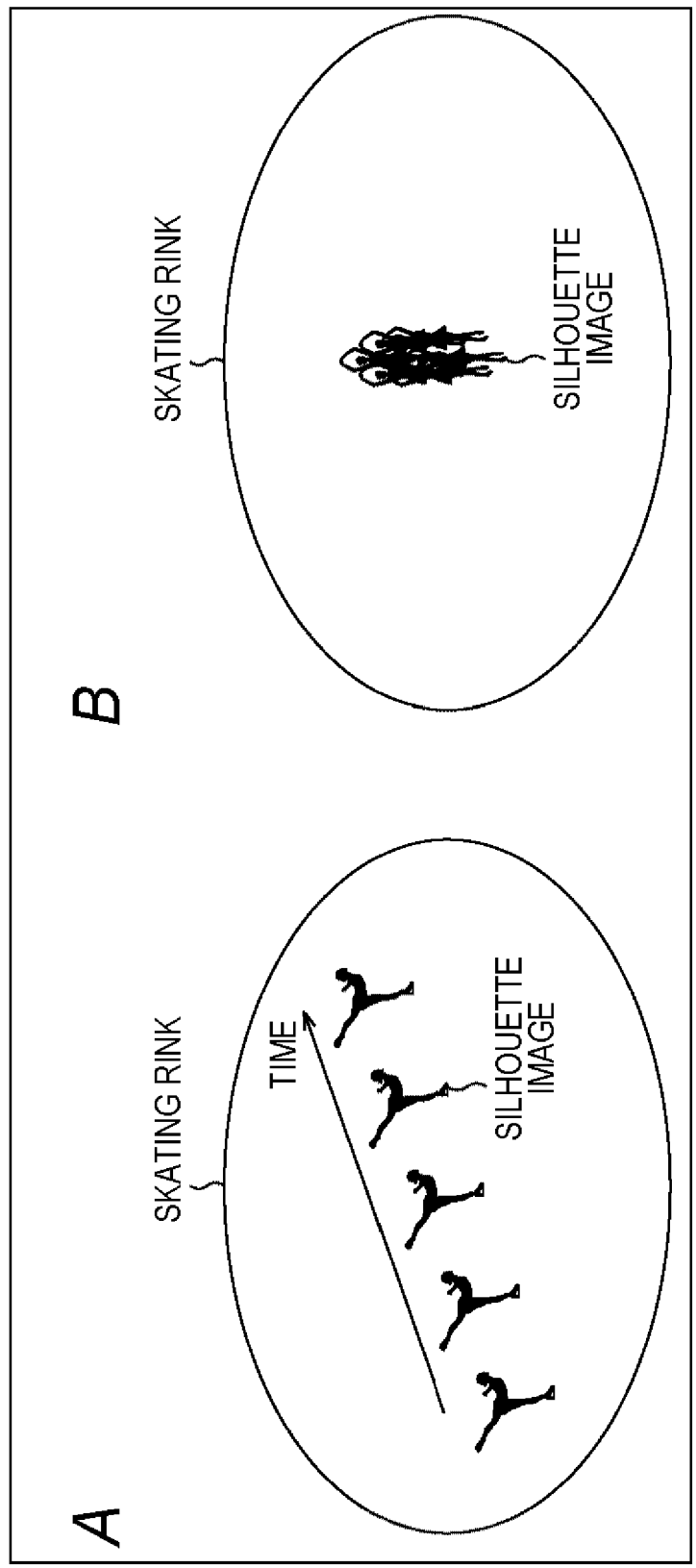
FIG. 9 is a diagram describing a second determination method for determining the motion of a subject by the strobe image generation unit 13.

FIG. 9 is a diagram describing a second determination method for determining the motion of a subject by the strobe image generation unit 13.

The second determination method is one of methods for determining the movement of the subject by the image capturing unit 11 without an active sensor.

In the second determination method, the strobe image generation unit 13 reduces the number of frames in a predetermined section such as the strobe section, for example, of a viewpoint image captured by any of the cameras constituting the image capturing unit 11 in such a manner as to leave several frames. Moreover, the strobe image generation unit 13 sets the several frames left after the frame reduction as determination frames for use in the determination of the movement of the subject, and generates silhouette images of the determination frames. Referring to FIG. 9, silhouette images are generated with five frames as determination frames.

The strobe image generation unit 13 detects an overlap between the silhouette images of two arbitrary frames out of the plurality of determination frames. Then, when there is no overlap between the silhouette images in any one or more combinations of two determination frames, for example, the strobe image generation unit 13 determines that there is movement of the subject.

On the other hand, when there is an overlap between the silhouette images in all the combinations of two determination frames, for example, the strobe image generation unit 13 determines that there is no movement of the subject.

FIG. 9A illustrates a case where there is no overlap between silhouette images in all combinations of any two frames among a plurality of determination frames. FIG. 9B illustrates a case where there is an overlap between the silhouette images in all combinations of any two frames among the plurality of determination frames.

As illustrated in FIG. 9A, when there is no overlap between the silhouette images, it is determined that there is movement of the subject, and as illustrated in FIG. 9B, when there is an overlap between the silhouette images, it is determined that there is no movement of the subject.

Figure 10:
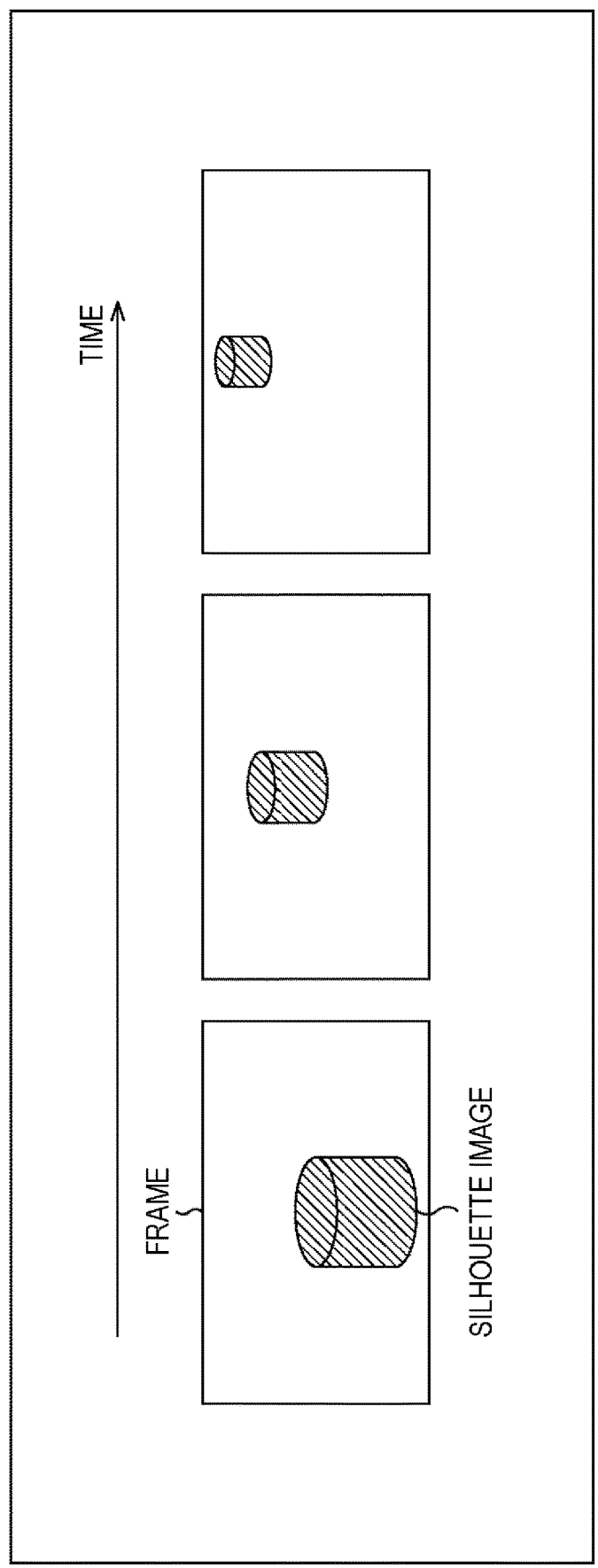
FIG. 10 is a diagram describing a third determination method for determining the motion of a subject by the strobe image generation unit 13.

FIG. 10 is a diagram describing a third determination method for determining the motion of a subject by the strobe image generation unit 13.

The third determination method is another one of methods for determining the movement of the subject by the image capturing unit 11 without an active sensor.

Assuming that the viewpoint images are captured through perspective projection by (the cameras of) the image capturing unit 11, in the viewpoint images, the subject on the far side is shown in a small size, and the subject on the near side is shown in a large size. Therefore, for example, when the subject is moving from the near side to the far side, the silhouette images of the subject become smaller in size as the subject moves to the far side, as illustrated in FIG. 10.

In the third determination method, the strobe image generation unit 13 detects the sizes of silhouette images of a subject shown in a plurality of determination frames. Then, for example, when the change in the size of the silhouette image is equal to or more than the threshold in any one or more combinations of two determination frames, the strobe image generation unit 13 determines that there is movement of the subject.

On the other hand, for example, when the change in the size of the silhouette images is not equal to or more than the threshold value in all combinations of two determination frames, the strobe image generation unit 13 determines that there is no movement of the subject.

Note that, according to the first to third determination methods, the movement of the subject can be determined before a 3D model of the subject is generated. Otherwise, the determination on the movement of the subject can be made, for example, after generating a depth image or after Generating a 3D model such as a point cloud or polygon, using the depth image or position information regarding the position of the 3D model a three-dimensional space.

Furthermore, when the subject is a person, feature points in the person's face to be used for face detection are detected from the viewpoint image, and the movement of the subject can be determined according to the positions of the feature points across frames in a predetermined section such as the strobe section.

Moreover, the motion vector of the subject is detected, and the movement of the subject can be determined according to the motion vector.

Furthermore, viewpoint images from some of viewpoints among viewpoint images from a plurality of viewpoints captured by the image capturing unit 11, for example, viewpoint images from four viewpoints captured by four cameras among viewpoint images from 3D viewpoints captured by 3D cameras are used to generate a simple 3D model of the subject shown in the viewpoint images, and (the position of) the 3D model can be used to determine the movement of the subject.

Moreover, in the image processing system, when a banding box surrounding one or more subjects shown in the viewpoint images is set, the movement of the subject can be determined according to the position of the banding box across the frames of a predetermined section such as the strobe section.

<Selection of Generation Frames>

FIG. 11 is a diagram describing an example of selection of a generation frame by the strobe image generation unit 3.

As described above with reference to FIG. 2, in order to suppress (the free viewpoint images generated from) the strobe image from becoming difficult to view due to an overlap between 3D models, the strobe image generation unit 13 selects frames of which the degree of interference between the 3D models is equal to or less than a threshold as generation frames from the frames of the strobe section, and can generate the strobe image showing the 3D models of the generation frames.

FIG. 11A illustrates a strobe image of a skater sliding in a skating rink with a threshold of 0%. Referring to FIG. 11A, since the threshold is 0%, the 3D models of the subject at individual times (generation frames) do not overlap in the strobe image.

FIG. 11B illustrates a strobe image of a skater sliding in a skating rink with a threshold of a small value that is greater than 0% (for example, 10% or so). In FIG. 11B, since the threshold value is a value greater than 0%, in the strobe image, some of the 3D models of the subject at individual times have somewhat overlap with adjacent 3D models.

Here, the image processing system illustrated in FIG. 1 can be applied to a transmission system that transmits free viewpoint data from the transmission side to the reception side and generates and displays a strobe image on the reception side. In this case, it is possible to transmit an interference flag representing interference that is an overlap between 3D models in a strobe image from the transmission side to the reception side. Then, on the reception side, it is possible to Generate a strobe image showing 3D models interfering (overlapping) or a strobe image showing 3D models not interfering according to the interference flag. As the interference flag, for example, a 1-bit flag representing the presence or absence of interference or a threshold of the degree of interference can be adopted.

Note that the image processing system can generate a strobe image according to the user's operation even when (it is determined that) there is no movement of the subject. When there is no movement of the subject, the degree of interference between the 3D models of the subject shown in the frames of the strobe section may increase at any of the frames and may not fall below the threshold. Therefore, to generate a strobe image when there is no movement of the subject, it is possible to select (a plurality of) generation frames for each predetermined number of frames from the frames of the strobe section.

In this case, however, the strobe image in which the 3D models of the subject shown in the plurality of generation frames are simply arranged is difficult to see because the 3D models overlap largely.

Therefore, to generate a strobe image when there is no movement of the subject, the strobe image generation unit 13 does not arrange the 3D models of the subject (the subject at a plurality of times) at original positions (the positions of the subject in the three-dimensional space) but can arrange the 3D models shifted from the original positions such that the degrees of interference become equal to or less than the threshold.

FIG. 12 is a diagram illustrating an example of a strobe image generated by shifting 3D models of a subject shown in a plurality of generation frames from original positions.

FIG. 12 illustrates that a skater as the subject is spinning at the center of a skating rink, and the skater as the subject hardly changes in position.

In this case, the strobe image generation unit 13 can generate a strobe image by shifting the 3D models of the subject (3D models at a plurality of times) shown in the plurality of generation frames shifted from the original positions such that the degrees of interference between the 3D models become equal to or less than the threshold.

Referring to FIG. 12, a strobe image in which 3D models of the subject shown in a plurality of generation frames are arranged in a circular shape in time order (of the generation frames), and a strobe image in which the 3D models are arranged in a linear shape are generated.

As described above, in the generation of a strobe image, shifting the 3D models of the subject shown in the plurality of generation frames from the original positions such that the degrees of interference between the 3D models becomes equal to or less than the threshold makes it possible to suppress the strobe image from becoming difficult to view with the 3D models overlapping largely.

<3D Models Targeted for Effect Process>

FIG. 13 is a diagram describing 3D models in a strobe image to be subjected to an effect process by the effect processing unit 14.

The effect processing unit 14 performs an effect process on, among the 3D models in a plurality of frames as a plurality of times selected from the frames of the strobe section, 3D models in either or both of the past and future with reference to a reference 3D model at a time when the latest virtual viewpoint is set.

Target models as 3D models to be subjected to an effect process are specified by an effect direction representing a time direction (past direction and future direction) with respect to the reference 3D model and an effect distance representing the degree of separation from the reference 3D model.

As the effect direction, a past direction "past", a future direction "future", or both the past direction "past" and the future direction "future" can be set.

When the past direction "past" is set as the effect direction, an effect process is performed on the 3D models in the past direction from the reference 3D model. When the future direction "future" is set as the effect direction, an effect process is performed on the 3D models in the future direction from the reference 3D model. When the past direction "past" and the future direction "future" are set as the effect direction, an effect process is performed on the 3D models in the past direction and the 3D models in the future direction from the reference 3D model.

The effect distance can be specified by the number of the 3D models "number", the distance "distance", or the time "time" from the reference 3D model.

According to the number of models "number", among 3D models shown in a strobe image, in other words, among 3D models shown in generation frames to be used to generate a strobe image, 3D models separated from the reference 3D model by the number of models "number" or more can be specified as target models.

According to the distance "distance", among 3D models shown in a strobe image, 3D models separated from the reference 3D model by the distance "distance" or more can be specified as target models.

According to the time "time", among 3D models shown in a strobe image, 3D models separated from the reference 3D model by the time "time" or more can be specified as target models.

The effect processing unit 14 performs an effect process on 3D models separated from the reference 3D model in a strobe image by the number of models "number", the distance "distance", or the time "time" or more, in the past direction or the future direction or in the both past direction and future direction.

Hereinafter, for simplification of the description, it is assumed that an effect process is performed on 3D models separated in the past direction from the reference 3D model, unless otherwise specified.

Here, when the strobe section is long and a large number of frames is selected as generation frames, a strobe image is generated using the large number of 3D models.

The strobe image generated using the large number of 3D models may be difficult to view.

For example, in a strobe image generated using a large number of 3D models, among 3D models of a predetermined subject shown in the strobe image, 3D models preceding the reference 3D model by a specific time or more may be a hindrance (for viewing) to following (future) 3D models and 3D models of other subjects.

Furthermore, in a strobe image generated using a number of 3D models, in a case where the subject moves along similar trajectories, for example, in a case where the subject performs a giant swing (backward swing or forward swing) on a horizontal bar, the temporally preceding (past) 3D models and the temporally following 3D models have similar trajectories, which may make the time course difficult to understand.

Moreover, in a strobe image generated using a large number of 3D models, the data amount of the 3D models becomes large, and the amount of processing required to display (free viewpoint images generated from) the strobe images becomes large.

The effect processing unit 14 performs an effect process on 3D models shown in a strobe image to make the strobe image easily viewable, and reduces the data amount of the strobe image and the amount of processing required to display the strobe image.

<Specific Examples of Effect Processes>

FIG. 14 is a diagram describing specific examples of effect processes.

Referring to FIG. 14, there are effect processes represented by effect modes 0, 1, 2, 3, 4, 5, 6, 7, 8, 9, and 10. In the effect modes 1 to 10, the effect direction and the effect distance described above with reference to FIG. 13 can be set.

Note that when the effect direction is not set, an effect process is performed on the assumption that the past direction "past" is set as the effect direction by default, for example.

The effect distance is specified by the number of the 3D models "number", the distance "distance", or the time "time" from the reference 3D model as described above with reference to FIG. 13. For example, when the effect direction is set to the past direction "past" and the effect distance is set to the number of models "number"=1, the effect process represented in the effect mode is performed on the target 3D models separated from the reference 3D model by the number of models "number"=1 or more in the past direction.

The effect mode 0 represents that no effect process is performed.

The effect mode 1 represents an effect process to transparentize 3D models. In the effect process in the effect mode 1, the target models can be all transparentized at the same degree of transparency, or can be gradually transparentized, that is, 3D models (target models) more separated in time or distance from the reference 3D model can be transparentized at higher degrees of transparency. How to transparentize 3D models can be specified by, for example, a parameter defined in association with the effect mode 1. Note that, at the degree of transparency of 100%, the target models are completely transparent. In this case, the result of the effect process in the effect mode 1 is substantially similar to the effect mode 4 described later.

The effect mode 2 represents an effect process to cause 3D models to disappear gradually.

The effect mode 3 represents an effect process to reduce the number of textures (the number of 2D images used as textures) of 3D models. in the effect process in the effect mode 3, the numbers of textures of the target models can be all decreased to the same number, or can be gradually decreased, that is, 3D models more separated in time or distance from the reference 3D model can be more decreased in the number of textures. How to decrease the number of textures of 3D models can be specified by, for example, a parameter defined in association with the effect mode 3.

The effect process in the effect mode 3 is to be performed on 3D models to be subjected to texture mapping, in other words, VD models, and is not to be performed on VI models not to be subjected to texture mapping.

The effect mode 4 represents an effect process to erase 3D models.

The effect mode 5 represents an effect process to reduce at least one of the luminance and the saturation of 3D models. In the effect process in the effect mode 5, the luminance and saturation of the target models can be all reduced at the same ratio, or can be gradually reduced, that is, 3D models more separated in time or distance from the reference 3D model can be reduced in the luminance and saturation at a higher ratio. How to reduce the luminance and saturation of 3D models and which of the luminance and saturation to be reduced can be specified by, for example, a parameter defined in association with the effect mode 5.

The effect mode 6 represents an effect process to limit the number of 3D models shown in a strobe image. In the effect process in the effect mode 6, the 3D models to be shown in the strobe image are limited to only the 3D models other than the target models among the D models in the generation frames.

The effect mode 7 represents an effect process to turn 3D models into low polygons, that is, an effect process to reduce the number of meshes (the number of polygons) of the 3D models. In the effect process in the effect mode 7, the numbers of meshes of the target models can be all decreased to the same number, or can be gradually decreased, that is, 3D models more separated in time or distance from the reference 3D model can be more decreased in the number of meshes. How to decrease the number of meshes of 3D models can be specified by, for example, a parameter defined in association with the effect mode 7.

Note that the effect process in the effect mode 7 is performed on 3D models formed from polygons, and is not performed on 3D models not formed from polygons, that is, wire frames, for example.

The effect modes 8 and 9 represent an effect process to change the expression form of 3D models.

In other words, the effect mode 8 represents an effect process to change 3D models formed from polygons into wire frames.

The effect mode 9 represents an effect process to change the expression form of 3D models from view dependent to view independent, that is, an effect process to change VD models to VI models (for example, point clouds).

The effect mode 10 represents an effect process to erase 3D models while leaving traces of the 3D models.

Although the effect direction and the effect distance can be set for the effect modes 1 to 10, the default effect direction and effect distance can be defined as needed.

For example, as the default effect direction in the effect modes 1 to 10, the past direction "past" can be defined.

Furthermore, for example, as the default effect distance in the effect mode 1, the number of models "number"=1 can be defined.

In this case, when the effect direction and effect distance in the effect mode 1 are not set, the effect process in the effect mode 1 is performed on 3D models separated from the reference 3D model by one or more models in the past direction, in other words, 3D models preceding the 3D model next to the reference 3D model in the past direction.

Moreover, for example, as the default effect distance in the effect mode 4, the distance "distance"=5 [m] can be defined.

In this case, when the effect direction and effect distance in the effect mode 4 are not set, the effect process in the effect mode 4 is performed on 3D models separated from the reference 3D model by 5 m or more in the past direct on.

Furthermore, for example, as the default effect distance in the effect mode 5, time "time"=10 [sec] can be defined.

In this case, when the effect direction and effect distance in the effect mode 5 are not set, the effect process in the effect mode 5 is performed on 3D models separated from the reference 3D model by 10 seconds or more in the past direction.

Moreover, for example, as the default effect distance in the effect mode 7, the number of models "number"=3 can be defined.

In this case, when the effect direction and effect distance in the effect mode 7 are not set, the effect process in the effect mode 7 is performed on 3D models separated from the reference 3D model by three or more models in the past direction, in other words, 3D models preceding the third 3D model from the reference 3D model in the past direction.

Note that a plurality of effect modes can be set for the effect process performed by the effect processing unit 14. For example, when the effect modes 1 and 3 are set for effect processes, effect processes are performed to transparentize the 3D models and reduce the number of textures.

Here, the image processing system illustrated in FIG. 1 can be applied to a transmission system that transmits free viewpoint data from the transmission side to the reception side and generates and displays a strobe image on the reception side. In this case, the effect mode and the necessary effect direction and effect distance can be transmitted from the transmission side to the reception side as an effect flag (effect information) related to the effect process. Then, on the reception side, the effect process can be performed according to the effect mode, the effect direction, and the effect distance as the effect flag.

Figure 15:
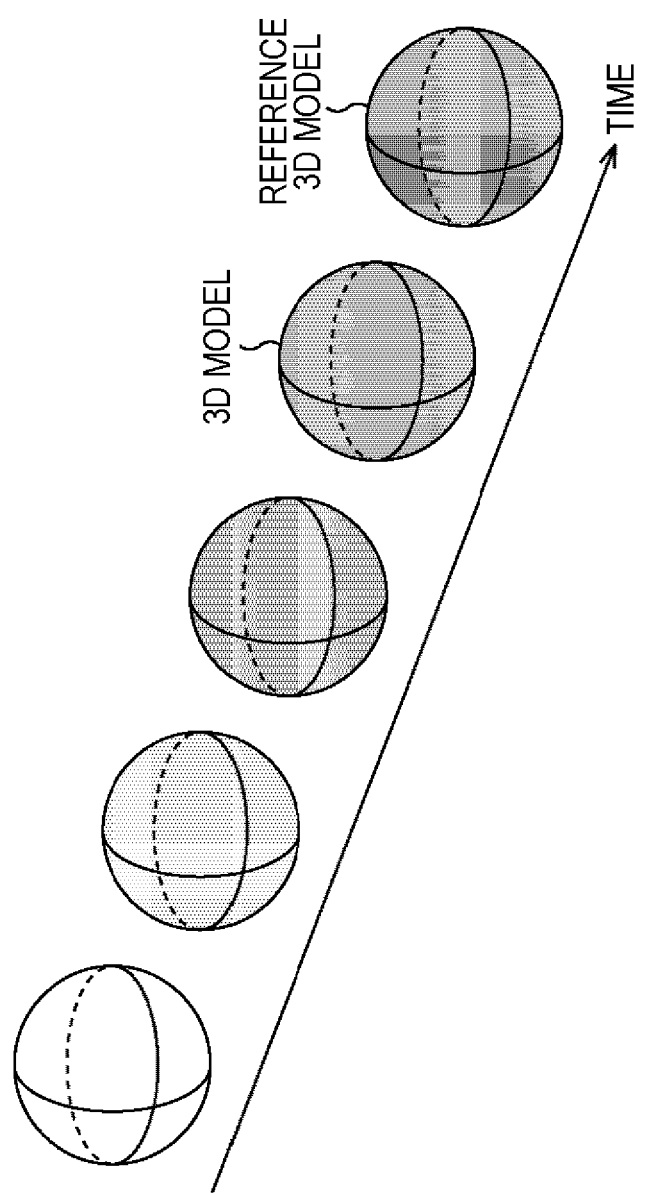
FIG. 15 is a diagram illustrating an example of effect process in effect mode 1.

FIG. 15 is a diagram illustrating an example of effect process in the effect mode 1.

FIG. 15 illustrates an example of a strobe image showing 3D models of a subject moving in a straight line. Referring to FIG. 15, the strobe image shows 3D models in five generation frames, and the 3D model of the latest time (the 3D model in the latest generation frame) is a reference 3D model. Then, the effect process in the effect mode 1 is performed on the 3D models shown in the strobe image so that the 3D models preceding the reference 3D model are gradually transparentized.

Therefore, according to the strobe image having undergone the effect process in the effect mode 1, the user can intuitively recognize the passage of time. Moreover, the data amount of the strobe image can be reduced. Furthermore, it is possible to suppress the temporally preceding (past) 3D models from becoming a hindrance (obstruction) to the temporally following (future) 3D models, and provide an easily viewable strobe image.

Figure 16:
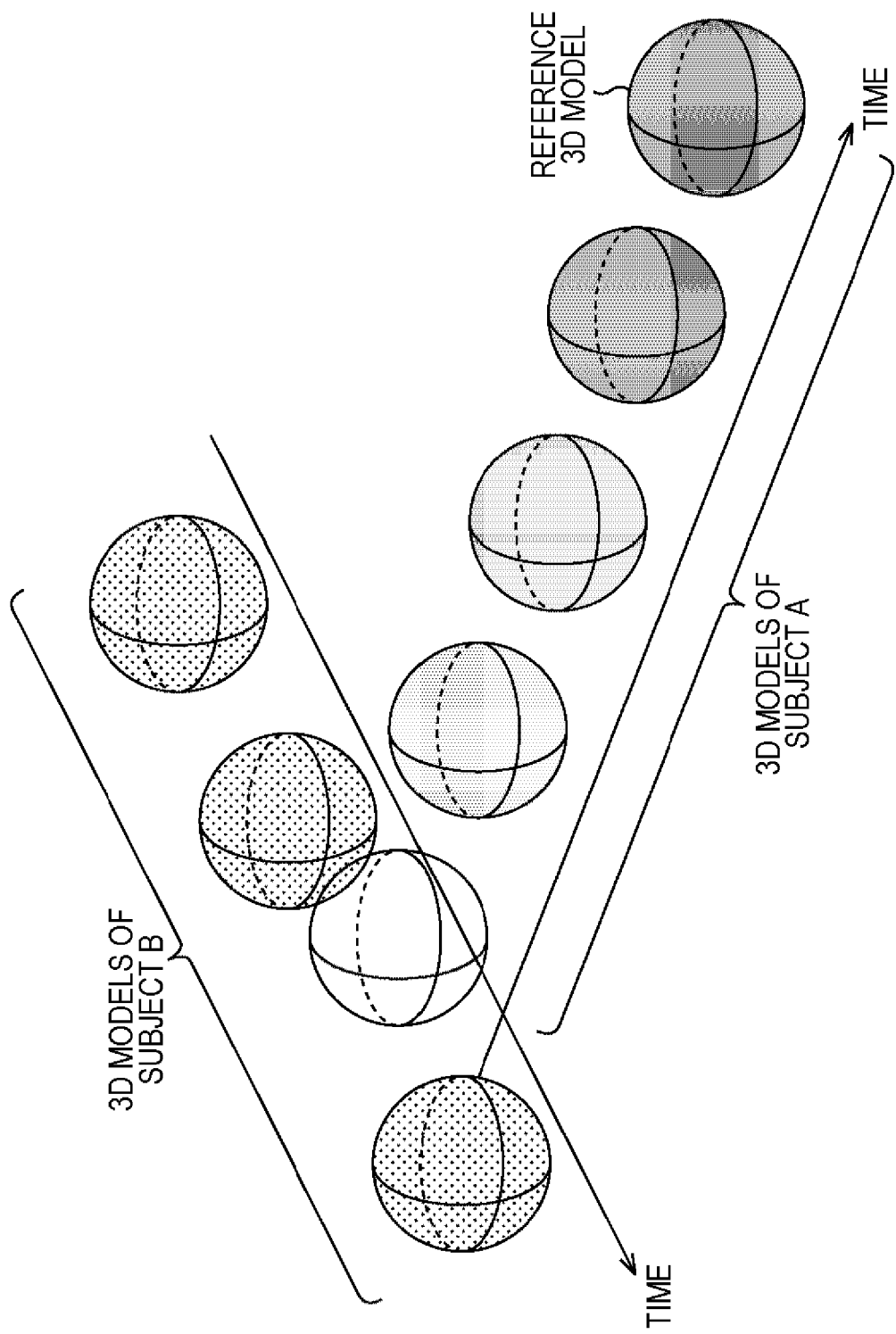
FIG. 16 is a diagram illustrating an example of a strobe image showing 3D models of two subjects.

FIG. 16 is a diagram illustrating an example of a strobe image showing 3D models of two subjects.

Referring to FIG. 16, 3D models of two subjects A and B at a plurality of times (generation frames) are shown in a strobe image. Then, as in the case of FIG. 15, the effect process in the effect mode 1 is performed on the 3D models of the subject A so that the 3D models preceding the reference 3D model are gradually transparentized.

Referring to FIG. 16, the subject B moves so as to cross the trajectory of the movement of the subject A. Therefore, the 3D models of the subject B may overlap with the 3D models of the subject. A preceding the reference 3D model.

However, since the 3D models of the subject A preceding the reference 3D model are gradually transparentized, even if the 3D models of the subject B overlap with the 3D models of the subject A preceding the reference 3D model, it is possible to suppress the preceding 3D models from interfering with the 3D models of the subject B.

Note that, referring to FIG. 16, the effect process is performed on the 3D models of the subject A but is not performed on the 3D models of the subject B, but the effect process can be performed on both the 3D models of the subject A and the 3D models of the subject B.

Figure 17:
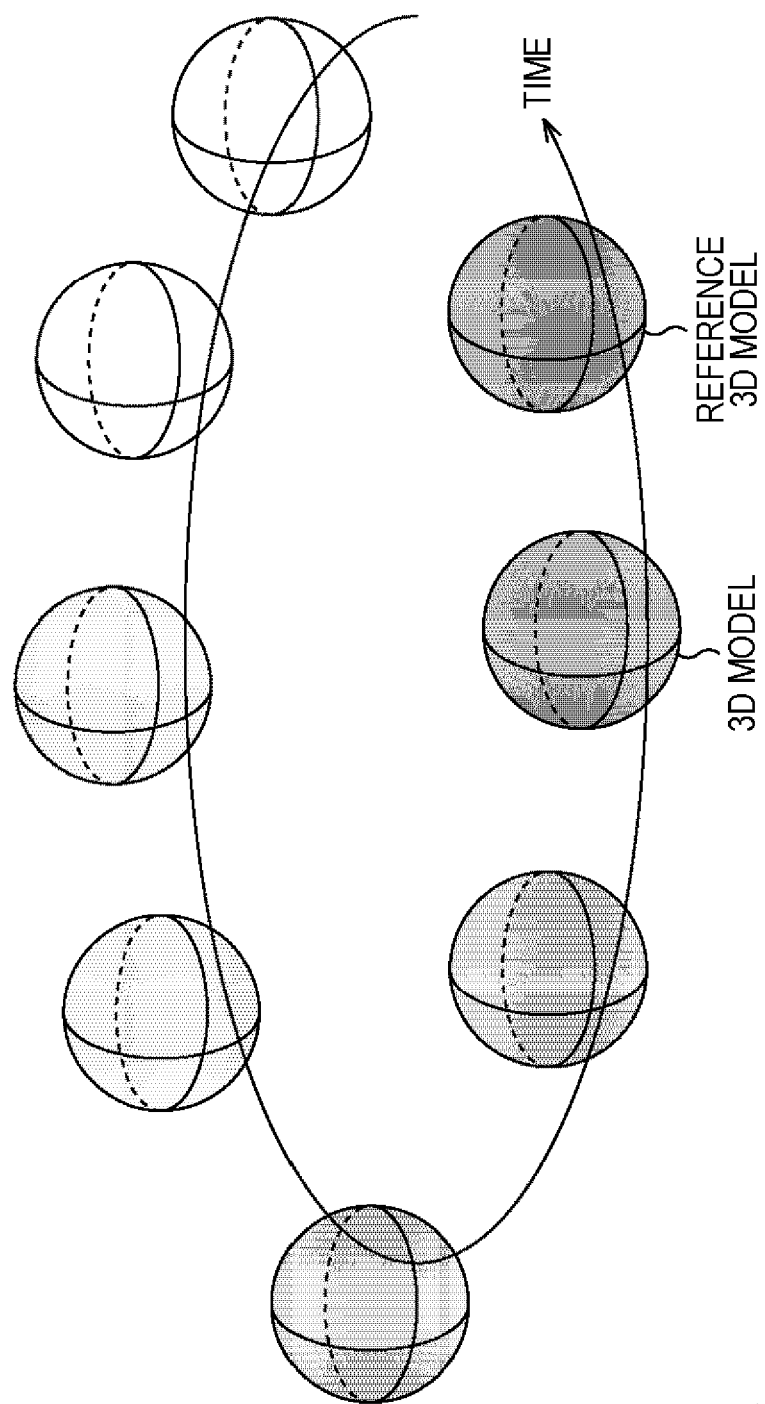
FIG. 17 is a diagram illustrating another example of effect process in effect mode 1.

FIG. 17 is a diagram illustrating another example of effect process in the effect mode 1.

FIG. 17 illustrates an example of a strobe image showing 3D models of a subject moving in a circle. Referring to FIG. 17, the effect process in the effect mode 1 is performed on the 3D models shown in the strobe image so that the 3D models preceding the reference 3D model are gradually transparentized.

Here, in a case where the subject circles around the same trajectory, for example, in the strobe image showing the 3D models of the subject, the 3D models of the first round and the 3D models of the second round may be shown at the same time. When no effect process is performed, it is difficult to distinguish between the 3D models of the first round and the 3D models of the second round in the strobe image, so that the strobe image is difficult to view.

When the effect process in the effect mode 1 is performed, for example, if the 3D model at the latest time is the reference 3D model, the 3D models shown in the strobe image becomes more transparent with decreasing proximity to the reference 3D model. Therefore, it is possible to provide an easily viewable strobe image that allows the user to easily distinguish between the 3D model of the first round and the 3D model of the second round.

Furthermore, according to the effect process in the effect mode 1, in a strobe image showing 3D models of a subject circling along the same trajectory, (the 3D models of) the subject is expressed such that the 3D models of the latest round enter (jack in) the 3D models of the previous round. Therefore, it is possible to provide a free view video (FVV) that allows the user to easily compare the subject of the latest round and the subject of the previous round.

Note that, in a case of a subject circling the same trajectory, for example, an athlete as the subject runs around a track, or a car or a motorbike as the subject races on a circuit, a gymnast as the subject swings on a horizontal bar.

Here, the virtual viewpoint can be set at an arbitrary position. The virtual viewpoint can be set at a position that looks down on the subject or at the position of the subject. When the virtual viewpoint is set to a position that looks down on the subject, the user can view (the 3D models of) the subject from the standpoint of a third party. When the virtual viewpoint is set to the position of the subject (first-person viewpoint), the user can view ((the 3D models of) the subject in the past that has been transparentized by the effect process from the viewpoint of the subject as if he or she follows the subject.

Figure 18:
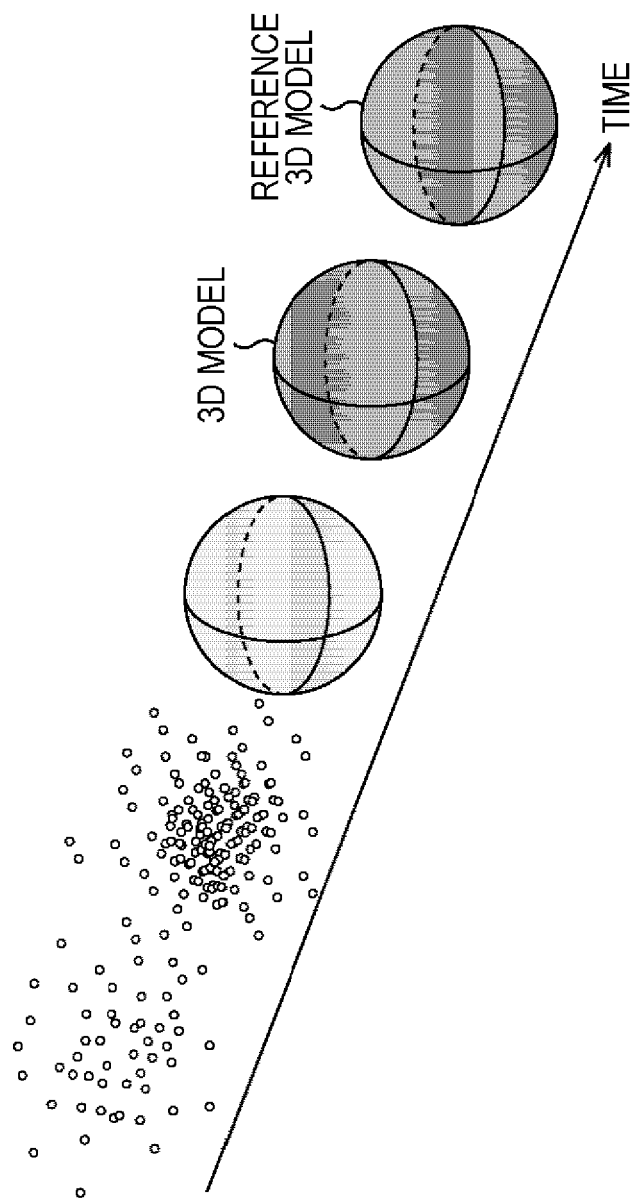
FIG. 18 is a diagram illustrating an example of effect process in effect mode 2.

FIG. 18 is a diagram illustrating an example of effect process in the effect mode 2.

FIG. 18 illustrates an example of a strobe image showing 3D models of a subject moving in a straight line. Referring to FIG. 18, the strobe image shows 3D models in five generation frames, and the 3D model of the latest time is a reference 3D model. Then, the effect process in the effect mode 2 is performed on the 3D models shown in the strobe image so that the 3D models preceding the reference 3D model gradually (and gently) disappear.

Therefore, according to the strobe image having undergone the effect process in the effect mode 2, the user can intuitively recognize the passage of time. Moreover, the data amount of the strobe image can be reduced. Furthermore, it is possible to suppress the temporally preceding 3D models from becoming a hindrance to the temporally following 3D models, and provide an easily viewable strobe image.

Note that, when the 3D models are formed from polygons, the effect process in the effect mode 2 in which 3D models gradually disappear can be performed, for example, by decreasing more greatly the number of polygons in the 3D models more separated from the reference 3D model. Furthermore, the effect process in the effect mode 2 in which 3D models gradually disappear can be performed, for example, by decreasing more greatly the number of polygons in the 3D models more separated from the reference 3D model and, among the 3D models having been decreased in the number of polygons at a predetermined ratio from the original number of polygons, decreasing more greatly the 3D models more separated from the reference 3D model in the number of points (the number of points in point cloud). Moreover, the effect process in the effect mode 2 in which 3D models gradually disappear can be performed, for example, by changing the 3D models to point clouds and decreasing more greatly the number of points in the 3D models more separated from the reference 3D model.

When the 3D models are formed from point clouds, the effect process in the effect mode 2 in which 3D models gradually disappear can be performed by decreasing more greatly the number of points in the 3D models more separated from the reference 3D model.

According to the effect process in the effect mode 2 as described above, each of the 3D models separated from the reference 3D model is represented as a collection of sparse particles like a fog.

Figure 19:
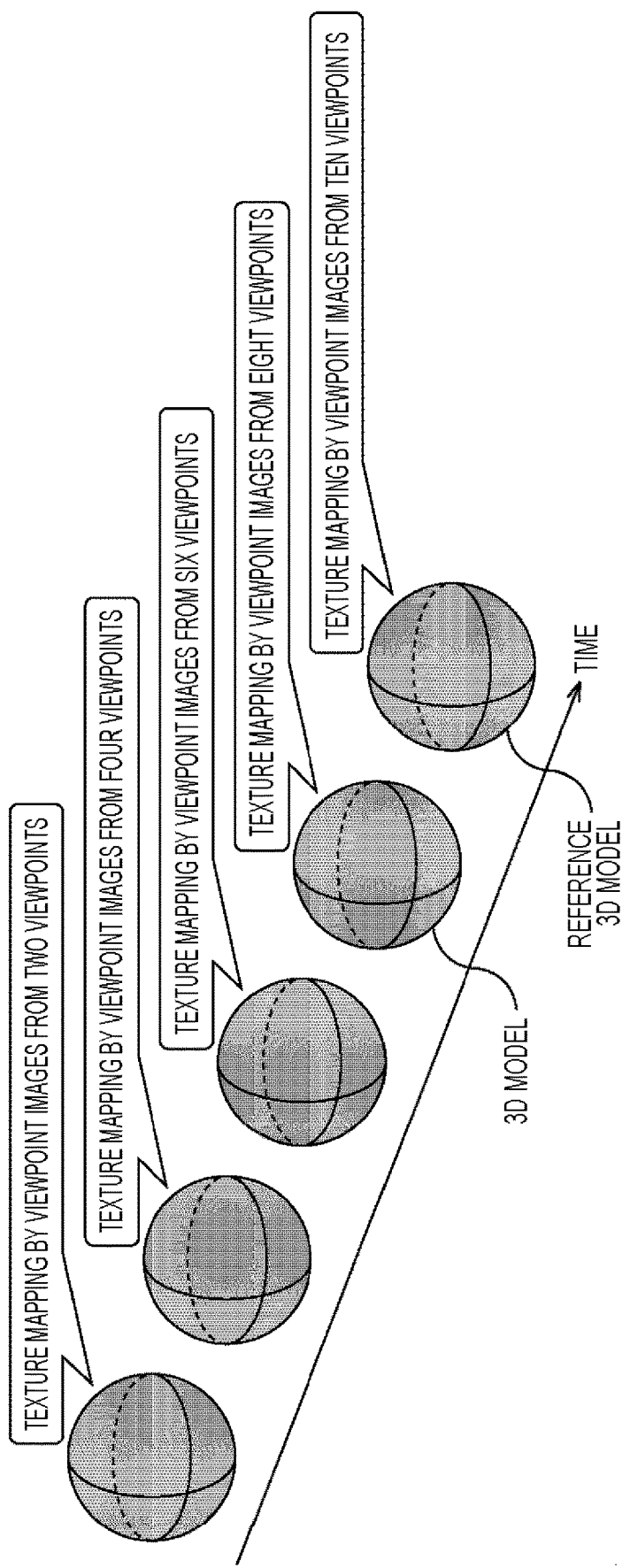
FIG. 19 is a diagram illustrating an example of effect process in effect mode 3.

FIG. 19 is a diagram illustrating an example of effect process in the effect mode 3.

FIG. 19 illustrates an example of a strobe image showing 3D models of a subject moving in a straight line. Referring to FIG. 19, the strobe image shows 3D models in five generation frames, and the 3D model of the latest time is a reference 3D model. Then, the effect process in the effect mode 3 is performed on the 3D models shown in the strobe image so that the 3D models preceding the reference 3D model are gradually decreased in the number of textures.

Therefore, according to the strobe image having undergone the effect process in the effect mode 3, the texture quality of the 3D models is degraded, but the data amount of the strobe image and the amount of processing required to display the strobe image can be reduced.

Note that, when 3D models more separated from the reference 3D model are more decreased in the number of textures in the effect process in the effect mode 3, the rate of decreasing the number of textures can take a value obtained by dividing 100% by the number of 3D models shown in the strobe image, for example. In this case, for a strobe image showing 3D models in five generation frames, the rate of decreasing the number of textures is 20%=100/5. Therefore, in a case where the reference 3D model shown in the strobe image is subjected to texture mapping with viewpoint images from 10 viewpoints, for example, the first 3D model in the past direction of the reference 3D model is subjected to texture mapping with viewpoint images from eight viewpoints decreased by 20% from the 10 viewpoints of the texture mapping of the reference 3D model. The second 3D model in the past direction of the reference 3D model is subjected to texture mapping with viewpoint images from six viewpoints reduced by 20% from the eight viewpoints of the texture mapping of the first 3D model in the past direction. Hereinafter, similarly, the third 3D model in the past direction of the reference 3D model is subjected to texture mapping with viewpoint images from four viewpoints reduced by 20% from the six viewpoints of the texture mapping of the second 3D model in the past direction, and the fourth 3D model in the past direction of the reference 3D model is subjected to texture mapping with the viewpoint images from two viewpoints reduced by 20% from the four viewpoints of the texture mapping of the third 3D model in the past direction.

Figure 20:
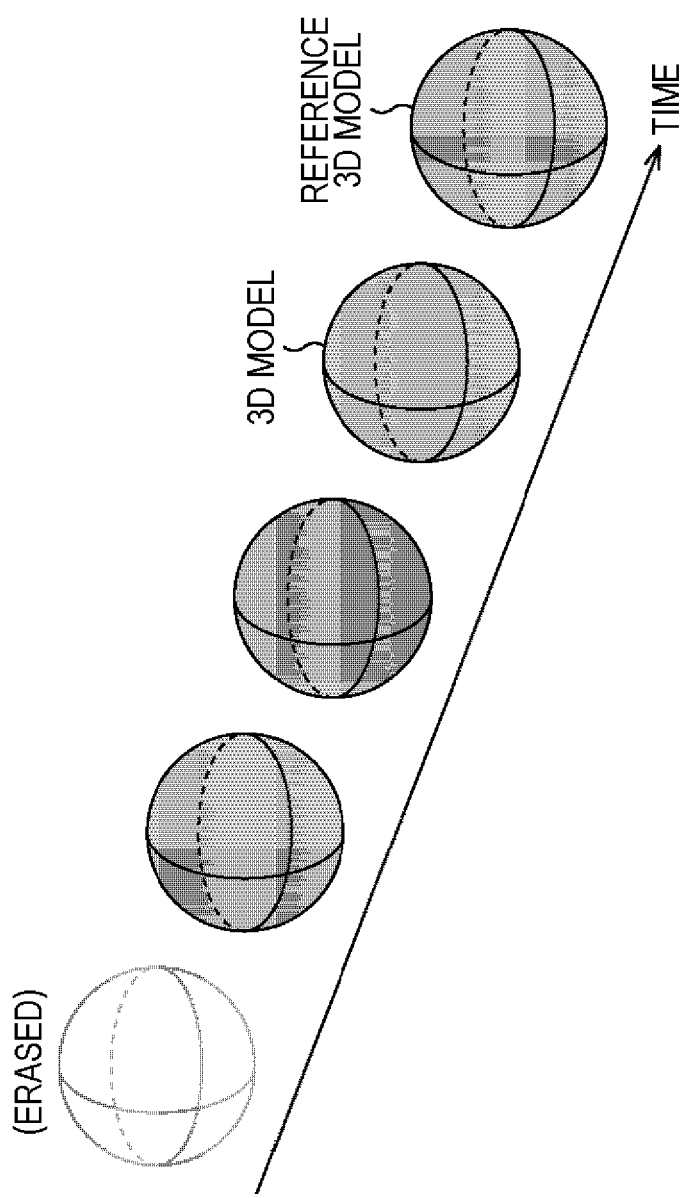
FIG. 20 is a diagram illustrating an example of effect process in effect mode 4.

FIG. 20 is a diagram illustrating an example of effect process in the effect mode 4.

FIG. 20 illustrates an example of a strobe image showing 3D models of a subject moving in a straight line. Referring to FIG. 20, the strobe image shows 3D models in five Generation frames, and the 3D model of the latest time is a reference 3D model. Then, the effect process in the effect mode 4 is performed on the 3D models shown in the strobe image so that, among the 3D models preceding the reference 3D model, the fourth 3D model from the reference 3D model as a target model, for example, is displayed once and then erased after a lapse of a certain time.

Therefore, according to the strobe image having undergone the effect process in the effect mode 4, the data amount of the strobe image and the amount of processing required to display the strobe image can be reduced.

Note that, in the effect process in the effect mode 4, for example, the certain time from the display to erasing of the target model can be specified by a parameter defined in association with the effect mode 4.

Figure 21:
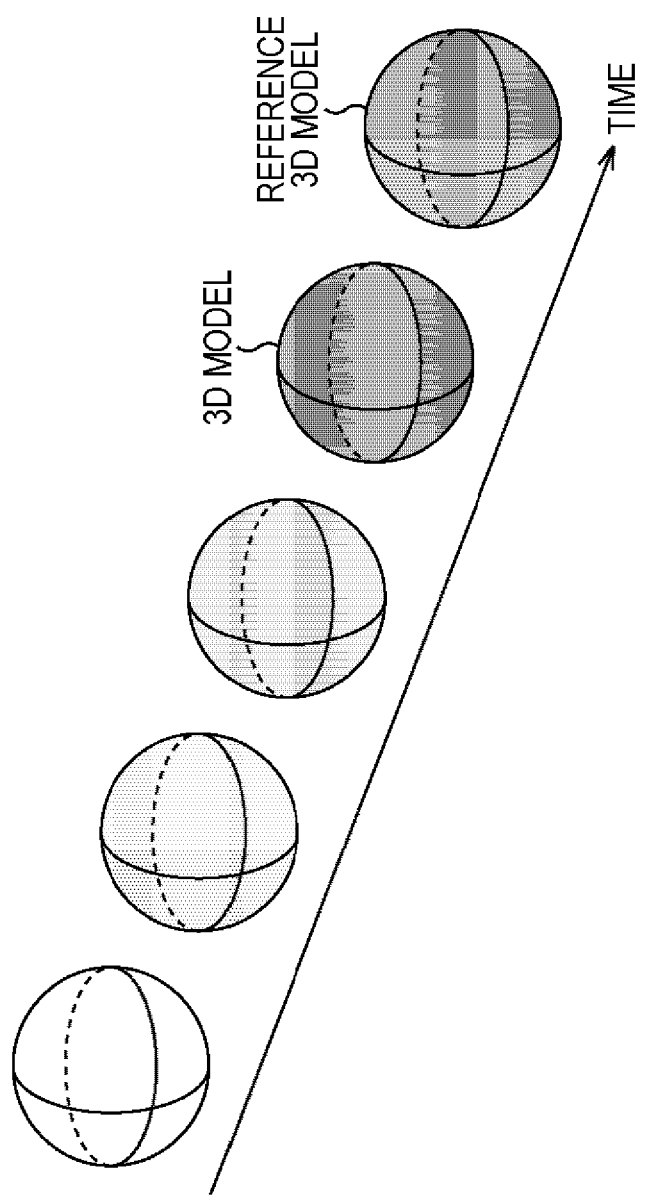
FIG. 21 is a diagram illustrating an example of effect process in effect mode 5.

Furthermore, in the effect process in the effect mode 4, instead of erasing the target model after a lapse of a certain time, the target model can be erased when the number of the 3D models shown in the strobe image has reached a certain number. The certain number of the 3D models with which to erase the target model can be specified by a parameter associated with the effect mode 4, as in the case of the certain time described above, for example. FIG. 21 is a diagram illustrating an example of effect process in the effect mode 5.

FIG. 21 illustrates an example of a strobe image showing 3D models of a subject moving in a straight line. Referring to FIG. 21, the strobe image shows 3D models in fire generation frames, and the 3D model of the latest time is a reference 3D model. Then, the effect process in the effect mode 5 is performed on the 3D models shown in the strobe image so that the 3D models preceding the reference 3D model are gradually decreased in luminance and saturation.

Therefore, according to the strobe image having undergone the effect process in the effect mode 5, the data amount of the strobe image and the amount of processing required to display the strobe image can be reduced.

Note that, in a case of decreasing more greatly the luminance and saturation of the 3D models more separated from the reference 3D model in the effect process in the effect mode 5, the rate of reducing the luminance and saturation can be the same as the rate in the case in the effect mode 3, for example. In other words, the rate of reducing the luminance and saturation can be a value obtained by dividing 100% by the number of 3D models shown in the strobe image. In this case, the rate of decreasing the luminance and saturation in a strobe image showing 3D models in five generation frames is 20%=100/5. The 3D models preceding the reference 3D model are decreased in luminance and saturation by 20% with distance by one each model from the reference 3D model.

Furthermore, instead of decreasing more greatly the luminance and saturation of the 3D models with distance by one each model from the reference 3D model, the luminance and saturation of the 3D models can be decreased with distance for a certain time from the reference 3D model.

Figure 22:
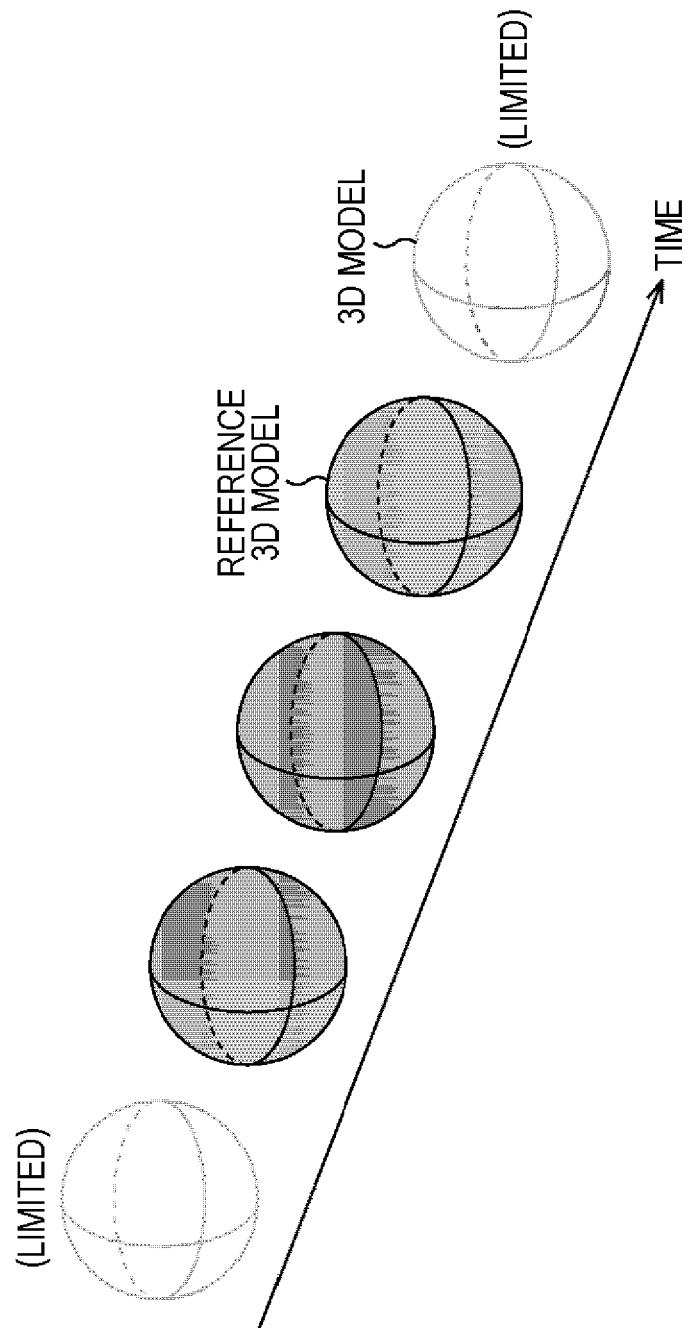
FIG. 22 is a diagram illustrating an example of effect process in effect mode 6.

FIG. 22 is a diagram illustrating an example of effect process in the effect mode 6.

FIG. 22 illustrates an example of a strobe image showing 3D models of a subject moving in a straight line. Referring to FIG. 22, the strobe image shows 3D models in five generation frames, and the 3D model just before the 3D model of the latest time is a reference 3D model. Then, the effect process in the effect mode 6 is performed on the 3D models shown in the strobe image, so that the 3D models shown in the strobe image are limited to three models including the reference 3D model, in other words, the reference 3D model and the two 3D models adjacent to each other in the past direction of the reference 3D model.

Therefore, according to the strobe image having undergone the effect process the effect mode 6, the data amount of the strobe image can be reduced. Furthermore, for example, it is possible to suppress the temporally preceding 3D models from becoming a hindrance to the temporally following 3D models, and provide an easily viewable strobe image.

Figure 23:
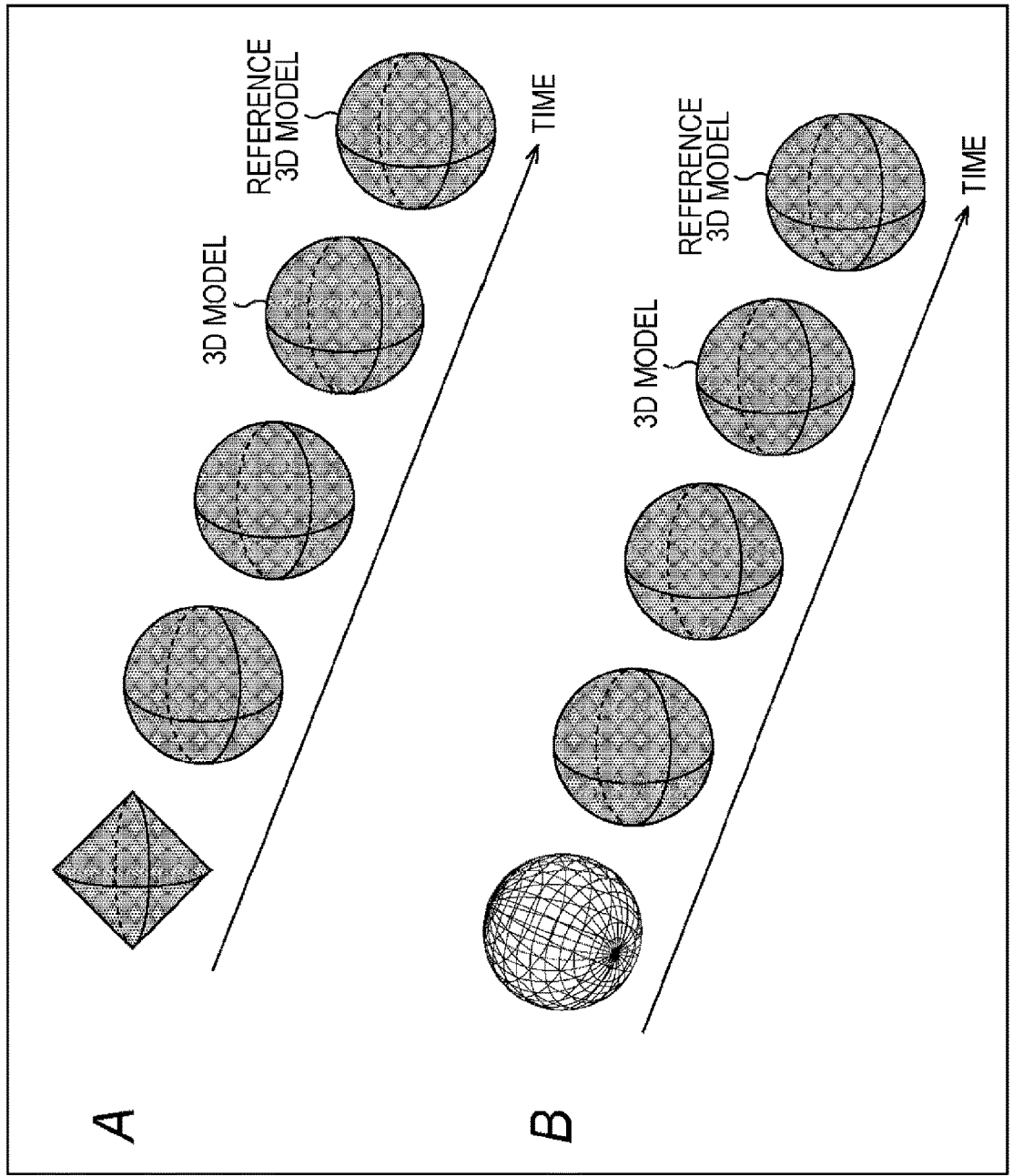
FIG. 23 is a diagram illustrating an example of effect process in effect modes 7 to 9.

FIG. 23 is a diagram illustrating an example of effect process in the effect modes 7 to 9.

FIG. 23 illustrates an example of a strobe image showing 3D models of a subject moving in a straight line. Referring to FIG. 23, the strobe image shows 3D models in five generation frames, and the 3D model of the latest time is a reference 3D model. Then, the effect process in any one in the effect modes 7 to 9 is performed on the 3D models shown in the strobe image.

In other words, FIG. 23A illustrates a state in which the effect process in the effect mode 7 is performed on the 3D models shown in the strobe image, so that one of the 3D models formed from polygons is decreased in the number of meshes (the number of polygons).

FIG. 23B illustrates a state in which the effect process in the effect mode 8 is performed on the 3D models shown in the strobe image, so that one of the 3D models formed from polygons is changed into a wire frame.

Note that, in the effect process in the effect mode 9, a 3D model as a VD model shown in a strobe image is changed to a VI model such as a point cloud, but the illustration thereof is omitted.

According to the strobe image having undergone the effect process in the effect modes 7 to 9, the data amount of the strobe image can be reduced. Furthermore, for example, it is possible to suppress the temporally preceding 3D models from becoming a hindrance to the temporally following 3D models, and provide an easily viewable strobe image.

Note that, when it is required to further reduce the amount of data, for example, in the effect process in the effect mode 9, after the 3D models are changed to point clouds, the number of points in the point clouds can be decreased and the information on the colors of the points can be decreased, although the quality of the shapes decreases. The same applies to VI models other than point clouds.

Figure 24:
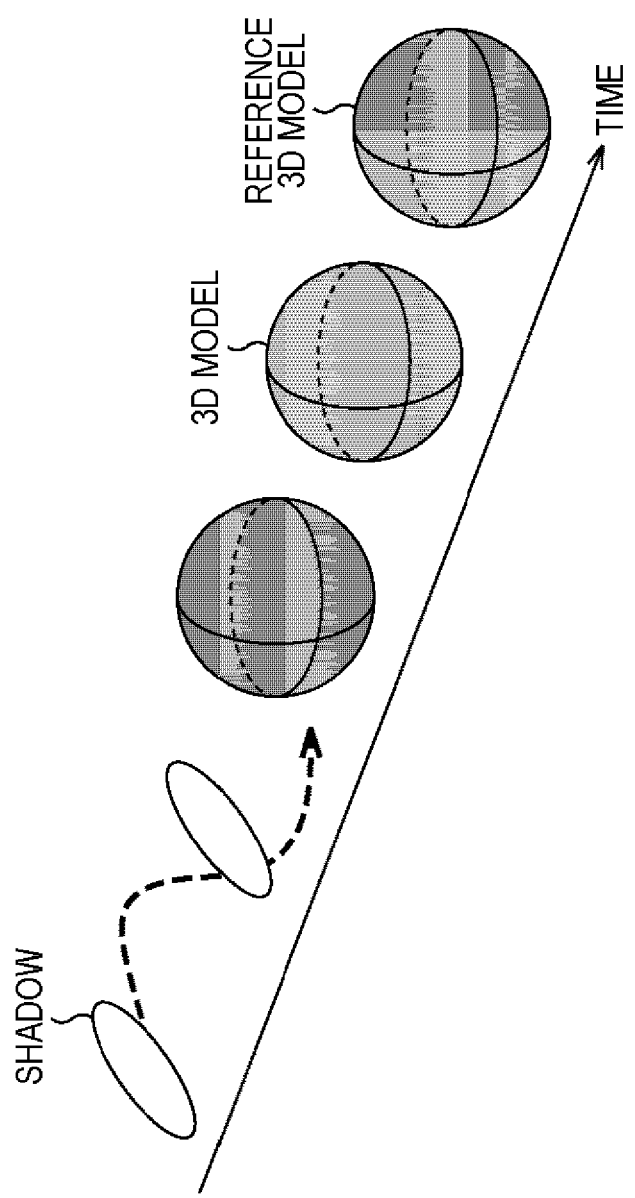
FIG. 24 is a diagram illustrating an example of effect process in effect mode 10.

FIG. 24 is a diagram illustrating an example of effect process in the effect mode 10.

FIG. 24 illustrates an example of a strobe image showing 3D models of a subject moving in a straight line. Referring to FIG. 24, the strobe image shows 3D models in five generation frames, and the 3D model of the latest time is a reference 3D model. Then, the effect process n the effect mode 10 is performed on the 3D models shown in the strobe image so that, among the 3D models preceding the reference 3D models, the third and fourth 3D models from the reference 3D model are erased with shadows of these 3D models left as traces.

Therefore, according to the strobe image having undergone the effect process in the effect mode 10, the user can intuitively recognize the passage of time. Moreover, the data amount of the strobe image can be reduced. Furthermore, it is possible to suppress the temporally preceding (past) 3D models from becoming a hindrance (obstruction) to the temporally following (future) 3D models, and provide an easily viewable strobe image.

Note that, as the trace of a 3D model, instead of the shadow, for example, a point representing a position where the 3D model was present, a line representing a trajectory of movement of the 3D model, or the like can be adopted.

Furthermore, in the effect process in the effect mode 10, the trace of a 3D model can be left by storing the position of the 3D model in the three-dimensional space and drawing a shadow or the like according to the position.

<Transmission System>

Figure 25:
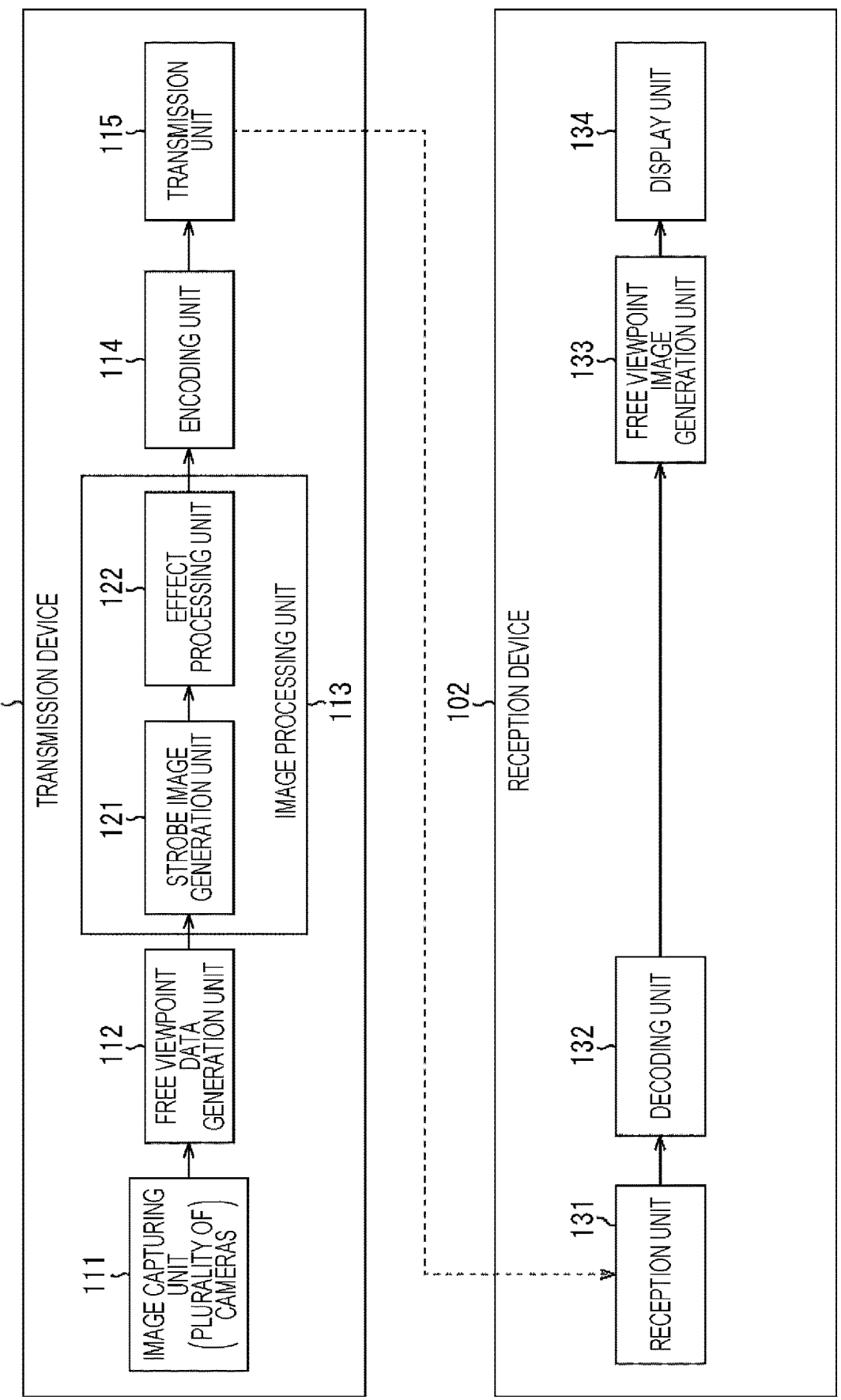
FIG. 25 is a block diagram illustrating a configuration example of a transmission system to which the image processing system is applied.

FIG. 25 is a block diagram illustrating a configuration example of a transmission system to which the image processing system illustrated in FIG. 1 is applied.

Referring to FIG. 25, the transmission system includes a transmission device 101 and a reception device 102. In the transmission system, free viewpoint data is transmitted from the transmission device 101 to the reception device 102. Then, in the reception device 102, a strobe image is generated using the free viewpoint data from the transmission device 101 and is displayed.

The transmission device 101 includes an image capturing unit 111, a free viewpoint data generation unit 112, an image processing unit 113, an encoding unit 114, and a transmission unit 115.

The image capturing unit 111 is configured in the same manner as the image capturing unit 11 illustrated in FIG. 1, photographs a subject from a plurality of viewpoints, and supplies viewpoint images from the plurality of viewpoints to the free viewpoint data Generation unit As with the free viewpoint data generation unit 12 illustrated in FIG. 1, the free viewpoint data generation unit 112 generates free viewpoint data using the viewpoint images from the plurality of viewpoints from the image capturing unit 111, for example, and supplies the free viewpoint data to the image processing unit 113.

The image processing unit 113 includes a strobe image generation unit 121 and an effect processing unit 122. The image processing unit 113 uses the free viewpoint data from the free viewpoint data generation unit 112 to generate as necessary a strobe image (3D strobe image) showing 3D models of a subject at a plurality of times (frames) in the viewpoint images captured by the image capturing unit 111, and performs an effect process on the strobe image.

As with the strobe image generation unit 13 illustrated in FIG. 1, the strobe image generation unit 121 uses the free viewpoint data from the free viewpoint data generation unit 12 to generate a strobe image showing 3D models at a plurality of times, and supplies the free viewpoint data of the strobe image to the effect processing unit 122.

As with the effect processing unit 14 illustrated in FIG. 1, the effect processing unit 122 performs an effect process on the 3D model seen in the strobe image in the free viewpoint data supplied from the strobe image generation unit 121, and supplies the free viewpoint data of the strobe image having undergone the effect process to the encoding unit 114.

Note that the image processing unit 113 can supply the free viewpoint data from the strobe image generation unit 121 to the encoding unit 114 without the effect process by the effect processing unit 122 according to the user's operation or the like, for example. Moreover, the image processing unit 113 can supply the free viewpoint data from the free viewpoint data generation unit 112 to the encoding unit 114 without the generation of a strobe image at the strobe image generation unit 121 and the effect process by the effect processing unit 122 according to the user's operation or the like, for example. Furthermore, the image processing unit 113 can performs generation of a strobe image and an effect process in parallel, that is, can generate a (3D) strobe image after effect process in which an effect process has been performed on 3D models from free viewpoint data.

The encoding unit 114 encodes the free viewpoint data supplied from (the effect processing unit 122 of) the image processing unit 113 according to a predetermined encoding method, and supplies coded data obtained by the encoding to the transmission unit 115.

The transmission unit 115 transmits the coded data from the encoding unit 114 by wired communication or wireless communication.

The reception device 102 includes a reception unit 131, a decoding unit 132, a free viewpoint image generation unit 133, and a display unit 134.

The reception unit 131 receives the coded data transmitted from (the transmission unit 115 of) the transmission device 101, and supplies the coded data to the decoding unit 132.

The decoding unit 132 decodes the coded data from the reception unit 131 into free viewpoint data according to the encoding method of the encoding unit 114, and supplies the free viewpoint data to the free viewpoint image generation unit 133.

As with the free viewpoint image generation unit 15 illustrated in FIG. 1, the free viewpoint image generation unit 133 uses the free viewpoint data from the decoding unit 132 to generate 2D images in which a three-dimensional space captured by the image capturing unit 111 is viewed from virtual viewpoints such as 2D images in which a three-dimensional space shown in a strobe image in which 3D models have undergone an effect process is viewed from virtual viewpoints set according to the user's operation on the reception device 102, for example, and supplies the 2D images as free viewpoint images to the display unit 134.

As with the display unit 16 illustrated in FIG. 1, the display unit 134 includes, for example, a 2D head-mounted display, a 2D monitor, a 3D head-mounted display, a 3D monitor, and the like, and displays the free viewpoint image from the free viewpoint image generation unit 133.

Figure 26:
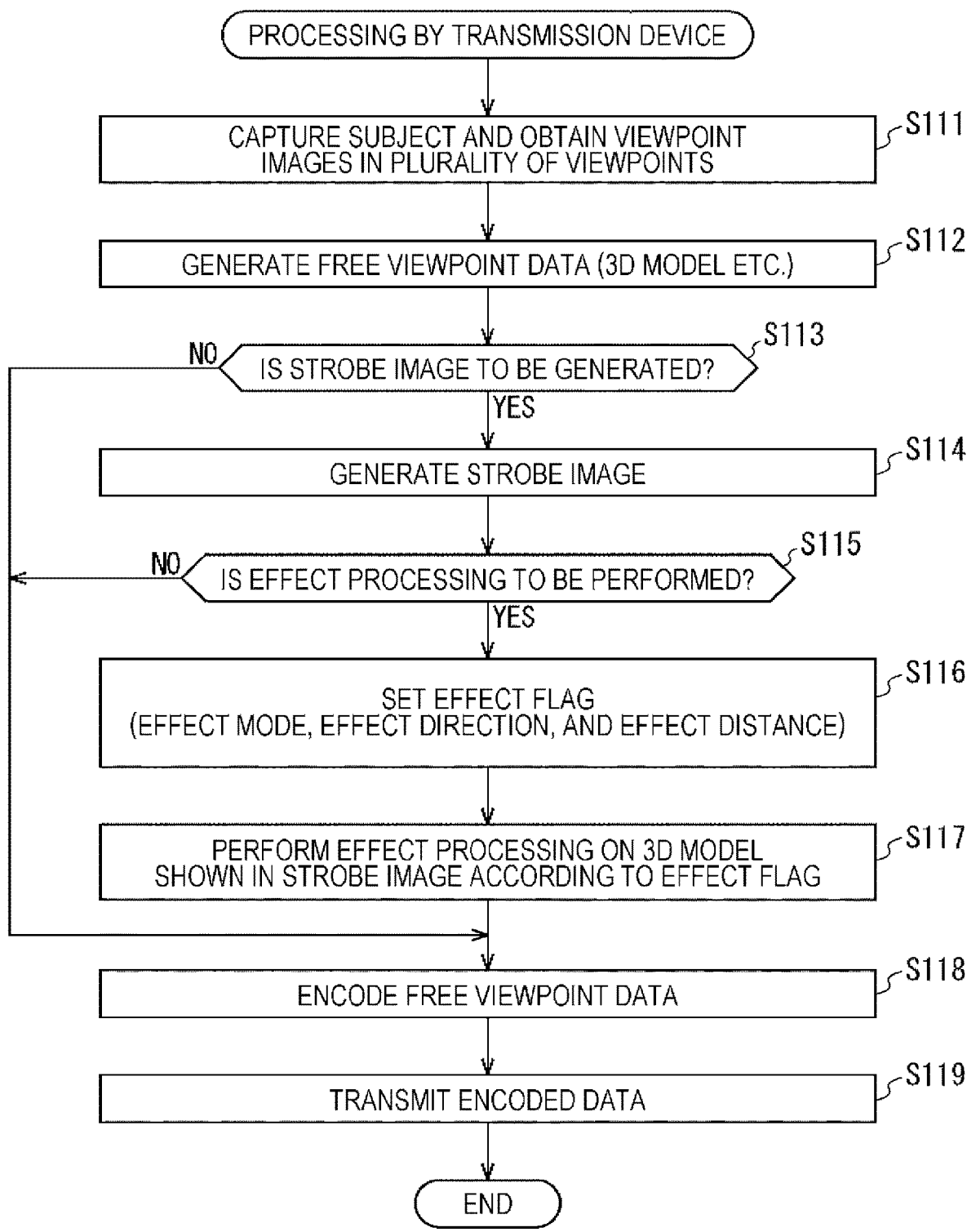
FIG. 26 is a flowchart of an example of a process by a transmission device 101.

FIG. 26 is a flowchart of an example of a process by the transmission device 101 illustrated in FIG. 25.

In step S111, the image capturing unit 111 of the transmission device 101 photographs a subject from a plurality of viewpoints, supplies viewpoint images from the plurality of viewpoints obtained by the photographing to the free viewpoint data generation unit 112, and the process proceeds to S112.

In step S112, the free viewpoint data generation unit 112 generates free viewpoint data using the viewpoint images from the plurality of viewpoints from the image capturing unit 111, for example.

For example, the free viewpoint data generation unit 112 uses the viewpoint images from the plurality of viewpoints from the image capturing unit 111 to generate 3D models of the subject shown in the viewpoint images by Visual Hull or the like, thereby making it possible to generate the 3D models (3D data including the 3D models and the background image) as free viewpoint image data. The 3D model may be, for example, a VD model having a 3D shape model and viewpoint images of a plurality of viewpoints to be a texture, and for example, a colored point cloud, or a VI model such as a set of a 3D shape model with a UV map as information of a color of the 3D shape model.

Furthermore, for example, the free viewpoint data generation unit 112 converts the 3D models of the subject shown in the viewpoint images, which is generated using the viewpoint images from the plurality of viewpoints, into 2D images and depth images viewed from a plurality of viewpoints (that may be the same as the viewpoints of the viewpoint images or may be different from the same), thereby making it possible to generate the 2D images and the depth images from the plurality of viewpoints as free viewpoint data. Note that the process of converting the 3D models into the 2D images and depth images from the plurality of viewpoints can be performed by the free viewpoint data generation unit 112 or by the encoding unit 114 before encoding the free viewpoint data, for example.

The free viewpoint data generation unit 112 supplies the free viewpoint data to the strobe image generation unit 121 in the image processing unit 113, and the process proceeds from step S112 to step S113.

In step S113, the strobe image generation unit 121 determines whether to generate a strobe image.

Here, the determination as to whether to generate a strobe image in step S113 can be made, for example, according to the motion of the subject, as in step S14 illustrated in FIG. 2. Furthermore, the determination as to whether to generate a strobe image in step S113 can be made according to, for example, the user's operation on the transmission device 101.

When it is determined in step S113 that a strobe image is not to be generated, the strobe image generation unit 121 and the effect processing unit 122 supply free viewpoint data to the encoding unit 114 without performing processing. Then, the process proceeds from step S113 to step S118 skipping steps S114 to S117.

Furthermore, when it is determined in step S113 that a strobe image is to be generated, the process proceeds to step S114.

In step S114, the strobe image generation unit 121 generates a strobe image using the free viewpoint data from the free viewpoint data generation unit 112.

In other words, the strobe image generation unit 121 selects a plurality of generation frames from the frames of the free viewpoint data from the free viewpoint data generation unit 112. Moreover, the strobe image generation unit 121 generates a strobe image showing 3D models (3D models at a plurality of times) of the subject shown in the plurality of generation frames.

The strobe image generation unit 121 supplies free viewpoint data of the strobe image to the effect processing unit 122, and the process proceeds from step S114 to step S115.

In step S115, the effect processing unit 122 determines whether to perform an effect process on the 3D models of the strobe image of which the free viewpoint data is supplied from the strobe image generation unit 121. The determination as to whether to generate a strobe image in step S115 can be made according to the user's operation on the transmission device 101 and the like, for example.

When it is determined in step S115 that an effect process is not to be performed, the effect processing unit 122 supplies the free viewpoint data of the strobe image from the strobe image generation unit 121 to the encoding unit 114 without performing an effect process. Then, the process proceeds from step S115 to step S118 skipping steps S116 and S117.

Furthermore, when it is determined in step S115 that an effect process is to be performed, the process proceeds to step S116.

In step S116, the effect processing unit 122 sets, for example, the effect flag (FIG. 14), that is, the effect mode, the effect direction, and the effect distance in accordance with the user's operation on the transmission device 101 or the like, and the process proceeds to S117.

In step S117, according to the effect flag, the effect processing unit 122 performs an effect process on the 3D models at a plurality of times (generation frames) shown in the strobe image of which the free viewpoint data is supplied from the strobe image generation unit 121.

For example, in a case where the effect mode is set to effect mode 1, the effect direction is set to past, and the effect distance is set to time=10, the effect processing unit 122 performs an effect process to transparentize the 3D models separated by 10 seconds or more in the past direction from the reference 3D model in the strobe image.

Then, the effect processing unit 122 supplies the free viewpoint data of the strobe image having undergone the effect process to the encoding unit 114, and the process proceeds from step S117 to step S118.

In step S118, the encoding unit 114 encodes the free viewpoint data supplied from the effect processing unit 122 and supplies coded data obtained by the encoding to the transmission unit 115, and the process proceeds to step S119.

In step S119, the transmission unit 115 transmits the coded data from the encoding unit 114, and the process is terminated.

As described above, in the transmission device 101, an effect process is performed in accordance with the effect flag set in response to the user's operation on the transmission device 101 or the like. Therefore, the user of the transmission device 101 can apply a desired effect to the 3D models of a subject shown in the strobe image by setting the effect flag.

Figure 27:
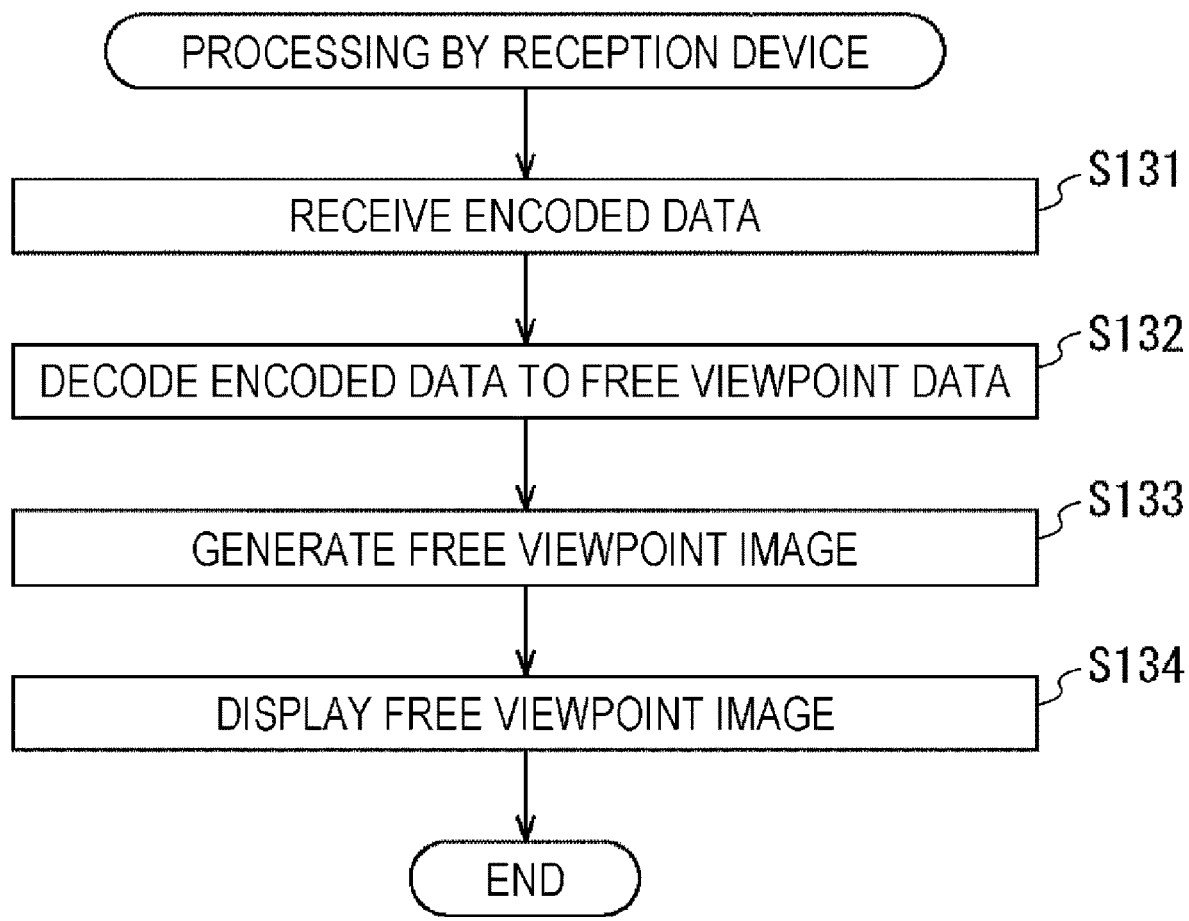
FIG. 27 is a flowchart of an example of a process by a reception device 102.

FIG. 27 is a flowchart of an example of a process by the reception device 102 illustrated in FIG. 25.

In step S131, the reception unit 131 of the reception device 102 receives the coded data transmitted from the transmission unit 115 of the transmission device 101 and supplies the coded data to the decoding unit 132, and the process proceeds to step S132.

In step S132, the decoding unit 132 decodes the coded data from the reception unit 131 and supplies free viewpoint data obtained by the decoding to the free viewpoint image generation unit 133, and the process proceeds to step S133. Here, when the free viewpoint data obtained by the decoding is 2D images and depth images from a plurality of viewpoints, the decoding unit 132 can convert the 2D images and depth images from the plurality of viewpoints into 3D models, and supplies the 3D models (3D data including the 3D models) as free viewpoint data to the free viewpoint image generation unit 133.

In step S133, the free viewpoint image generation unit 133 uses the free viewpoint data from the decoding unit 132 to generate, as free viewpoint images, 2D images in which a three-dimensional space captured by the image capturing unit 111 of the transmission device 101 as viewed from a virtual viewpoint set by the user's operation on the reception device 102 or the like. In other words, for example, the free viewpoint image generation unit 133 generates 2D images in which a three-dimensional space shown in a strobe image obtained by performing an effect process on 3D models is viewed from a virtual viewpoint, as free viewpoint images. Then, the free viewpoint image generation unit 133 supplies the free viewpoint image (data) to the display unit 134, and the process proceeds from step S133 to step S134.

In step S134, the display unit 134 displays the free viewpoint images from the free viewpoint image generation unit 133, and the process is terminated.

As described above, in the reception device 102, the free viewpoint images generated using free viewpoint data obtained by decoding the coded data from the transmission device 101 are displayed. Therefore, when a strobe image is generated and an effect process performed on the subject shown in the strobe image in the transmission device 101, the user of the reception device 102 can view the strobe image in which the effect is applied to the 3D models (the free viewpoint images generated from the strobe image).

Figure 28:
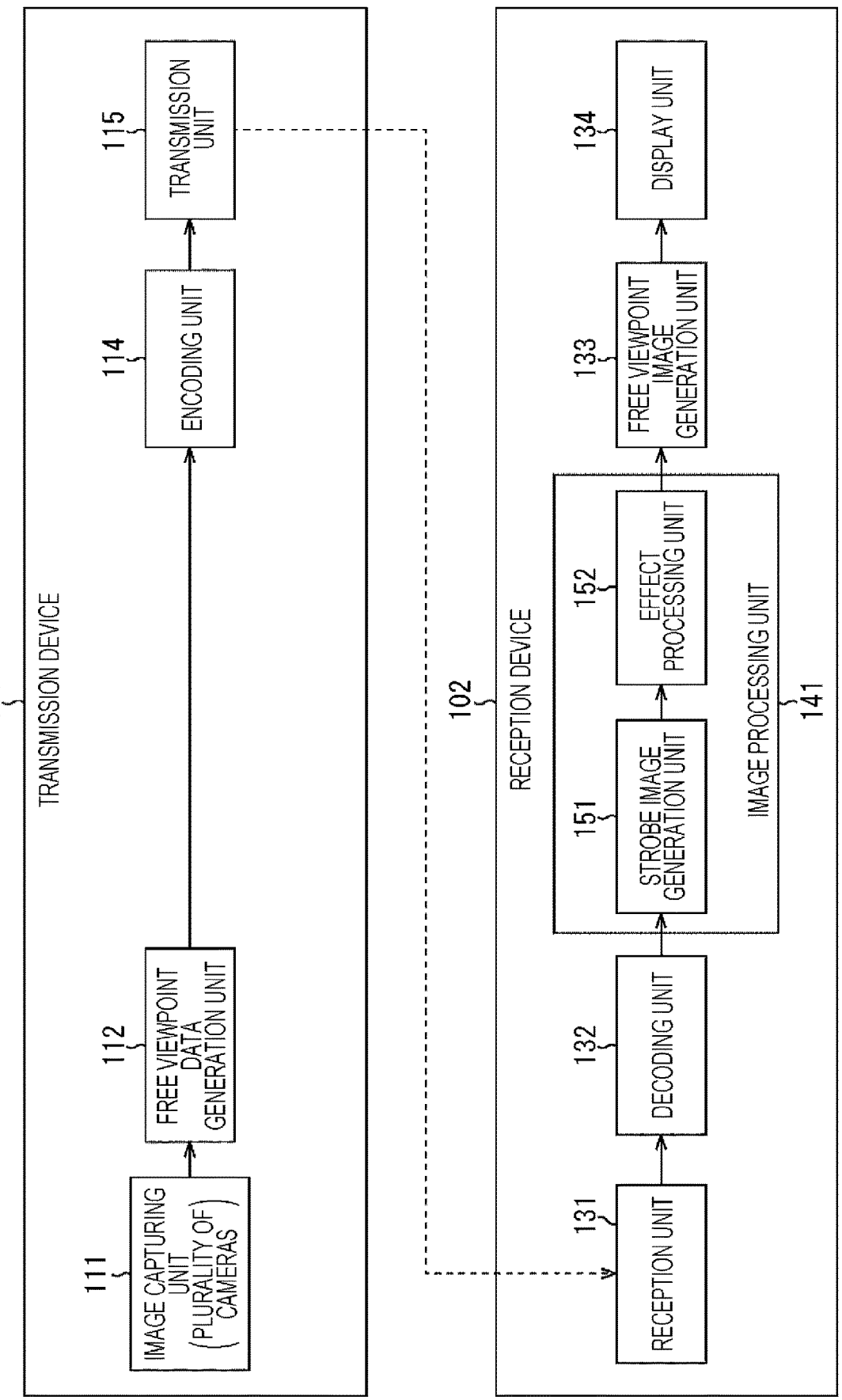
FIG. 28 is a block diagram illustrating another configuration example of a transmission system to which the image processing system is applied.

FIG. 28 is a block diagram illustrating another configuration example of a transmission system to which the image processing system illustrated in FIG. 1 is applied.

Note that the components corresponding to those illustrated in FIG. 25 are denoted with the same reference numerals, and the description thereof will be appropriately omitted below.

Referring to FIG. 28, the transmission system includes a transmission device 101 and a reception device 102. The transmission device 101 includes an image capturing unit 111, a free viewpoint data generation unit 112, an encoding unit 114, and a transmission unit 115. The reception device 102 includes a reception unit 131, a decoding unit 132, a free viewpoint image generation unit 133, a display unit 134, and an image processing unit 141.

Therefore, the transmission system illustrated in FIG. 28 is in common with the transmission system illustrated in FIG. 25, in that the transmission system includes the transmission device 101 and the reception device 102, the transmission device 101 includes the image capturing unit 111, the free viewpoint data generation unit 112, the encoding unit 114, and the transmission unit 115, and the reception device 102 includes the reception unit 131, the decoding unit 132, the free viewpoint image generation unit 133, and the display unit 134.

However, the transmission system illustrated in FIG. 28 is different from the transmission system illustrated in FIG. 25 in that the transmission device 101 does not have the image processing unit 113 and that the reception device 102 has the image processing unit 141 additionally.

The image processing unit 141 includes a strobe image generation unit 151 and an effect processing unit 152. The image processing unit 141 is supplied with free viewpoint data from the decoding unit 132. The image processing unit 141 uses the free viewpoint data from the decoding unit 132 to generate as necessary a strobe image showing 3D models of a subject at a plurality of times (frames) in viewpoint images captured by the image capturing unit 111, and performs an effect process on the strobe image.

In other words, as with the strobe image generation unit 121 illustrated in FIG. 25, the strobe image generation unit 151 uses the free viewpoint data from the decoding unit 132 to generate a strobe image showing 3D models at a plurality of times, and supplies the free viewpoint data of the strobe image to the effect processing unit 152.

As with the effect processing unit 122 illustrated in FIG. 25, the effect processing unit 152 performs an effect process on the 3D model seen in the strobe image in the free viewpoint data supplied from the strobe image generation unit 151, and supplies the free viewpoint data of the strobe image having undergone the effect process to the free viewpoint image generation unit 133.

Note that the image processing unit 141 can supply the free viewpoint data from the strobe image generation unit 151 to the free viewpoint image generation unit 133 without the effect process by the effect processing unit 152 according to the user's operation or the like, for example. Moreover, the image processing unit 141 can supply the free viewpoint data from the decoding unit 132 to the free viewpoint image generation unit 133 without the generation of a strobe image at the strobe image generation unit 151 and the effect process by the effect processing unit 152 according to the user's operation or the like, for example. Furthermore, the image processing unit 141 can perform generation of a strobe image and an effect process in parallel, that is, can generate a (3D) strobe image after effect process in which an effect process has been performed on 3D models from free viewpoint data.

Figure 29:
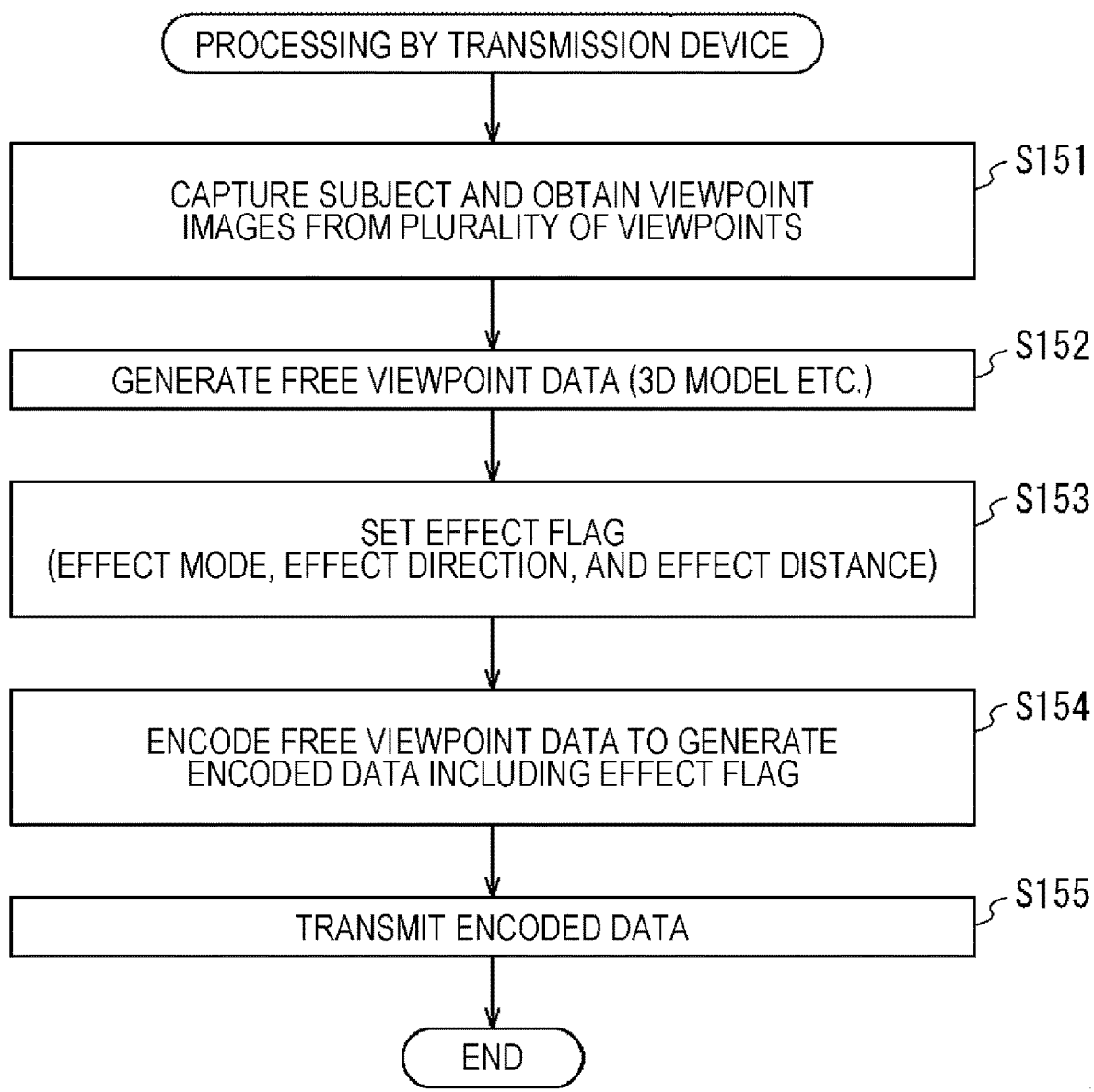
FIG. 29 is a flowchart of a first example of a process by the transmission device 101.

FIG. 29 is a flowchart of a first example of a process by the transmission device 101 illustrated in FIG. 28.

In steps S151 and S152, processing similar to that in steps S111 and S112 of FIG. 26 is performed. Thereby, the free viewpoint data generated by the free viewpoint data generation unit 112 is supplied to the encoding unit 114, and the process proceeds from step S152 to step S153.

In step S153, the encoding unit 114 sets, for example, the effect flag (FIG. 14), that is, the effect mode, the effect direction, and the effect distance in accordance with the user's operation on the transmission device 101 or the like, and the process proceeds to S154.

In step S154, the encoding unit 114 encodes the free viewpoint data from the free viewpoint data generation unit 112 to generate coded data including an effect flag. Then, the encoding unit 114 supplies the coded data to the transmission unit 115, and the process proceeds from step S154 to step S155.

In step S155, the transmission unit 115 transmits the coded data from the encoding unit 114, and the process is terminated.

As described above, the transmission device 101 can generate and transmit coded data including an effect flag set in response to the user's operation on the transmission device 101 or the like.

Figure 30:
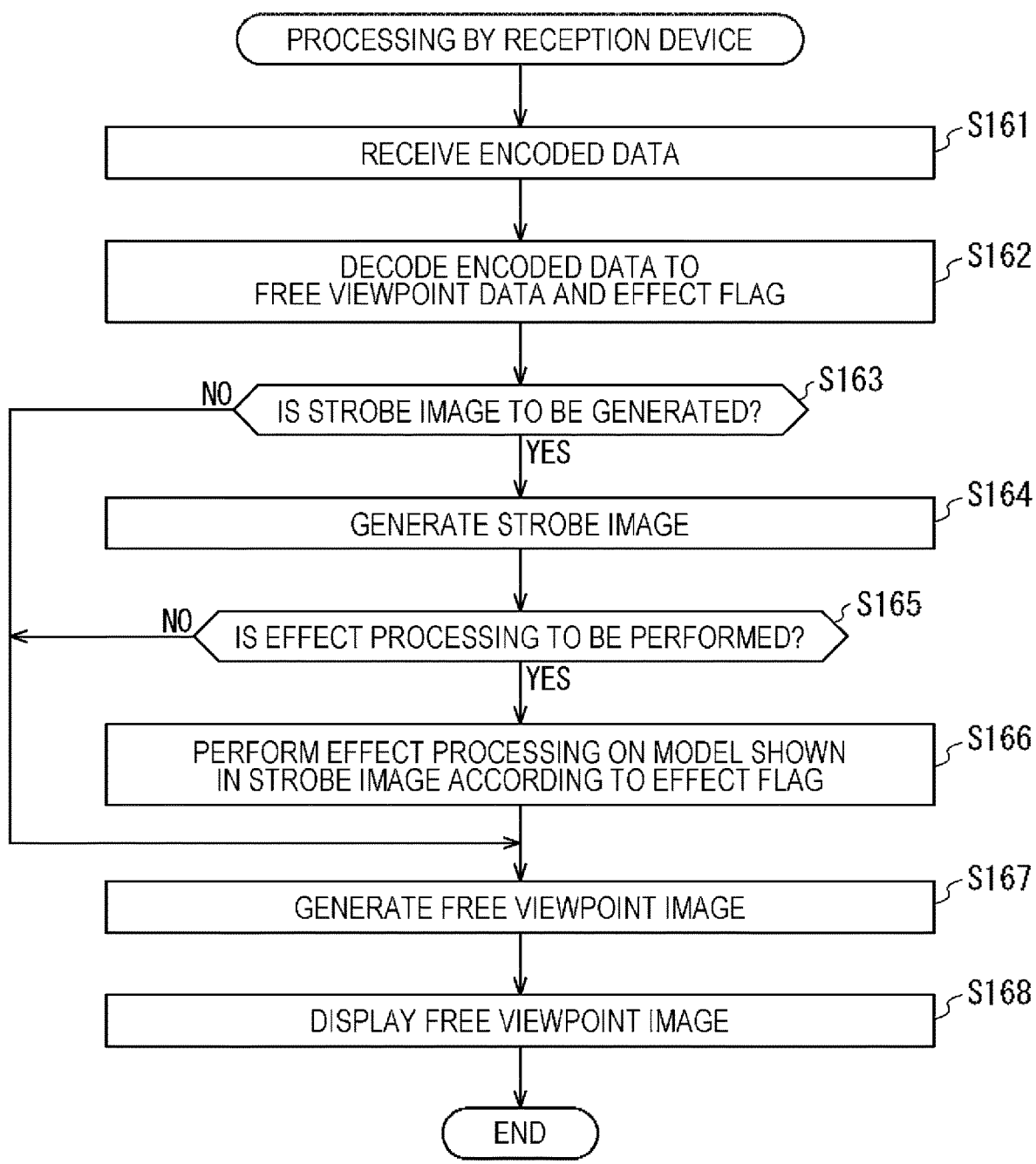
FIG. 30 is a flowchart of a first example of a process by the reception device 102.

FIG. 30 is a flowchart of a first example of a process by the reception device 102 illustrated in FIG. 28.

in step S161, the reception unit 131 of the reception device 102 receives the coded data transmitted from the transmission unit 115 of the transmission device 101 and supplies the coded data to the decoding unit 132, and the process proceeds to step S132.

In step S162, the decoding unit 132 decodes the coded data from the reception unit 131 and supplies free viewpoint data obtained by the decoding and the effect flag to the image processing unit 141, and the process proceeds to step S163.

in step S163, the strobe image generation unit 151 of the image processing unit 141 determines whether to generate a strobe image.

Here, the determination as to whether to generate a strobe image in step S163 can be made according to, for example, the user's operation on the reception device 102.

When it is determined in step S163 that a strobe image is not to be generated, the strobe image generation unit 151 and the effect processing unit 152 supply free viewpoint data to the free viewpoint image generation unit 133 without performing processing. Then, the process proceeds from step S163 to step S167 shipping steps S164 to S166.

Furthermore, when it is determined in step S163 that a strobe image is to be generated, the process proceeds to step S164.

In step S164, the strobe image generation unit 151 generates a strobe image using the free viewpoint data supplied from the decoding unit 132 to the image processing unit 141.

In other words, the strobe image generation unit 151 selects a plurality of generation frames from the frames of the free viewpoint data from the decoding unit 132. Moreover, the strobe image generation unit 151 generates a strobe image showing 3D models (3D models at a plurality of times) of the subject shown in the plurality of generation frames.

The strobe image generation unit 151 supplies free viewpoint data of the strobe image to the effect processing unit 152, and the process proceeds from step S164 to step S165.

In step S165, the effect processing unit 152 determines whether to perform an effect process on the 3D models of the strobe image of which the free viewpoint data is supplied from the strobe image generation unit 151. The determination as to whether to generate a strobe image in step S165 can be made according to the user's operation on the reception device 102 and the like, for example.

When it is determined in step S165 that an effect process is not to be performed, the effect processing unit 152 supplies the free viewpoint data of the strobe image from the strobe image generation unit 151 to the free viewpoint image generation unit 133 without performing an effect process. Then, the process proceeds from step S165 to step S167 skipping step S166.

Furthermore, when it is determined in step S165 that an effect process is to be performed, the process proceeds to step S166.

In step S166, according to the effect flag supplied from the decoding unit 132 to the image processing unit 141, the effect processing unit 152 performs an effect process on the 3D models at a plurality of times (generation frames) shown in the strobe image of which the free viewpoint data is supplied from the strobe image generation unit 151.

For example, in a case where the effect mode is set to effect mode 1, the effect direction is set to past, and the effect distance is set to time=10, the effect processing unit 152 performs an effect process to transparentize the 3D models separated by 10 seconds or more in the past direction from the reference 3D model in the strobe image.

Then, the effect processing u u nit 152 supplies the free viewpoint data of the strobe image having undergone the effect process to the free viewpoint image generation unit 133, and the process proceeds from step S166 to step S167.

In step S167, the free viewpoint image generation unit 133 uses the free viewpoint data from (the effect processing unit 152 of) the image processing unit 141 to generate, as free viewpoint images, 2D images in which a three-dimensional space captured by the image capturing unit 111 of the transmission device 101 is viewed from a virtual viewpoint set by the user's operation on the reception device 102 or the like. In other words, for example, the free viewpoint image generation unit 133 generates 2D images in which a three-dimensional space shown in a strobe image obtained by performing an effect process on 3D models is viewed from a virtual viewpoint, as free viewpoint images. Then, the free viewpoint image generation unit 133 supplies the free viewpoint image (data) to the display unit 134, and the process proceeds from step S167 to step S168.

in step S168, the display unit 134 displays the free viewpoint images from the free viewpoint image generation unit 133, and the process is terminated.

By the processing described above, the reception device 102 can display the strobe image that shows the 3D models having undergone the effect process according to the effect flag set according to the user's operation on the transmission device 101.

Figure 31:
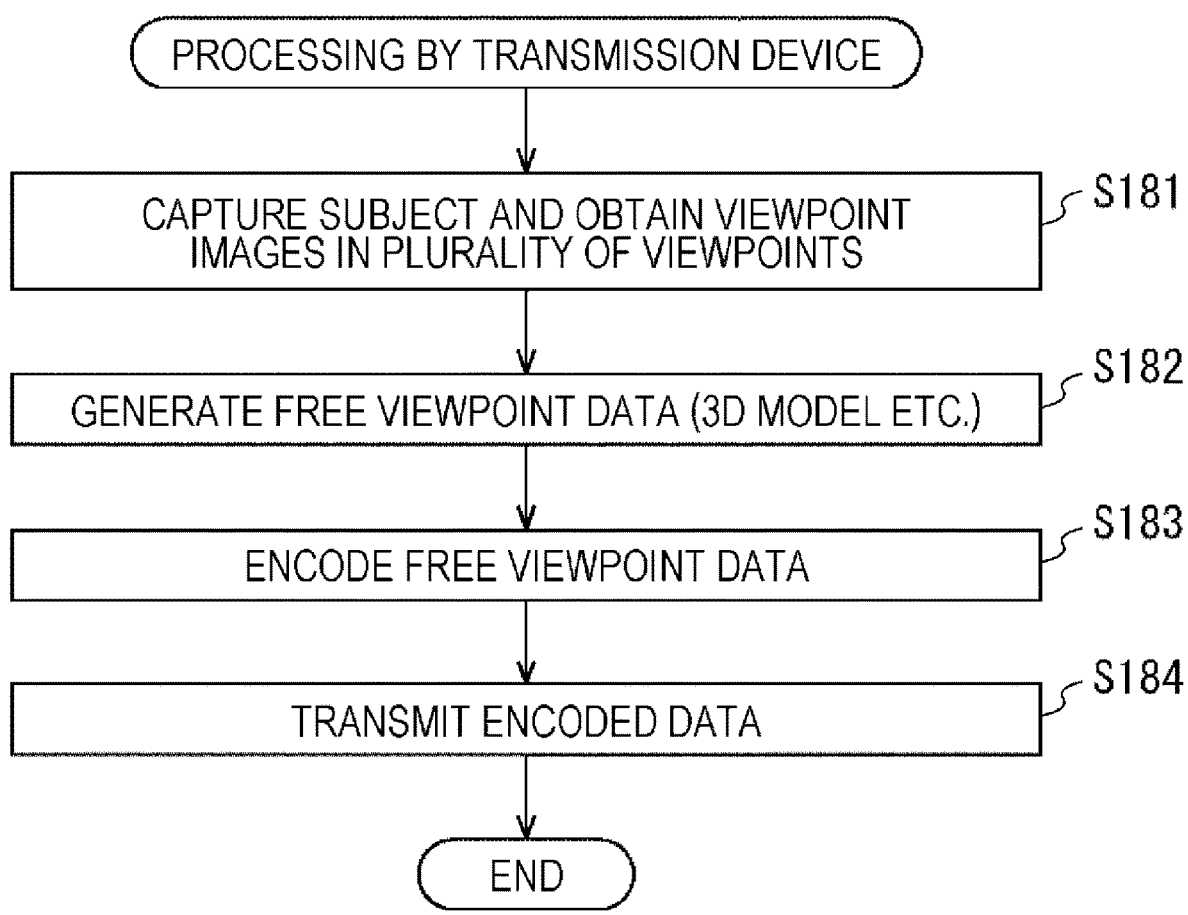
FIG. 31 is a flowchart of a second example of a process by the transmission device 101.

FIG. 31 is a flowchart of a second example of a process by the transmission device 101 illustrated in FIG. 28.

In steps S181 and S182, processing similar to that in steps S151 and S152 of FIG. 29 is performed. Thereby, the free viewpoint data generated by the free viewpoint data generation unit 112 is supplied to the encoding unit 114, and the process proceeds from step S182 to step S183.

In step S183, the encoding unit 114 encodes the free viewpoint data from the free viewpoint data generation unit 112 to generate coded data. Then, the encoding unit 114 supplies the coded data to the transmission unit 115, and the process proceeds from step S183 to step S184.

In step S184, the transmission unit 115 transmits the coded data from the encoding unit 114, and the process is terminated.

As described above, in the case of FIG. 31, unlike in the case of FIG. 29, the transmission device 101 generates and transmits coded data not including an effect flag.

Figure 32:
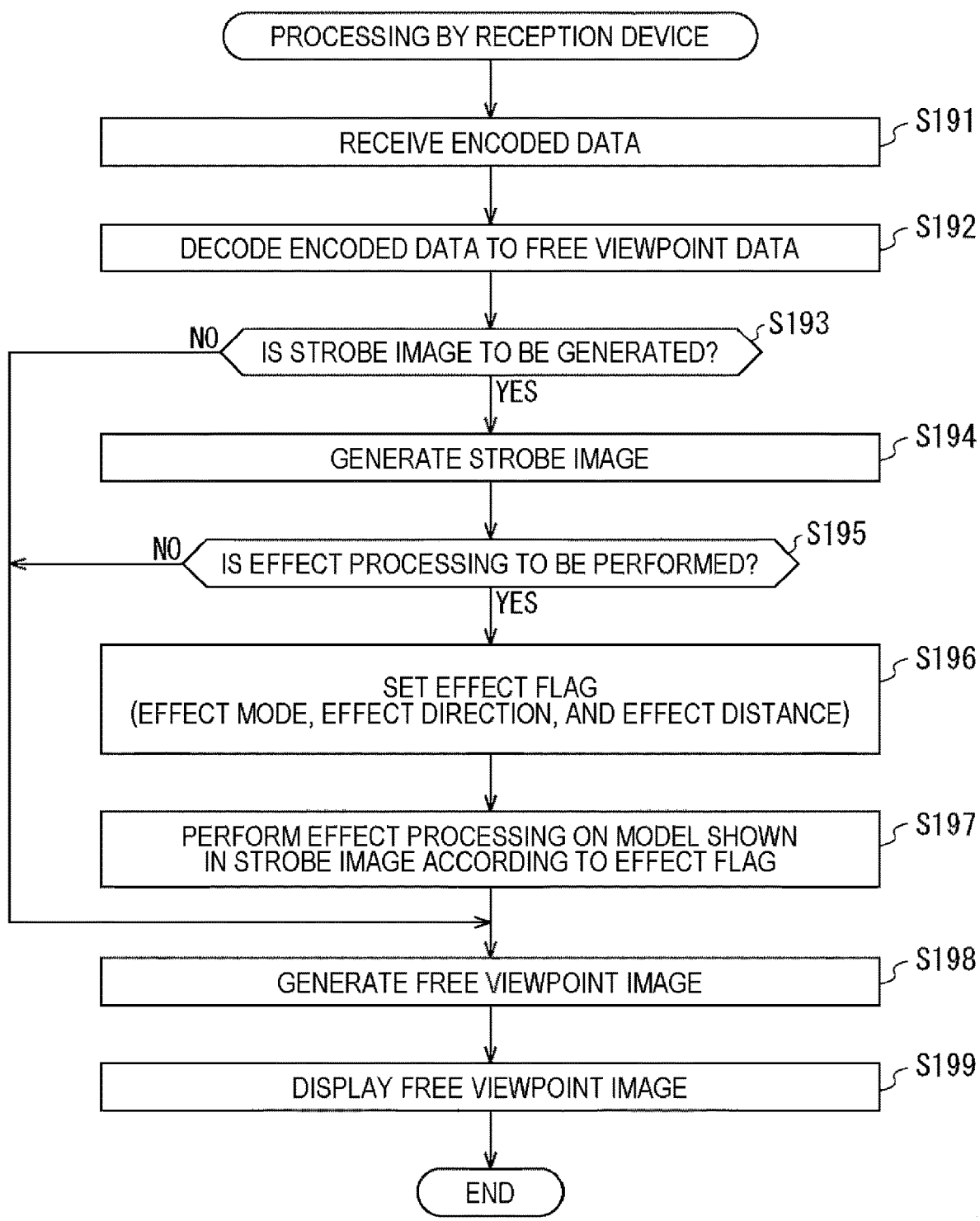
FIG. 32 is a flowchart of a second example of a process by the reception device 102.

FIG. 32 is a flowchart of a second example of a process by the reception device 102 illustrated in FIG. 28.

In step S191, the reception unit 131 of the reception device 102 receives the coded data transmitted from the transmission unit 115 of the transmission device 101 and supplies the coded data to the decoding unit 132, and the process proceeds to step S132.

In step S192, the decoding unit 132 decodes the coded data from the reception unit 131 and supplies free viewpoint data obtained by the decoding to the image processing unit 141, and the process proceeds to step S193.

In steps S193 to S195, processing similar to steps S163 to S165 illustrated in FIG. 30 is performed.

Then, when it is determined in step S195 that an effect process is not to be performed, the effect processing unit 152 supplies the free viewpoint data of the strobe image from the strobe image generation unit 151 to the free viewpoint image generation unit 133 without performing an effect process. Then, the process proceeds from step S195 to step S198 skipping steps S196 and S197.

Furthermore, when it is determined in step S195 that an effect process to be performed, the process proceeds to step S196.

In step S196, the effect processing unit 152 sets, for example, the effect flag (FIG. 14), that is, the effect mode, the effect direction, and the effect distance in accordance with the user's operation on the reception device 102 or the like, and the process proceeds to S197.

Here, the user of the reception device 102 may feel troublesome to set individually the effect mode, the effect direction, and the effect distance as the effect flag. Therefore, in the effect processing unit 152, there is prepared a plurality of combinations of the effect mode, the effect direction, and the effect distance as the effect flag, as effect filters. This allows the user of the reception device 102 to, in step S196, select a desired filter among the plurality of effect filters and set the desired filter as the effect mode, the effect direction, and the effect distance as the effect flag.

In step S197, according to the effect flag set according to the user's operation on the reception device 102, the effect processing unit 152 performs an effect process on the 3D models at a plurality of times (generation frames) shown in the strobe image of which the free viewpoint data is supplied from the strobe image generation unit Then, the effect processing unit 152 supplies the free viewpoint data of the strobe image having undergone the effect process to the free viewpoint image generation unit 133, and the process proceeds from step S197 to step S198.

In steps S198 and S199, processing similar to that in steps S167 and S168 of FIG. 30 is performed and the process is terminated.

By the processing described above, the reception device 102 can display the strobe image that shows the 3D models having undergone the effect process according to the effect flag set according to the user's operation on the reception device 102.

<Image Processing System to which the Present Technology is Applied>

Figure 33:
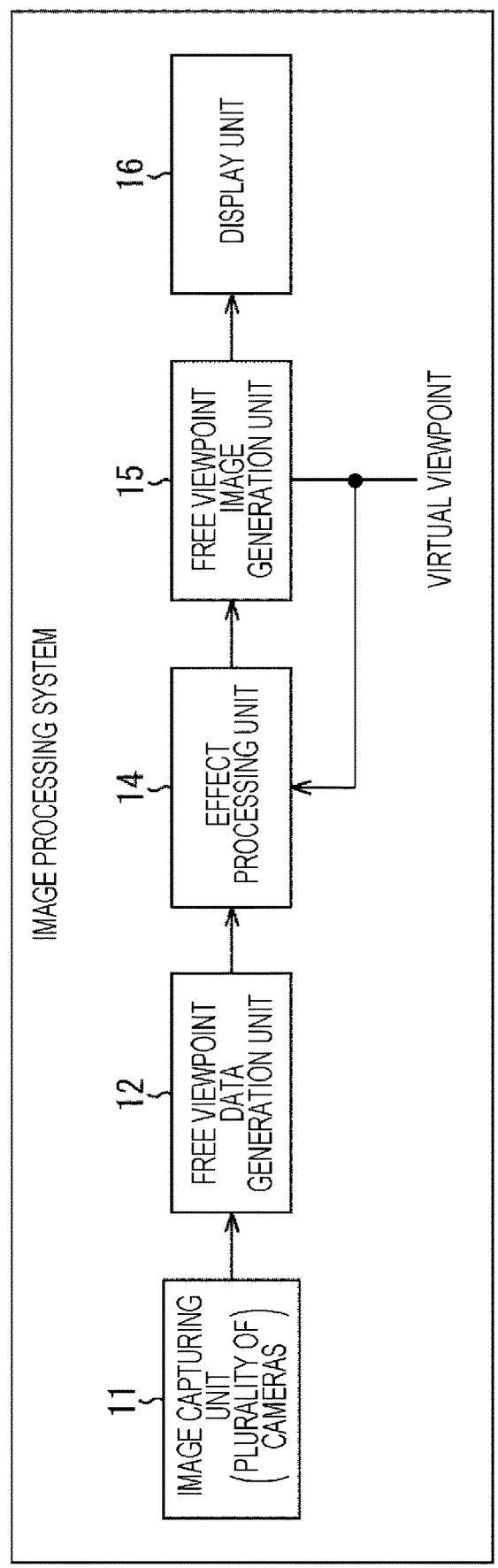
FIG. 33 is a block diagram illustrating a configuration example of another embodiment of an image processing system to which the present technology is applied.

FIG. 33 is a block diagram illustrating a configuration example of another embodiment oi an image processing system to which the present technology is applied.

Note that the components corresponding to those illustrated in FIG. 1 are denoted with the same reference numerals, and the description thereof will be appropriately omitted below.

The image processing system illustrated in FIG. 33 includes an image capturing unit 11, a free viewpoint data generation unit 12, an effect processing unit 14, a free viewpoint image generation unit 15, and a display unit 16.

The image processing system illustrated in FIG. 33 is in common with the image processing system illustrated in FIG. 1 in including an image capturing unit 11, a free viewpoint data generation unit 12, an effect processing unit 14, a free viewpoint image generation unit 15, and a display unit 16. However, the image processing system illustrated in FIG. 33 is different from the image processing system illustrated in FIG. 1 in that the strobe image generation unit 33 is not provided.

As described above, since the image processing system of FIG. 33 does not have the strobe image generation unit 33, free viewpoint data of a 3D image is supplied to the effect processing unit 14 from the free viewpoint data generation unit 12.

Then, the effect processing unit 14 performs an effect process on 3D models of a subject shown in the 3D image of which the free viewpoint data is supplied from the free viewpoint data generation unit 12.

For example, when a plurality of subjects is shown in the 3D image of which free viewpoint data is supplied from the free viewpoint data generation unit 12, the effect processing unit 14 can perform an effect process on each of 3D models of one or more of the plurality of subjects.

Therefore, when the 3D image of which the free viewpoint data is supplied from the free viewpoint data generation unit 12 to the effect processing unit 14 is an image of contents of a soccer game, the effect processing unit 14 can perform an effect process on 3D models of a plurality of soccer players or a ball and one or more soccer players near the ball as a plurality of subjects shown in the 3D image, for example.

As described above, the effect processing unit 14 can perform an effect process on one or more 3D models among 3D models of a plurality of subjects shown in any 3D image other than a strobe image (including all 3D models of the plurality of subjects shown in the 3D image).

Figure 34:
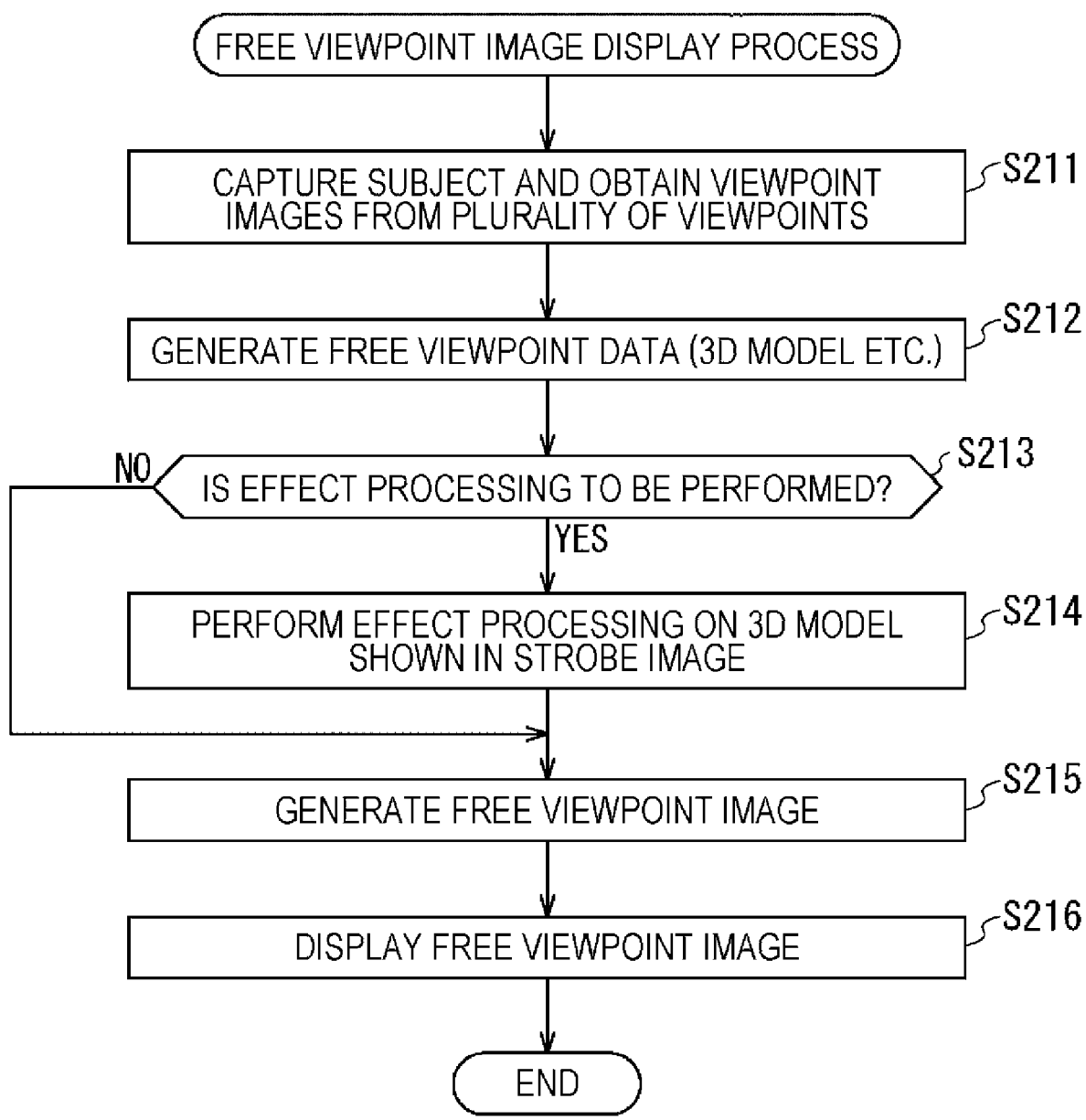
FIG. 34 is a flowchart of an example of a free viewpoint image display process of displaying a free viewpoint image.

FIG. 34 is a flowchart of an example of a free viewpoint image display process of displaying a free viewpoint image performed by the image processing system illustrated in FIG. 33.

In the free viewpoint image display processing, in steps S211 and S212, the same processing as steps S11 and S12 illustrated in FIG. 2 is performed. Accordingly, the free viewpoint data generation unit 12 generates 3D models of a subject (and 3D data including a background image), for example, as free viewpoint data of the 3D image on a frame-by-frame basis. The free viewpoint data (frame by frame) of the 3D image is supplied from the free viewpoint data generation unit 12 to the effect processing unit 14, and the process proceeds from step S212 to step S213.

In step S213, the effect processing unit 14 determines whether to perform an effect process on the 3D models shown in the 3D image of which the free viewpoint data is supplied from the free viewpoint data generation unit 12. The determination as to whether to generate a strobe image in step S217 can be made, for example, according to the user's operation.

When it is determined in step S213 that an effect process is not to be performed, the effect processing unit 14 supplies the free viewpoint data of the 3D image from the free viewpoint data generation unit 12 to the free viewpoint image generation unit 15 without performing the effect process. Then, the process proceeds from step S213 to step S215 skipping step S214.

In this case, in step S215, the free viewpoint image generation unit 15 generates, as free viewpoint images, 2D images in which the 3D image (free viewpoint data) from the effect processing unit 14 is viewed from virtual viewpoints. Then, the free viewpoint image generation unit 15 supplies the free viewpoint image to the display unit 16, and the process proceeds from step S215 to step S216.

In step S216, the display unit 16 displays the free viewpoint images from the free viewpoint image generation unit 15. In this case, the display unit 16 displays 2D images showing 3D models of the subject viewed from virtual viewpoints (2D images in which the 3D image is viewed from virtual viewpoints).

On the other hand, when it is determined in step S213 that an effect process is to be performed, the process proceeds to step S214.

In step S214, the effect processing unit 14 performs an effect process on 3D models of a subject shown in the 3D image of which the free viewpoint data is supplied from the free viewpoint data generation unit 12.

Here, when one subject is shown in the 3D image, the effect processing unit 14 performs an effect process on 3D models of the one subject. Furthermore, when a plurality of subjects is shown in the 3D image, the effect processing unit 14 can select 3D models of one or more subjects from the 3D models of the plurality of subjects, and perform an effect process on each of the 3D models of the one or more subjects. The 3D models to be subjected to the effect processing can be selected, for example, according to the user's operation or the like.

The effect processing unit 14 supplies the 3D image showing the 3D models having undergone the effect process to the free viewpoint image generation unit 15, and the process proceeds from step S214 to step S215.

In this case, in step S215, the free viewpoint image generation unit 15 generates, as free viewpoint images, 2D images in which the 3D image showing the 3D models having undergone the effect process from the effect processing unit 14 is viewed from virtual viewpoints. Then, the free viewpoint image generation unit 15 supplies the free viewpoint image to the display unit 16, and the process proceeds from step S215 to step S216.

In step S216, the display unit 16 displays the free viewpoint images from the free viewpoint image generation unit 15. In this case, the display unit 16 displays 2D images (2D images having undergone the effect process) in which an effect is applied to the 3D models of one or more subjects viewed from the virtual viewpoints.

As described above, it is possible to provide an easily viewable image by performing an effect process on one or more 3D models among 3D models of a plurality of subjects shown in a 3D image other than a strobe image. For example, as described above, when the 3D image is an image of content of a soccer game, it is possible to provide an image in which an effect is applied to 3D models of a plurality of soccer players related to a goal, the ball and one or more soccer players near the ball, or the ball, the soccer player making a pass, and the soccer player receiving the pass, or the like as a plurality of subjects shown in the 3D image.

<Transmission System>

Figure 35:
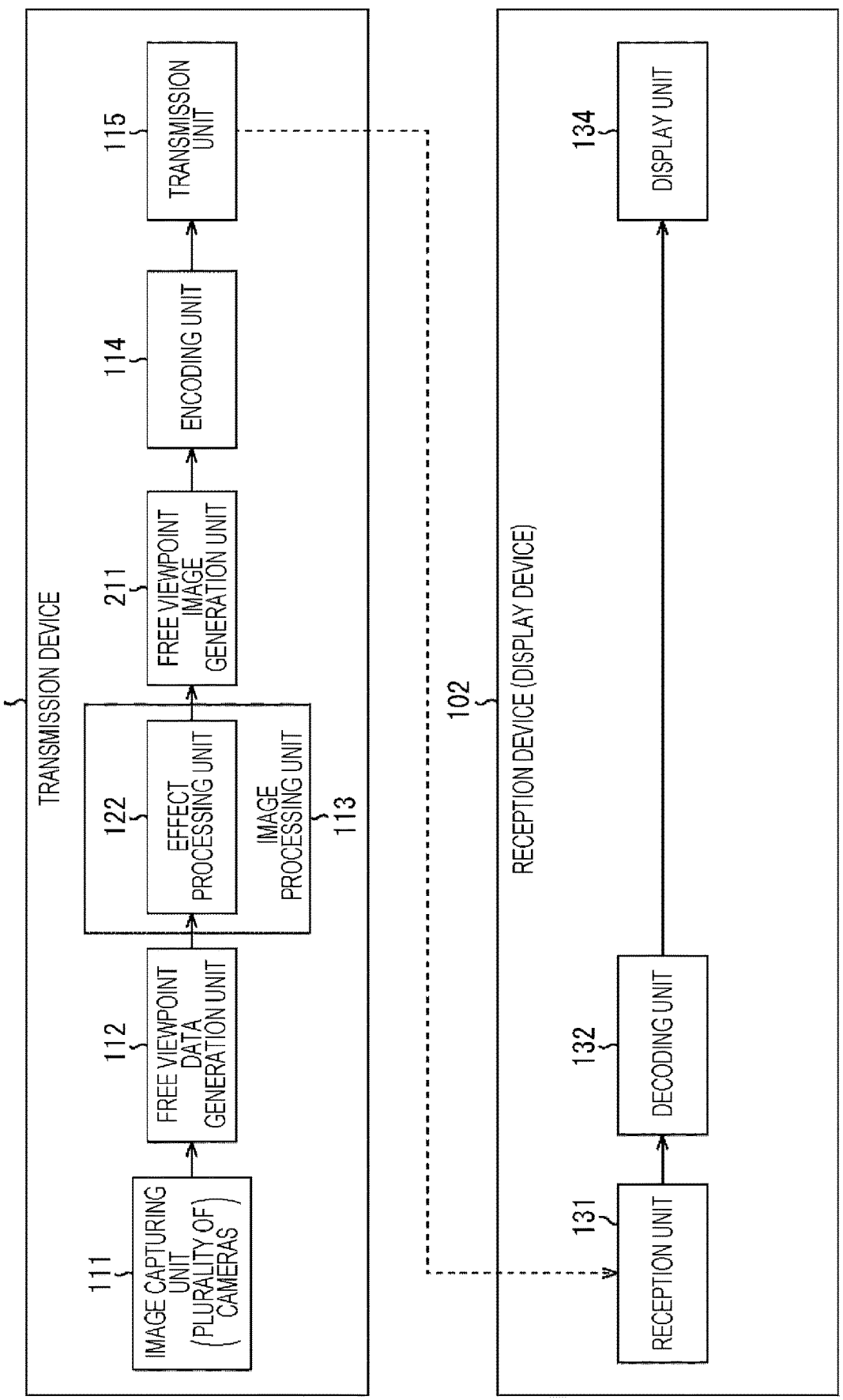
FIG. 35 is a block diagram illustrating a configuration example of a transmission system to which the image processing system is applied.

FIG. 35 is a block diagram illustrating a configuration example of a transmission system to which the image processing system illustrated in FIG. 33 is applied.

Note that the components corresponding to those illustrated in FIG. 25 are denoted with the same reference numerals, and the description thereof will be appropriately omitted below.

Referring to FIG. 35, the transmission system includes a transmission device 101 and a reception device 102. The transmission device 101 includes an image capturing unit 111, a free viewpoint data generation unit 112, an image processing unit 113, an encoding unit 114, and a transmission unit 115, and a free viewpoint image generation unit 211. The image processing unit 113 has an effect processing unit 122. The reception device 102 includes a reception unit 131, a decoding unit 132, and a display unit 134.

Therefore, the transmission system illustrated in FIG. 35 is in common with the transmission system illustrated in FIG. 25, in that the transmission system includes the transmission device 101 and the reception device 102, the transmission device 101 includes the image capturing unit 111, the free viewpoint data generation unit 112, the image processing unit 113, the encoding unit 114, and the transmission unit 115, and that the reception device 102 includes the reception unit 131, the decoding unit 132, and the display unit 134.

However, the transmission system illustrated in FIG. 28 is different from the transmission system illustrated in FIG. 25, in that the image processing unit 113 of the transmission device 101 does not include the strobe image generation unit 121, the transmission device 101 additionally includes a free viewpoint image generation unit 211, and the reception device 102 does not include the free viewpoint image generation unit 133.

In the transmission device 101, the image capturing unit 111, the free viewpoint data generation unit 112, the effect processing unit 122 of the image processing unit 113, and the free viewpoint image generation unit 211 respectively perform processes in manners similar to the image capturing unit 11, the free viewpoint data generation unit 12, the effect processing unit 14, and the free viewpoint image generation unit 15 illustrated in FIG. 33.

Accordingly, the free viewpoint image generation unit 211 supplies a 2D image in which an effect is applied to 3D models of a subject viewed from virtual viewpoints or a 2D image in which no effect is applied to 3D models of a subject viewed from virtual viewpoints, as free viewpoint images, to the encoding unit 114.

The encoding unit 114 encodes the free viewpoint images supplied from the effect processing unit 122 of the image processing unit 113 according to a predetermined encoding method, and supplies coded data obtained by the encoding to the transmission unit 115. The transmission unit 115 transmits the coded data from the encoding unit 114 by wired communication or wireless communication.

In the reception device 102 (display device), the reception unit 131 receives the coded data transmitted from (the transmission unit 115 of) the transmission device 101, and supplies the coded data to the decoding unit 132.

The decoding unit 132 decodes the coded data from the reception unit 131 into a free viewpoint image, and supplies the free viewpoint image to the display unit 134. The display unit 134 displays the free viewpoint image from the decoding unit 132.

The user of the reception device 102 can specify virtual viewpoints by operating the reception device 102, for example. The reception device 102 can transmit the virtual viewpoints specified by the user to the transmission device 101. In the transmission device 101, the free viewpoint image generation unit 211 can generate a free viewpoint image as a 2D image viewed from the virtual viewpoint according to the virtual viewpoint from the reception device 102.

<Variations of Effect Processes>

As effect processes performed by the effect processing unit 14 (and the effect processing units 122 and 152), various effect processes other than the effect processes in the effect modes 1 to 10 illustrated in FIG. 14 can be adopted.

For example, a process of changing the size of the 3D models, a process of changing the texture (texture material)

of the 3D models, a process of deleting the texture of the 3D models, and the like can be adopted as effect processes performed by the effect processing unit 14. Moreover, for example, a process of blurring the shape of 3D models (3D shape models), a process of changing the color of 3D models, and the like can be adopted as effect processes performed by the effect processing unit 14. For these processes for effect, as in the effect processes in effect modes 1 to 10 illustrated in FIG. 14, the effect direction, the effect distance, and necessary parameters can be set.

Figure 36:
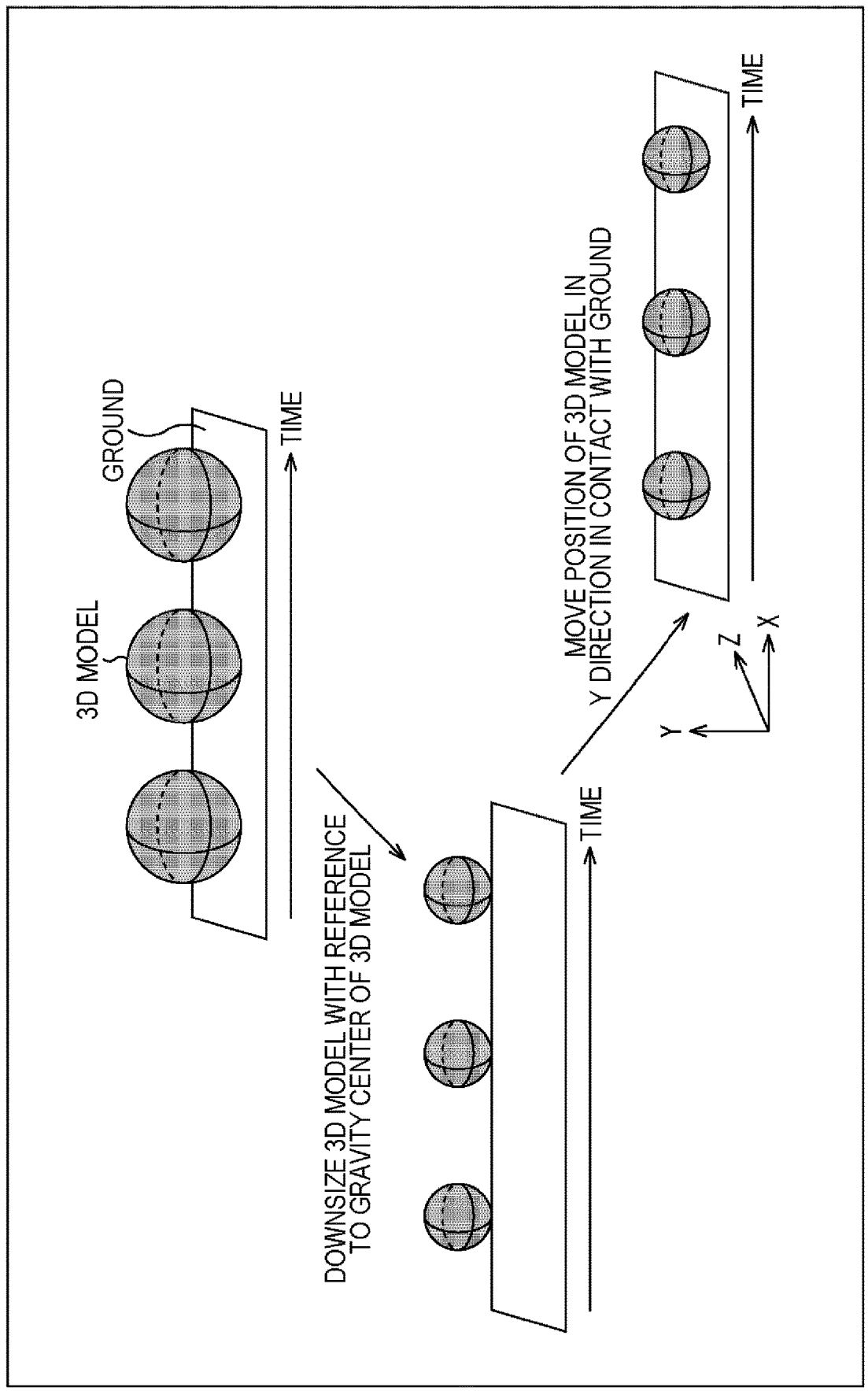
FIG. 36 is a diagram describing an effect process of changing the size of a 3D model.

FIG. 36 is a diagram describing an effect process of changing the size of 3D models.

In the effect process of changing the size of 3D models, for example, the size of each of the 3D models can be reduced or enlarged with reference to a predetermined point such as the gravity center of the 3D model. Here, in a case where the 3D models before size change are in contact with a plane, simply reducing or enlarging the size of the 3D models with reference to the gravity centers of the 3D models might bring the 3D models after the size change into a state of separating from the plane and floating in the air or sinking in the plane.

In other words, FIG. 36 illustrates, for example, a (3D) strobe image showing 3D models of a soccer ball rolling on a soccer ground.

When an effect process is performed to reduce the size of the 3D models with reference to the gravity centers of the 3D models of the soccer ball, the 3D models of the soccer ball float from the ground as illustrated in FIG. 36. As a result, the strobe image after the effect process becomes unnatural.

Note that, when an effect process is performed to enlarge the size of 3D models with reference to the gravity centers of the 3D models of the soccer ball, the 3D models of the soccer ball come to sink into the ground. As a result, the strobe image after the effect process becomes unnatural.

Therefore, in the case of performing an effect process of changing the size of 3D models, when the 3D models before size change are in contact with a plane, the effect processing unit 14 can move the 3D models after size change such that the 3D models after size change are in contact with the plane as illustrated in FIG. 36.

This prevents the strobe image after the effect process from becoming unnatural.

In a case where 3D models (before size change) are in contact with a plane, as described above, the 3D models of a soccer ball may be in contact with a ground, the 3D models may be in contact with a floor surface or a table top, or the 3D models may be in contact with a wall or a ceiling.

The 3D models after size change are moved perpendicularly to the plane with which the 3D models before resizing are in contact. Furthermore, in a case where the size of the 3D models is reduced or enlarged s times, the 3D models after size change are moved such that the distance between the gravity centers of the 3D models after size change and the plane becomes s times shorter or longer than the distance before size change.

<Description of a Computer to which the Present Technology is Applied>

Next, the above-described series of processes may be performed by hardware or software in a case where the series of processes is performed by software, programs constituting the software are installed in a general-purpose computer.

FIG. 37 is a block diagram illustrating a configuration example of an embodiment of a computer in which programs for executing the series of processes described above are installed.

The programs can be recorded in advance in a hard disc 905 or a ROM 903 as a recording medium included in the computer.

Alternatively, the programs can be stored (recorded) in a removable recording medium 911 driven by a drive 909. Such removable recording medium 911 can be provided as so-called package software. Here, examples of the removable recording medium 911 include a flexible disc, a compact disc read only memory (CD-ROM), a magneto optical (MO) disc, a digital versatile disc (DVD), a magnetic disc, a semiconductor memory, and the like.

Note that the programs may be installed in the computer from the removable recording medium 911 as described above, or may be downloaded to the computer via a communication network or a broadcast network and installed in the built-in hard disc 905. In other words, for example, the programs are wirelessly transferred from a download site to the computer via an artificial satellite for digital satellite broadcasting, or transferred in a wired manner to the computer via a network such as a local area network (LAN) or the Internet.

The computer contains a central processing unit (CPU) 902, and an input/output interface 910 is connected to the CPU 902 via a bus 901.

When an instruction is input by the user operating an input unit 907 or the like via the input/output interface 910, the CPU 902 executes a program stored in a read only memory (ROM) 903 accordingly. Alternatively, the CPU 902 loads a program in the hard disc 905 into a random access memory (RAM) 904 and executes the program.

Thus, the CPU 902 performs the processing according to the above-described flowchart or the processing performed by the configuration illustrated in the above-described block diagram. Then, the CPU 902 causes the processing result to be output from the output unit 906, transmitted from toe communication unit 908, or recorded on the hard disc 905, for example, via the input/output interface 910, as necessary.

Note that the input unit 907 includes a keyboard, a mouse, a microphone, and the like. Furthermore, the output unit 906 includes a liquid crystal display (LCD), a speaker, and the like.

Here, in the present specification, the processing performed by the computer according to the programs does not necessarily have to be performed chronologically in the order described in the flowchart. In other words, the processing performed by the computer according to the programs includes processing executed in parallel or separately (for example, parallel processing or processing by an object).

Furthermore, the programs may be processed by one computer (processor) or may be distributed and processed by a plurality of computers. Moreover, the programs may be transferred to a remote computer for execution.

Moreover, in the present specification, the system means a set of a plurality of components (apparatus, modules (parts), and others), and it does not matter whether or not all the components are in the same housing. Therefore, the system may be a plurality of devices housed in separate housings and connected via a network, or may be one device containing a plurality of modules in one housing.

Note that embodiments of the present technology are not limited to the foregoing embodiments but can be modified in various manners without deviating from the gist of the present technology.

For example, the present technology can have a cloud computing configuration in which one function is shared and processed collaboratively by a plurality of devices via a network.

Furthermore, each of the steps described in the above-described flowchart can be executed by one device or can be shared by a plurality of devices.

Moreover, in a case where a plurality of processes is included in one step, the plurality of processes included in one step can be executed by one device or can be shared and executed by a plurality of devices. Furthermore, the advantageous effects described herein are mere examples but are not limited ones. The present technology may have any other advantageous effects.

Note that the present technology may be configured as described below.

<1>

An image processing device including:

an effect processing unit that performs an effect process on one or more of a plurality of 3D models generated from a plurality of viewpoint images captured from a plurality of viewpoints; and a generation unit that generates a 2D image in which the plurality of 3D models having undergone the effect process is viewed from a predetermined viewpoint.

<2>

The image processing device according to <1>, in which the effect processing unit performs the effect process of transparentizing a predetermined 3D model among the plurality of 3D models.

<3>

The image processing device according to <1> or <2>, in which the effect processing unit performs the effect process on 3D models of a predetermined subject at a plurality of times generated from the plurality of viewpoint images.

<4>

The image processing device according to any one or <1> to <3>, in which the effect processing unit performs the effect process on the 3D models of the predetermined subject specified by a number, distance, or time of the 3D models with respect to one reference model among the 3D models of the predetermined subject at the plurality of times.

<5>

The image processing device according to any one of <1> to <4>, in which the effect processing unit sets the effect process to be performed on the 3D models from a plurality of effect processes.

<6>

The image processing device according to any one of <1> to <5>, further including a display unit that displays the 2D image.

<7>

The image processing device according to any one or <1> to <6>, in which the 3D model includes View Independent.

<8>

The image processing device according to any one of <1> to <7>, in which the effect processing unit performs the effect process to change a size of the 3D model, and when the 3D model before the size change is in contact with a plane, the effect processing unit moves the 3D model such that the 3D model after the size change is in contact with the plane.

<9>

An image processing method including:

performing an effect process on one or more of a plurality of 3D models generated from a plurality of viewpoint images captured from a plurality of viewpoints; and generating a 2D image in which the plurality of 3D models having undergone the effect process is viewed from a predetermined viewpoint.

<10>

A program for causing a computer to serve as:

an effect processing unit that performs an effect process on each of a plurality of 3D models generated from a plurality of viewpoint images captured from a plurality of viewpoints; and a generation unit that generates a 2D image in which the plurality of 3D models having undergone the effect process is viewed from a predetermined viewpoint.

<11>

A display device including:

a reception unit that receives a 2D image obtained by performing an effect process on one or more of a plurality of 3D models generated from a plurality of viewpoint images captured from a plurality of viewpoints and generating the 2D image in which the plurality of 3D models having undergone the effect process is viewed from a predetermined viewpoint; and a display unit that displays the 2D image.

<A1>

An image processing device including:

a strobe image generation unit that generates a strobe image showing 3D models of a subject at a plurality of times generated from viewpoint images of the subject from a plurality of viewpoints; and an effect processing unit that performs an effect process on the 3D models shown in the strobe image.

<A2>

The image processing device according to <A1>, in which the strobe image generation unit generates the strobe image so that the 3D models on the near side are displayed on a priority basis.

<A3>

The image processing device according to <A1> or <A2>, in which the effect processing unit performs the effect process to transparentize the 3D models.

<A4>

The image processing device according to any one of <A1> to <A3>, in which the effect processing unit performs the effect process to cause the 3D models to gradually disappear,

<A5>

The image processing device according to any one of <A1> to <A24>, in which the effect processing unit performs the effect process to decrease a number of textures of the 3D models.

<A6>

The image processing device according to any one of <A1> to <A5>, in which the effect processing unit performs the effect process to erase the 3D models.

<A1>

The image processing device according to any one of <A1> to <A6>, in which the effect processing unit performs the effect process to decrease luminance or saturation of the 3D models.

<A8>

The image processing device according to any one of <A1> to <A7>, in which the effect processing unit performs the effect process to limit a number of the 3D models shown in the strobe image.

<A9>

The image processing device according to any one of <A1> to <A8>, in which the effect processing unit performs the effect process to decrease a number of meshes of the 3D models.

<A10>

The image processing device according to any one of <A1> to <A9>, in which the effect processing unit performs the effect process to change an expression form of the 3D models.

<A11>

The image processing device according to any one of <A1> to <A10>, in which the effect processing unit performs the effect process to change the 3D models formed from polygons into mire frames.

<A12>

The image processing device according to any one of <A1> to <A11>, in which the effect processing unit performs the effect process to change the expression form of the 3D models from View Dependent to View Independent.

<A13>

The image processing device according to any one of <A1> to <A12>, in which the effect processing unit performs the effect process to erase the 3D models with traces of the 3D models left.

<A14>

The image processing device according co any one of <A1> to <A13>, in which the effect processing unit performs the effect process on the 3D models preceding or following a reference 3D model at a time when the latest virtual viewpoint is set among the 3D models shown in the strobe image.

<A15>

The image processing device according to any one of <A1> to <A14>, in which the effect processing unit performs the effect process on the 3D models separated by a predetermined number of models or more from the reference 3D model at a time when the latest virtual viewpoint is set among the 3D models shown in the strobe image.

<A16>

The image processing device according to any one of <A1> to <A15>, in which the effect processing unit performs the effect process on the 3D models separated by a predetermined distance or more from the reference 3D model at a time when the latest virtual viewpoint is set among the 3D models shown in the strobe image.

<A17>

The image processing device according co any one of <A1> to <A16>, in which the effect processing unit performs the effect process on the 3D models at times separated by a predetermined time or more from the reference 3D model at a time when the latest virtual viewpoint is set among the 3D models shown in the strobe image.

<A18>

An image processing method including:

generating a strobe image showing 3D models of a subject at a plurality of times generated from viewpoint images of the subject from a plurality of viewpoints; and performing an effect process on the 3D models shown in the strobe image.

<A19>

A program for causing a computer to serve as:

a strobe image generation unit that generates a strobe image showing 3D models of a subject at a plurality of times generated from viewpoint images of the subject from a plurality of viewpoints; and an effect processing unit that performs an effect process on the 3D models shown in the strobe image.

<A20>

A transmission system including:

a transmission device that has a transmission unit that transmits an effect flag relating to an effect process to be performed on 3D models in a strobe image showing the 3D models of a subject at a plurality of times generated from viewpoint images of the subject from a plurality of viewpoints; and a reception device that has a reception unit that receives the effect flag, a strobe image generation unit that generates the strobe image, and an effect processing unit that performs the effect process on the 3D models shown in the strobe image according to the effect flag.

<B1>

An image processing device that generates a strobe image after an effect process in which the effect process is performed on 3D models shown in the strobe image showing the 3D models of a subject at a plurality of times generated from viewpoint images of the subject from a plurality of viewpoints.

<C1>

An image processing device including:

circuitry configured to:

perform an effect process on at least one 3D model of a plurality of 3D models generated from a plurality of viewpoint images captured from a plurality of viewpoints; and generate a 2D image in which the plurality of 3D models Saving undergone the effect process is viewed from a predetermined viewpoint.

<C2>

The image processing device according to <C1>, wherein the circuitry is further configured to:

perform the effect process to transparentize the at least one 3D model of the plurality of 3D models.

<C3>

The image processing device according to <C1> or <C2>, wherein the circuitry is further configured to:

perform the effect process on 3D models of a predetermined subject at plurality of times generated from the plurality of viewpoint images.

<C4>

The image processing device according to any one of <C1> to <C3>, wherein the circuitry is further configured to:

perform the effect process on the 3D models of the predetermined subject specified by a number, distance, or time of the 3D models with respect to a reference model of the plurality of 3D models of the predetermined subject at the plurality of time.

<C5>

The image processing device according to any one of <C1> to <C4>, wherein the circuitry is further configured to: set the effect process to be performed on the 3D models from a plurality of effect processes.

<C6>

The image processing device according to any one of <C1> to <C5>, wherein the circuitry is further configured to:

initiate display of the 2D image.

<C7>

The image processing device according to any one of <C1> to <C6>, wherein an expression form of the 3D model includes a View Independent model.

<C8>

The image processing device according to any one of <C1> to <C7>, wherein the circuitry is further configured to:

perform the effect process to change a size of the 3D model, and move, when the 3D model prior to the size change is in contact with a plane, the 3D model such that the 3D model after the sire change is in contact with the plane.

<C9>

An image processing method including:

performing an effect process on at least one 3D model of a plurality of 3D models generated from a plurality of viewpoint images captured from a plurality of viewpoints; and generating a 2D image in which the plurality of 3D models having undergone the effect process is viewed from a predetermined viewpoint.

<C10>

A non-transitory computer-readable medium having embodied thereon a program, which when executed by a computer causes the computer to execute an image processing method, the method including:

performing an effect process on at least one 3D model of a plurality of 3D models generated from a plurality of viewpoint images captured from a plurality of viewpoints; and generating a 2D image in which the plurality of 3D models having undergone the effect process is viewed from a predetermined viewpoint.

<C11>

A display device including:

circuitry configured to:

receive a 2D image obtained by performing an effect process on at least one 3D model of a plurality of 3D models generated from a plurality of viewpoint images captured from a plurality of viewpoints and generating the 2D image in which the plurality of 3D models having undergone the effect process is viewed from a predetermined viewpoint; and display the 2D image.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

11 Image capturing unit
12 Free viewpoint data generation unit
13 Strobe image generation unit
14 Effect processing unit
15 Free viewpoint image generation unit
16 Display unit
101 Transmission device
102 Reception device
111 Image capturing unit
112 Free viewpoint data generation unit
113 Image processing unit
114 Encoding unit
115 Transmission device
131 Reception device
132 Decoding unit
133 Free viewpoint image generation unit
134 Display unit
141 Image processing unit
151 Strobe image generation unit
152 Effect processing unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An image processing device comprising:

circuitry configured to:

perform an effect process on at least one 3D model of a plurality of 3D models generated from a plurality of viewpoint images captured from a plurality of viewpoints; and generate a 2D image in which the plurality of 3D models having undergone the effect process is viewed from a predetermined viewpoint;

wherein a first 3D model of the plurality of 3D models is separated from a reference 3D model of the plurality of 3D models at a first distance or time, wherein a second 3D model of the plurality of 3D models is separated from the reference 3D model at a second distance or time less than the first distance or time, and wherein the effect process performed on the first 3D model is at a higher degree than the effect process performed on the second 3D model.

2. The image processing device according to claim 1, wherein the circuitry is further configured to:

perform the effect process to transparentize the at least one 3D model of the plurality of 3D models.

3. The image processing device according to claim 2, wherein the first 3D model is transparentized at a higher degree of transparency than the second 3D model.

4. The image processing device according to claim 1, wherein the circuitry is further configured to:

perform the effect process on 3D models of a predetermined subject at plurality of times generated from the plurality of viewpoint images.

5. The image processing device according to claim 4, wherein the circuitry is further configured to:

perform the effect process on the 3D models of the predetermined subject specified by a number, distance, or time of the 3D models with respect to the reference model of the predetermined subject at the plurality of times.

6. The image processing device according to claim 1, wherein the circuitry is further configured to:

set the effect process to be performed on the 3D models from a plurality of effect processes.

7. The image processing device according to claim 1, wherein the circuitry is further configured to:

initiate display of the 2D image.

8. The image processing device according to claim 1, wherein
an expression form of the 3D model includes a View Independent model.

9. The image processing device according to claim 1, wherein the circuitry is further configured to:
perform the effect process to change a size of the 3D model; and
move, when the 3D model prior to the size change is in contact with a plane, the 3D model such that the 3D model after the size change is in contact with the plane.

10. The image processing device according to claim 1, wherein the reference 3D model is at a time when a latest viewpoint of the plurality of viewpoints is captured.

11. An image processing method comprising:
performing an effect process on at least one 3D model of a plurality of 3D models generated from a plurality of viewpoint images captured from a plurality of viewpoints; and
generating a 2D image in which the plurality of 3D models having undergone the effect process is viewed from a predetermined viewpoint;
wherein a first 3D model of the plurality of 3D models is separated from a reference 3D model of the plurality of 3D models at a first distance or time,
wherein a second 3D model of the plurality of 3D models is separated from the reference 3D model at a second distance or time less than the first distance or time, and
wherein the effect process performed on the first 3D model is at a higher degree than the effect process performed on the second 3D model.

12. A non-transitory computer-readable medium having embodied thereon a program, which when executed by a computer causes the computer to execute an image processing method, the method comprising:
performing an effect process on at least one 3D model of a plurality of 3D models generated from a plurality of viewpoint images captured from a plurality of viewpoints; and
generating a 2D image in which the plurality of 3D models having undergone the effect process is viewed from a predetermined viewpoint,
wherein a first 3D model of the plurality of 3D models is separated from a reference 3D model of the plurality of 3D models at a first distance or time,
wherein a second 3D model of the plurality of 3D models is separated from the reference 3D model at a second distance or time less than the first distance or time, and
wherein the effect process performed on the first 3D model is at a higher degree than the effect process performed on the second 3D model.

13. A display device comprising:
circuitry configured to:
receive a 2D image obtained by performing an effect process on at least one 3D model of a plurality of 3D models generated from a plurality of viewpoint images captured from a plurality of viewpoints and generating the 2D image in which the plurality of 3D models having undergone the effect process is viewed from a predetermined viewpoint; and
initiate display of the 2D image,
wherein a first 3D model of the plurality of 3D models is separated from a reference 3D model of the plurality of 3D models at a first distance or time,
wherein a second 3D model of the plurality of 3D models is separated from the reference 3D model at a second distance or time less than the first distance or time, and
wherein the effect process performed on the first 3D model is at a higher degree than the effect process performed on the second 3D model.

* * * * *